(12) United States Patent
Sano et al.

(10) Patent No.: US 10,289,145 B2
(45) Date of Patent: May 14, 2019

(54) VOLTAGE GENERATING CIRCUIT

(71) Applicant: RENESAS ELECTRONICS CORPORATION, Tokyo (JP)

(72) Inventors: Shinya Sano, Kanagawa (JP); Masashi Horiguchi, Kanagawa (JP); Takahiro Miki, Kanagawa (JP); Mitsuru Hiraki, Kanagawa (JP)

(73) Assignee: Renesas Electronics Corporation, Tokyo (JP)

( * ) Notice: Subject to any disclaimer, the term of this patent is extended or adjusted under 35 U.S.C. 154(b) by 0 days.

(21) Appl. No.: 15/966,176

(22) Filed: Apr. 30, 2018

(65) Prior Publication Data

US 2018/0253118 A1 Sep. 6, 2018

Related U.S. Application Data

(62) Division of application No. 15/388,308, filed on Dec. 22, 2016, now Pat. No. 9,989,985, which is a division
(Continued)

(30) Foreign Application Priority Data

Apr. 12, 2011 (JP) .................................. 2011-088072

(51) Int. Cl.
*G05F 3/26* (2006.01)
*G05F 3/30* (2006.01)
(Continued)

(52) U.S. Cl.
CPC ................ *G05F 3/267* (2013.01); *G05F 3/30* (2013.01); *H02M 3/158* (2013.01); *G05F 3/20* (2013.01); *G05F 3/26* (2013.01)

(58) Field of Classification Search
CPC ..... G05F 3/02; G05F 3/30; G05F 3/22; G05F 3/222; G05F 3/242; G05F 3/225;
(Continued)

(56) References Cited

U.S. PATENT DOCUMENTS 3,887,863 A 6/1975 Brokaw
4,059,793 A 11/1977 Ahmed
(Continued)

FOREIGN PATENT DOCUMENTS

EP 1 158 383 A1 11/2001
JP 60-3644 B2 1/1985
(Continued)

OTHER PUBLICATIONS

Kuijk, "A Precision Reference Voltage Source", IEEE Journal of Solid-State Circuits, vol. SC-8, No. 3, Jun. 1973.
(Continued)

*Primary Examiner* — Bryan R Perez
(74) *Attorney, Agent, or Firm* — Mattingly & Malur, PC

(57) ABSTRACT

A voltage generating circuit, in which the influence of offset of an amplifier on an output voltage is reduced, has first and second bipolar transistors (Q1, Q2) having emitter terminals at the same electric potential. A base terminal of Q1 is disposed on a collector side of Q2. A first resistance element connects the collector side of Q2 with the base side of Q2; and a second resistance element (R1) connects a collector side of Q1 to R2. A third resistance element (R3) connects a base terminal of Q2 with the electric potential of the emitter terminals. An amplifier (A1) outputs a voltage based on a voltage difference between the collector sides of Q1 and Q2; and a voltage-current converting section (MP1, MP2) converts amplifier output into a current supplied to the connection node of R1 and R2. A voltage is then output on the basis of the generated current.

5 Claims, 37 Drawing Sheets

Related U.S. Application Data of application No. 14/009,715, filed as application No. PCT/JP2012/059643 on Apr. 9, 2012, now Pat. No. 9,564,805.

(51) Int. Cl.
*H02M 3/158* (2006.01)
*G05F 3/20* (2006.01)

(58) Field of Classification Search
CPC ... G05F 3/245; G05F 3/20; G05F 3/00; G05F 3/08; G05F 3/10; G05F 3/16; G05F 3/18; G05F 3/185; G05F 3/227; G05F 3/247; G05F 3/26; G05F 3/265; G05F 3/24; G05F 3/262
USPC .................................. 327/539; 323/312–317
See application file for complete search history.

(56) References Cited

U.S. PATENT DOCUMENTS

| | | | |
|---|---|---|---|
| 5,424,628 A | 6/1995 | Nguyen | |
| 6,160,391 A | 12/2000 | Banba | |
| 6,218,822 B1 | 4/2001 | MacQuigg | |
| 6,946,900 B2 | 9/2005 | Inoue | |
| 7,808,068 B2 | 10/2010 | Harley | |
| 2002/0047696 A1* | 4/2002 | Chowdhury | G05F 3/30 323/316 |
| 2003/0058031 A1 | 3/2003 | Scoones | |
| 2003/0137287 A1 | 7/2003 | Marie | |
| 2007/0052405 A1 | 3/2007 | Mochizuki | |
| 2007/0052473 A1 | 3/2007 | McLeod | |
| 2007/0096712 A1 | 5/2007 | Chang | |
| 2007/0132506 A1 | 6/2007 | Fujisawa | |
| 2008/0094131 A1 | 4/2008 | Pertijs et al. | |
| 2009/0027030 A1 | 1/2009 | Marinca | |
| 2009/0058392 A1* | 3/2009 | Yanagawa | G05F 3/30 323/314 |
| 2009/0195301 A1 | 8/2009 | Harley | |
| 2011/0109373 A1 | 5/2011 | Chen et al. | |

FOREIGN PATENT DOCUMENTS

| | | |
|---|---|---|
| JP | 2006-059001 A | 3/2006 |
| JP | 2008-513874 A | 5/2008 |

OTHER PUBLICATIONS

Tsividis, "Accurate Analysis of Temperature Effects in Ic-VBE Characteristics with Application to Bandgap Reference Sources", IEEE Journal of Solid-State Circuits, vol. SC-15, No. 6, Dec. 1980.

Malcovati et al., "Curvature-Compensated BiCMOS Bandgap with 1-V Supply Voltage", IEEE Journal of Solid-State Circuits, vol. 36, No. 7, Jul. 2001.

Pease, "A New Fahrenheit Temperature Sensor", IEEE Journal of Solid-State Circuits, vol. SC-19, No. 6, Dec. 1984.

Paul et al. "A Temperature-Compensated Bandgap Voltage Reference Circuit for High Precision Applications", India Annual Conference, 2004, Proceedings of the IEE INDICON 2004, First Publication Date: Dec. 20-22, 2004.

Paul et al., "Design of Second-Order Sub-Bandgap Mixed-Mode Voltage Reference Circuit for Low Voltage Applications", VLSI Design, 2005, 18th International Conference on Issue Date: Jan. 3-7, 2005.

Sundar, "A Low Power High Power Supply Rejection Ratio Bandgap Reference for Portable Applications", Massachusetts Institute of Technology, 2008.

European Search Report received in corresponding European Application No. 12772041 dated Sep. 5, 2014.

Communication Pursuant to Article 94(3) EPC received in corresponding European Application No. 12 772 041.5 dated Apr. 10, 2017.

Communication Pursuant to Article 94(3) EPC received in corresponding European Application No. 12 772 041.5 dated Feb. 16, 2018.

Korean Office Action received in corresponding Korean Application No. 10-2013-7026669 dated Jun. 27, 2018.

Communication Pursuant to Article 94(3) EPC received in corresponding European Application No. 12 772 041.5 dated Oct. 26, 2018.

* cited by examiner

Fig.12B
|  | TC/ppm/°C | ΔVbgr/V |
|---|---|---|
| BGR CORE CIRCUIT (FIG. 4) | 12.74 | 2.569m |
| BGR CORE CIRCUIT (FIG. 5) | 15.62 | 3.232m |
| REFERENCE VOLTAGE GENERATING CIRCUIT 1 | 3.161 | 0.2942m |
Fig.13A
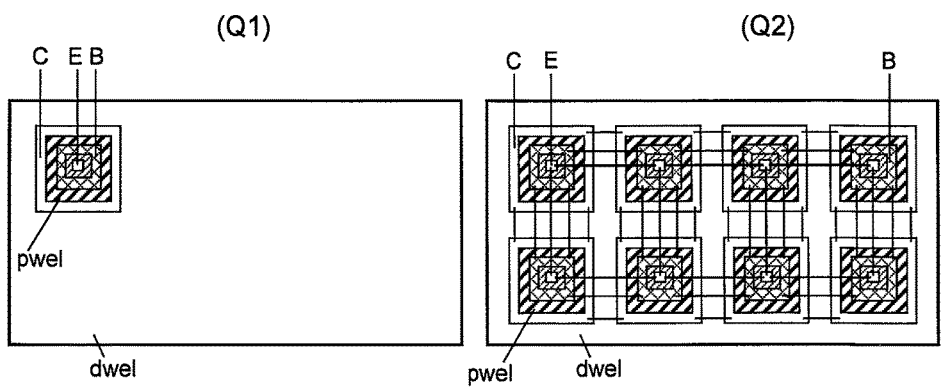
Fig.13B
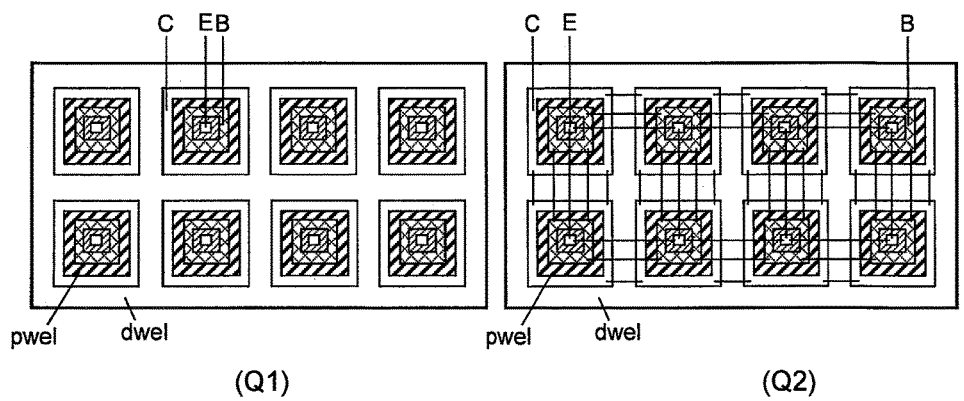

VOLTAGE GENERATING CIRCUIT

CROSS REFERENCE TO RELATED APPLICATION

This application is a divisional application of U.S. application Ser. No. 15/388,308, filed Dec. 22, 2016, which is a divisional application of U.S. application Ser. No. 14/009,715, filed Oct. 3, 2013, now U.S. Pat. No. 9,564,805, the entirety of the contents and subject matter of all of the above is incorporated herein by reference.

TECHNICAL FIELD

The present invention relates to a voltage generating circuit, and more particularly, to a technique that is effectively applied to a reference voltage generating circuit in a semiconductor integrated circuit.

BACKGROUND ART

In a semiconductor integrated circuit such as a system LSI, a reference voltage generating circuit for supply of a reference voltage to an A/D converter (ADC), a D/A converter (DAC), a regulator, a temperature sensor and the like inside an LSI is formed. Since performances of the above-mentioned functional sections significantly depend on the accuracy of the reference voltage, the reference voltage generating circuit needs to have low dependence on a semiconductor manufacturing process and temperature. Further, the reference voltage generating circuit needs to operate at a low power supply voltage. According to these needs, a band gap reference (hereinafter, referred to as "BGR") circuit that generates voltage on the basis of a band gap value of silicon is widely used for the reference voltage generating circuit.

NPL 1 and PTL 1 disclose an example of a BGR circuit in the related art. Further, PTL 2 discloses a BGR circuit that copes with the low power supply voltage.

It is known that the temperature dependence of a base-emitter voltage of a bipolar transistor (also referred to as a bipolar junction transistor (BJT)) that is a basic component of the BGR circuit is non-linear (for example, see NPL 2). NPL 3 discloses a BGR circuit that reduces non-linear temperature dependence of an output voltage. Further, NPLs 4 to 6 disclose an example of a correcting circuit or the like for correction of non-linear temperature dependence with respect to the BGR circuit disclosed in PTL 1. Further, NPL 7 discloses a method of correcting a temperature characteristic by a current ($I_{PTAT}^2$) that is proportional to the square of the absolute temperature.

CITATION LIST

Patent Literature

[PTL 1] U.S. Pat. No. 3,887,863
[PTL 2] U.S. Pat. No. 6,160,391

Non Patent Literature

[NPL 1] Kuijk, K. E, "A precision reference voltage source", IEEE JOURNAL OF SOLID-STATE CIRCUITS, VOL. sc-8, No. 3, JUNE 1973
[NPL 2] Tsividis, Y. P., "Accurate analysis of temperature effects in Ic-VBE characteristics with application to band gap reference sources", IEEE JOURNAL OF SOLID-STATE CIRCUITS, VOL. sc-15, No. 6, DECEMBER 1980
[NPL 3] P. Malcovati, "Curvature-Compensated BiCMOS Band gap with 1-V Supply Voltage", IEEE JOURNAL OF SOLID-STATE CIRCUITS, VOL. sc-36, No. 7, JULY 2001
[NPL 4] Pease, R. A., "A new Fahrenheit temperature sensor", IEEE JOURNAL OF SOLID-STATE CIRCUITS, VOL. sc-19, No. 6, DECEMBER 1984
[NPL 5] Paul, R. Patra, A., "A temperature-compensated band gap voltage reference circuit for high precision applications", India Annual Conference, 2004, Proceedings of the IEE INDICON 2004, First Publication Date: 20-22 Dec. 2004
[NPL 6] Paul, R. Patra, A. Baranwal, S. Dash, K., "Design of second-order sub-band gap mixed-mode voltage reference circuit for low voltage applications", VLSI Design, 2005, $18^{th}$ International Conference on Issue Date: 3-7 Jan. 2005
[NPL 7] Sundar, Siddharth, "A low power high power supply rejection ratio band gap reference for portable applications", Massachusetts Institute of Technology, 2008

DISCLOSURE OF THE INVENTION

Problems that the Invention is to Solve

In recent years, a BGR circuit in which the influence of offset of an amplifier that is a component of the BGR circuit or the influence of mismatching of a current mirror circuit that is another component of the BGR circuit is small, its operation is performed at a power supply voltage of 1 V or lower and voltage variation is small in a wide temperature range (for example, −55° C. to 160° C.) has been demanded.

However, the present inventors considered that the BGR circuit in the related art had, for example, the following problems.

A BGR circuit disclosed in NPL 1 that is a classic configuration among BGR circuits has a characteristic that the BGR circuit is influenced by offset of an amplifier and the variation of an output voltage is large. Further, the output voltage is about 1.2 V, and thus, it is further difficult to lower a power supply voltage of the BGR circuit. In addition, with respect to the temperature dependence, since only the temperature correction that is proportional to the absolute temperature is performed, it is difficult to suppress the variation of the output voltage in a wide temperature range.

A BGR circuit disclosed in PTL 1 that is similarly a classic configuration among the BGR circuits is less influenced by offset of an amplifier, compared with the BGR circuit disclosed in NPL 1. However, an output voltage is 1.2 V, and thus, it is difficult to lower a power supply voltage. Further, with respect to the temperature dependence, since only the temperature correction that is proportional to the absolute temperature is performed, it is difficult to suppress the variation of the output voltage in a wide temperature range.

A BGR circuit disclosed in PTL 2 has a circuit configuration in which the BGR circuit disclosed in NPL 1 is used as a base and its operation may be performed at a power supply voltage of 1 V or lower. However, in a similar way to the BGR circuit in NPL 1, dependence of the output voltage on offset of an amplifier and the temperature dependence thereof are high.

A BGR circuit disclosed in NPL 3 has a configuration in which the non-linear temperature dependence of the BGR circuit in PTL 2 is reduced, in which a low power supply voltage may be achieved and the temperature dependence may be reduced. However, dependence on offset of an amplifier is high.

A temperature correction method disclosed in NPL 7 is a correction method that uses a current $I_{PTAT}^2$ that changes from the absolute temperature 0 K, in which a temperature characteristic is not easily improved in a desired temperature range to be corrected. Although the temperature correction method in NPL 7 is employed, if an $I_{PTAT}^2$ current generating circuit disclosed in NPLs 4 to 6 is used for generating the current $I_{PTAT}^2$, the size of the circuit and the number of elements become large, which complicates a circuit configuration and is not suitable for a low power supply voltage.

An object of the invention is to provide a voltage generating circuit in which the influence of offset of an amplifier that is a component on an output voltage is reduced.

Another object of the invention is to provide a voltage generating circuit that is capable of being operated at a low power supply voltage.

Still another object of the invention is to provide a voltage generating circuit in which the temperature dependence of an output voltage is lowered.

The above and other objects and novel features of the invention will become apparent from the following description and the accompanying drawings.

Means for Solving the Problems

A summary of a representative embodiment of the invention disclosed herein will be briefly described as follows.

That is, a voltage generating circuit according to the representative embodiment of the invention includes a current generating section to generate a current obtained by adding a current based on a voltage difference between base-emitter voltages of two bipolar transistors and a current based on a forward voltage of a PN junction. The current generating section includes: a first bipolar transistor that includes an emitter terminal disposed on a first electric potential node side; a second bipolar transistor that has an emitter area larger than an emitter area of the first bipolar transistor, includes an emitter terminal at the same electric potential as in the emitter terminal of the first bipolar transistor and includes a base terminal disposed on a collector side of the first bipolar transistor; a first resistance element that is disposed on the collector side of the first bipolar transistor at one end thereof and is disposed on a base side of the first bipolar transistor at the other end thereof; a second resistance element that is disposed on a collector side of the second bipolar transistor at one end thereof and is connected to the other end of the first resistance element at the other end thereof; a third resistance element that is provided between a base terminal of the first bipolar transistor and the first electric potential node; an amplifier that receives, as inputs, voltages on the collector sides of two bipolar transistors and outputs a voltage based on a voltage difference between two input voltages; and a voltage-current converting section that receives, as an input, the output voltage of the amplifier, converts the received voltage into a current and supplies the converted current to a connection node of the first resistance element and the second resistance element. The voltage generating circuit converts the generated current into voltage to be output.

Effects of the Invention

Effects achieved by the representative embodiment of the invention disclosed herein are briefly described as follows.

That is, according to the voltage generating circuit of the invention, the influence of offset of an amplifier that is a component on an output voltage is reduced, and its operation may be performed at a low power supply voltage.

BRIEF DESCRIPTION OF THE DRAWINGS

FIGS. 12A and 12B are diagrams illustrating a simulation result of the temperature dependence of a reference voltage generating circuit.

FIGS. 13A to 13D are diagrams illustrating an example of layouts of bipolar transistors Q1 and Q2 in the BGR core circuit 10.

BEST MODE FOR CARRYING OUT THE INVENTION

1. Summary of the Embodiments

Figure 1:
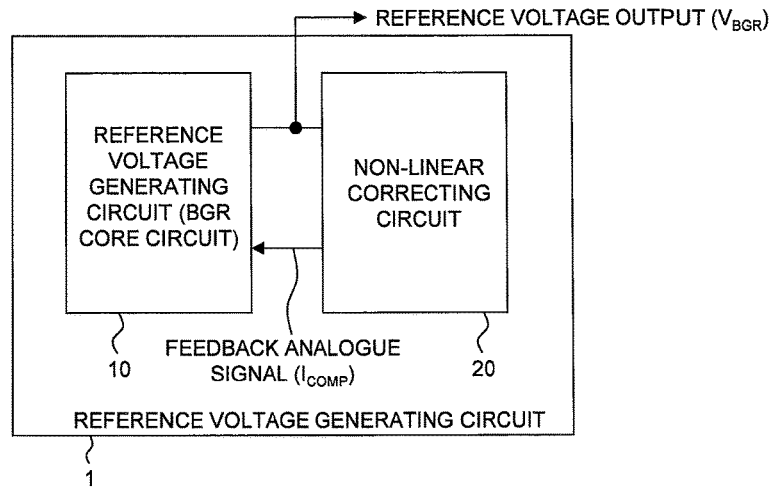
FIG. 1 is a block diagram illustrating an example of a reference voltage generating circuit according to a first embodiment.

First, the outlines of representative embodiments of the invention disclosed herein will be described. In the outlines of the representative embodiments, reference numerals in parentheses in the drawings merely illustrate that components given the reference numerals are included in the concept of the components.

[1] (BGR core circuit (FIG. 2, FIG. 34, FIG. 40 and the like))

A voltage generating circuit (1) includes: a current generating section (Q1, Q2, R1, R2, R3, A1, MP1 and MP2) that generates a current obtained by adding a current based on a voltage difference (ΔVBE) between base-emitter voltages of two bipolar transistors (Q1, Q2) having different emitter areas and a current based on a forward voltage of a PN junction, and an output section (R4) that converts an input current into a voltage and outputs the converted voltage. The current generating section includes a first bipolar transistor (Q2) that includes an emitter terminal disposed on a first electric potential node (power supply Vcc node/ground node) side; a second bipolar transistor (Q1) that has an emitter area larger than an emitter area of the first bipolar transistor, includes an emitter terminal at the same electric potential as in the emitter terminal of the first bipolar transistor and includes a base terminal disposed on a collector side of the first bipolar transistor; a first resistance element (R2) that is disposed on the collector side of the first bipolar transistor at one end thereof and is disposed on a base side of the first bipolar transistor at the other end thereof; a second resistance element (R1) that is disposed on a collector side of the second bipolar transistor at one end thereof and is connected to the other end of the first resistance element at the other end thereof; a third resistance element (R3) that is provided between a base terminal of the first bipolar transistor and the first electric potential node; an amplifier (A1) that receives, as inputs, a voltage on the collector side of the first bipolar transistor and a voltage on the collector side of the second bipolar transistor and outputs a voltage based on a voltage difference between two input voltages; and a voltage-current converting section (MP1, MP2) that receives, as an input, the output voltage of the amplifier, converts the received voltage into a current and supplies the converted current to a connection node (node of a voltage V3) of the first resistance element and the second resistance element and to the output section.

In the voltage generating circuit according to [1], by using the current generating section having the above configuration, it is possible to reduce the influence of offset of the amplifier on the current based on the voltage difference between the base-emitter voltages of the first bipolar transistor and the second bipolar transistor, and thus, it is possible to reduce the influence of the offset of the amplifier on the output voltage generated by the voltage generating section.

The BGR circuits disclosed in PTL 1 and NPL 1 as described above have a configuration in which a voltage VPTAT that is proportional to the absolute temperature (hereinafter, may also be referred to as "PTAT") is added to a base-emitter voltage VBE of the bipolar transistor to cancel a coefficient (linear coefficient) that is proportional to the temperature. Thus, considering that VBE is about 0.6 V, the output voltage becomes about 1.2 V, and thus, the power supply voltage is not suitable for a low power supply voltage operation and a low output voltage of 1 V or lower, for example. On the other hand, in the voltage generating circuit according to [1], since the current that flows in the third resistance element, based on the base-emitter voltage VBE of the first bipolar transistor, and the current (PTAT current) based on the voltage difference are added to cancel a coefficient that is proportional to the temperature and the added current is converted into a voltage to be output, it is possible to achieve a low power supply voltage operation and a low output voltage. Further, with respect to the above configuration of the current generating section, by providing the third resistance element between the base terminal of the first bipolar transistor and the first electric potential node, it is possible to easily generate the current based on the voltage difference between the base-emitter voltages.

[2] (BGR core circuit with R5 (FIG. 2, FIG. 42, FIG. 43 and the like))

In the voltage generating circuit according to [1], the current generating section includes a resistance element (R5) between the emitter terminal of the first bipolar transistor and the first electric potential node.

According to this configuration, it is possible to increase the common input voltages of the amplifier by the resistance element.

[3] (BGR core circuit with R7 (FIG. 35, FIG. 36, FIG. 41, FIG. 42))

In the voltage generating circuit according to [1] or [2], the current supply to the connection node of the first resistance element and the second resistance element from the voltage-current converting section is performed through a resistance element (R7).

According to this configuration, it is possible to decrease the common input voltages of the amplifier by the resistance element.

[4] (Voltage is divided to be input to amplifier (BGR core circuit 10L) (FIG. 37))

In the voltage generating circuit according to any one of [1] to [3], two voltages that are input to the amplifier include a voltage obtained by dividing a voltage of a collector terminal of the first bipolar transistor and a voltage obtained by dividing a voltage of a collector terminal of the second bipolar transistor.

According to this configuration, it is possible to decrease the common input voltages of the amplifier, and thus, it is possible to provide a PMOS differential input amplifier, for example, as the amplifier which makes the designing easy.

[5] (Voltage-current converting section having source degeneration configuration (FIG. 39))

In the voltage generating circuit according to any one of [1] to [4], the voltage-current converting section includes: a first MOS transistor (MP1) that is connected to a second electric potential node (ground node/power supply Vcc node) having a different electric potential from the first electric potential node through a resistance element (R16) at a source terminal thereof and is connected to the connection node of the first resistance element and the second resistance element at a drain terminal thereof; and a second MOS transistor (MP2) that is connected to the second electric potential node through a resistance element (R17) on a source side thereof and is connected to an input side of the output section on a drain side thereof, and the output voltage of the amplifier is input to gate terminals of the first MOS transistor and the second MOS transistor.

According to this configuration, it is possible to reduce mismatching of a current of the first MOS transistor and a current of the second MOS transistor by the degeneration resistances connected to the respective source sides of the first MOS transistor and the second MOS transistor.

[6] (BGR core circuit capable of independently generating IPTAT current (FIG. 28, FIG. 29, and FIGS. 31 to 33))

A voltage generating circuit (10D to 10H) according to another representative embodiment of the invention includes: a current generating section (MP1, MP2, MP5, R1, R2, Q1, Q2) that generates a first current based on a voltage difference between base-emitter voltages of two bipolar transistors having different emitter areas, and an output section that generates a second current based on a forward voltage of a PN junction on the basis of the first current and generates a voltage on the basis of the first current and the second current to output the generated voltage. The current generating section includes a first bipolar transistor (Q2) that includes an emitter terminal disposed on a first electric potential node side; a second bipolar transistor (Q1) that has an emitter area larger than an emitter area of the first bipolar transistor, includes an emitter terminal at the same electric potential as in the emitter terminal of the first bipolar transistor and includes a base terminal disposed on a collector side of the first bipolar transistor; a first resistance element (R2) that is disposed on the collector side of the first bipolar transistor at one end thereof and is disposed on a base side of the first bipolar transistor at the other end thereof; a second resistance element (R1) that is disposed on a collector side of the second bipolar transistor at one end thereof and is connected to the other end of the first resistance element at the other end thereof; an amplifier (A1) that receives, as inputs, a voltage on the collector side of the first bipolar transistor and a voltage on the collector side of the second bipolar transistor and outputs a voltage based on a voltage difference between two voltages; and a voltage-current converting section (MP1, MP2) that receives, as an input, the output voltage of the amplifier, converts the received voltage into a current and supplies the converted current to a connection node (node of electric potential V3) of the first resistance element and the second resistance element and to the output section.

According to this configuration, in a similar way to [1], it is possible to reduce the influence of the offset of the amplifier on the output voltage, and to achieve a low power supply voltage operation and a low output voltage. Further, the following effect is achieved. For example, in the voltage generating circuit according to [1], the current generating section generates the current (the first current in [6]) based on the voltage difference between the base-emitter voltages of two bipolar transistors having the different emitter areas and the current (the second current in [6]) based on the forward voltage of the PN junction and outputs the current obtained by adding two currents, but in the voltage generating circuit according to [6], the current generating section outputs the first current. That is, according to the voltage generating circuit according to [6], it is possible to independently output the current (the first current) that is proportional to the absolute temperature, and to easily generate the PTAT voltage.

[7] (Configuration of output stage of BGR core circuit 10D (FIG. 28))

In the voltage generating circuit according to [6], the output section includes: a voltage generating section (Q4) that is connected to the first electric potential node at one end thereof and generates a voltage based on the forward voltage of the PN junction on the basis of a current that is input to the other end thereof; a third resistance element (R9) that is connected to the first electric potential node at one end thereof; and a fourth resistance element (R8) that is provided between the other end side of the voltage generating section and the other end side of the third resistance element, and the first current is supplied to each node to which the fourth resistance element is connected.

According to this configuration, since the current based on the forward voltage and the first current flow in the third resistance element to generate the output voltage, it is easy to achieve a low power supply voltage operation and a low output voltage.

[8] (Configuration of output stage of BGR core circuit 10 and the like (FIG. 2 and the like))

In the voltage generating circuit according to any one of [1] to [5], the output section is a fourth resistance element (R4) that is connected to the first electric potential node at one end thereof and receives an input of a current at the other end thereof.

According to this configuration, it is possible to easily generate the output voltage.

[9] (BGR core circuit that uses NPN bipolar transistor (FIG. 2 and the like))

In the voltage generating circuit according to any one of [1] to [8], the first bipolar transistor and the second bipolar transistor are NPN bipolar transistors.

[10] (BGR core circuit that uses PNP bipolar transistor (FIGS. 40 to 43))

In the voltage generating circuit according to any one of [1] to [8], the first bipolar transistor and the second bipolar transistor are PNP bipolar transistors.

[11] (BGR core circuit and temperature correcting circuit (FIG. 2 and the like))

In the voltage generating circuit according to any one of [1] to [10], the voltage generating circuit further includes: a correcting circuit (20, 20A, 20B) that generates a correcting current ($I_{COMP}$) based on a difference between the voltage ($V_{BGR}$) generated by the output section and the forward voltage of the PN junction and feeds back the correcting current to the current generating section.

In the voltage generating circuit according to [1], the current that flows in the third resistance element, based on the base-emitter voltage VBE of the first bipolar transistor, and the current (PTAT current) based on the voltage difference are added to cancel the coefficient that is proportional to the temperature and the added current is converted into the output voltage to improve the temperature characteristic of the output voltage. However, as described above, since the temperature dependence of the base-emitter voltage is non-linear, the output voltage has the non-linear temperature dependence. Thus, in the voltage generating circuit according to [11], the correcting current having a non-linear temperature characteristic is generated according to the difference between the output voltage of the voltage generating section and the forward voltage of the PN junction, and is fed back to the current generating section to improve the non-linear temperature dependence of the output current of the current generating section. Thus, it is possible to improve the non-linear temperature dependence of the output voltage, and to reduce the variation of the output voltage in a wide temperature range. Further, by generating the current based on the difference between two voltages (output voltage and forward voltage) having the temperature dependence, it is possible to generate a correcting current that is changed in a temperature range where the temperature characteristic is to be corrected. According to this configuration, it is easy to perform correction compared with a case where the temperature characteristic is corrected using the PTAT current that uses the absolute temperature 0 K as a starting point and a PTAT2 current (current that is proportional to the square of the absolute temperature).

[12] (Specific configuration of correcting circuit (FIG. 2, FIG. 21, FIG. 23 and FIG. 25))

In the voltage generating circuit according to [11], the correcting circuit includes: a third bipolar transistor (Q3) that is connected to the first electric potential node through a fifth resistance element (R6) at an emitter terminal thereof and is connected to an output side of the voltage generating section at a base terminal thereof; and a current mirror section (MP3, MP4) that outputs a current based on a current that flows in a collector terminal of the third bipolar transistor.

According to this configuration, it is possible to easily generate the correcting current.

[13] (Feedback destination of correcting current is R3 (FIG. 19, FIG. 21))

In the voltage generating circuit according to [11] or [12], the correcting current is fed back to the third resistance element.

According to this configuration, the feedback of the correcting current to the current generating section becomes easy.

[14] (Feedback destination of correcting current is R5 (FIG. 2, FIG. 27))

In the voltage generating circuit according to [11] or [12], the emitter terminal of the first bipolar transistor is connected to the first electric potential node through a resistance element (R5), and the correcting current is fed back to the emitter terminal of the first bipolar transistor.

According to this configuration, the feedback of the correcting current to the current generating section becomes easy, and it is possible to increase the common input voltages to the amplifier by the resistance element.

[15] (Feedback destination of correcting current is electric potential VB side (FIG. 23))

In the voltage generating circuit according to [11] or [12], the correcting current is fed back to the one end of the second resistance element.

According to this configuration, the feedback of the correcting current to the current generating section becomes easy.

[16] (Feedback destination of correcting current is resistance R4 (FIG. 25))

In the voltage generating circuit according to [8], the voltage generating circuit further includes: a correcting circuit that generates a correcting current based on a difference between the voltage generated by the output section and the forward voltage of the PN junction and feeds back the correcting current to the fourth resistance element (R4).

According to this configuration, the feedback of the correcting current to the voltage generating section becomes easy.

[17] (Addition of voltage follower A2 (FIG. 2 and the like))

In the voltage generating circuit according to [12], the correcting circuit further includes a buffer circuit (A2) that receives the output voltage of the voltage generating section as an input and buffers the received voltage to output the result to the base terminal of the third bipolar transistor.

According to this configuration, it is possible to prevent the influence of the voltage generating section on the output voltage due to a base current of the third bipolar transistor.

[18] (Another embodiment of current mirror section (FIG. 23))

In the voltage generating circuit according to [12] or [17], the current mirror section is a low voltage current mirror circuit (MP3, MP4, MN3, MN4).

According to this configuration, it is possible to achieve a low power supply voltage of the correcting circuit.

[19] (BGR core circuit (including output of 1.2 V) and non-linear correcting circuit (FIG. 44, FIG. 46, FIG. 47, FIG. 48, FIG. 2 and the like))

A voltage generating circuit (1 to 9, 11) according to another representative embodiment of the invention includes: a voltage generating section (10, 10A to 10Q, 71, 75) that generates a voltage obtained by adding a voltage difference between base-emitter voltages of two bipolar transistors (Q1, Q2) that are operated at different current densities and a forward voltage of a PN junction at a predetermined ratio and outputs the result; and a correcting circuit (20, 20A, 20B) that generates a correcting current ($I_{COMP}$) based on a difference between the voltage generated by the voltage generating section and the forward voltage of the PN junction and feeds back the correcting current to the voltage generating section.

According to this configuration, in a similar way to [11], it is possible to improve the non-linear temperature dependence of the output voltage, and to reduce the variation of the output voltage in a wide temperature range. Further, it is easy to perform correction compared with a case where the temperature characteristic is corrected using the PTAT current that uses the absolute temperature 0 K as a starting point and a $PTAT^2$ current (current that is proportional to the square of the absolute temperature).

[20] (Non-linear correcting circuit corresponding to output of 1.2 V (FIG. 44 and FIG. 46))

In the voltage generating circuit according to [19], the correcting circuit includes: a first bipolar transistor (Q5) that is connected to a first electric potential node (ground node) through a first resistance element (R6, R62) at an emitter terminal thereof and is diode-connected; a second bipolar transistor (Q7) that is connected to a collector side of the first bipolar transistor at an emitter terminal thereof and is connected to an output side of the voltage generating section at a collector terminal and a base terminal thereof that are diode-connected; and a current output section (Q6, Q8, MP1, MP2) that outputs a current based on a current that flows in the first resistance element.

According to this configuration, as the first bipolar transistor and the second bipolar transistor are stacked at two stages, even in a case where the output voltage of the voltage generating section is about 1.2 V, for example, it is easy to generate the correcting current.

[21] (Non-linear correcting circuit corresponding to output of 1.2 V (FIG. 47))

In the voltage generating circuit according to [19], the correcting circuit includes: a first bipolar transistor (Q9) that is connected to a first electric potential node through a first resistance element (R6) at an emitter terminal thereof and is diode-connected; a second bipolar transistor (Q10) that is connected to a collector side of the first bipolar transistor at an emitter terminal thereof and is connected to an output side of the voltage generating section at a base terminal thereof; and a current mirror circuit (MP11, MP12) that outputs a current based on a current that flows on a collector side of the second bipolar transistor.

According to this configuration, as the first bipolar transistor and the second bipolar transistor are stacked at two stages, even in a case where the output voltage of the voltage generating section is about 1.2 V, for example, it is easy to generate the correcting current.

[22] (BGR core circuit 71 having output of 1.2 V (FIG. 44, FIG. 46 and FIG. 47))

In the voltage generating circuit according to any one of [19] to [21], the voltage generating section includes: a third bipolar transistor (Q2) that is connected to the first electric potential node through a second resistance element (R22) at a collector terminal thereof; a fourth bipolar transistor (Q1) that has an emitter area larger than the emitter area of the third bipolar transistor and is connected to the first electric potential node through a third resistance element (R21) at a collector terminal thereof; a fourth resistance element (R20) that is provided between an emitter terminal of the third bipolar transistor and an emitter terminal of the fourth bipolar transistor; and a fifth resistance element (R23) that is provided between the emitter terminal of the second bipolar transistor and a second electric potential node, and the correcting current is fed back to the fifth resistance element.

According to this configuration, even with respect to the BGR circuit that outputs about 1.2 V, it is possible to easily realize correction of the non-linear temperature characteristic.

[23] (BGR core circuit and temperature correcting circuit (MOSTr) (FIG. 27))

In the voltage generating circuit (6) according to [1] to [10], the voltage generating circuit further includes: a correcting circuit (20C) that generates a correcting current ($I_{COMP}$) based on a difference between the voltage generated by the output section (10) and a gate-source voltage of a MOS transistor (MN5, MN6) that is operated in a sub threshold region and feeds back the correcting current to the current generating section.

Since a characteristic of the sub threshold region of the MOS transistor is a characteristic that is close to an $I_C$–$V_{BE}$ characteristic of the bipolar transistor, according to the voltage generating circuit according to [23], by generating the current based on the difference between two voltages (output voltage and $V_{GS}$ voltage) having the temperature dependence, it is possible to generate a correcting current that is changed in a temperature range where the temperature characteristic is to be corrected. Thus, in a similar way to [11] or the like, it is possible to improve the non-linear temperature dependence of the output voltage, and to reduce the variation of the output voltage in a wide temperature range. Further, it is easy to perform correction compared with a case where the temperature characteristic is corrected using the PTAT current that uses the absolute temperature 0 K as a starting point and a $PTAT^2$ current (current that is proportional to the square of the absolute temperature). Further, since the bipolar transistor is not used in the correcting circuit, it is possible to realize the correcting circuit in a CMOS process.

[24] (Specific configuration of temperature correcting circuit (MOSTr))

In the voltage generating circuit according to [23], the correcting circuit includes: a first MOS transistor (MN 6) that includes a gate terminal disposed on an output side of the output section; a fourth resistance element (R6) that is connected to the first electric potential node at one end thereof; one or plural of second MOS transistors (MN5) that are provided between a source terminal of the first MOS transistor and the other end of the fourth resistance element and include a gate terminal and a drain terminal that are at the same electric potential; and a current mirror section (MP3, MP4) that outputs a current based on a current that flows on a drain side of the first MOS transistor.

According to this configuration, for example, by adjusting the number of stages of the second MOS transistor, it is possible to operate the MOS transistor in the sub threshold region, and to easily generate the correcting current.

2. Further Detailed Description of the Embodiments

The embodiments will be described in detail.

First Embodiment

FIG. 1 is a block diagram illustrating an example of a reference voltage generating circuit according to a first embodiment.

A reference voltage generating circuit 1 shown in FIG. 1 includes a voltage generating circuit (hereinafter, referred to as a BGR core circuit) 10 that generates and outputs a reference voltage $V_{BGR}$, and a non-linear correcting circuit (hereinafter, simply referred to as a correcting circuit) 20 that generates a correcting current for correcting a temperature characteristic of the reference voltage $V_{BGR}$ according to the reference voltage $V_{BGR}$ and feeds back the result to the BGR core circuit.

Figure 2:
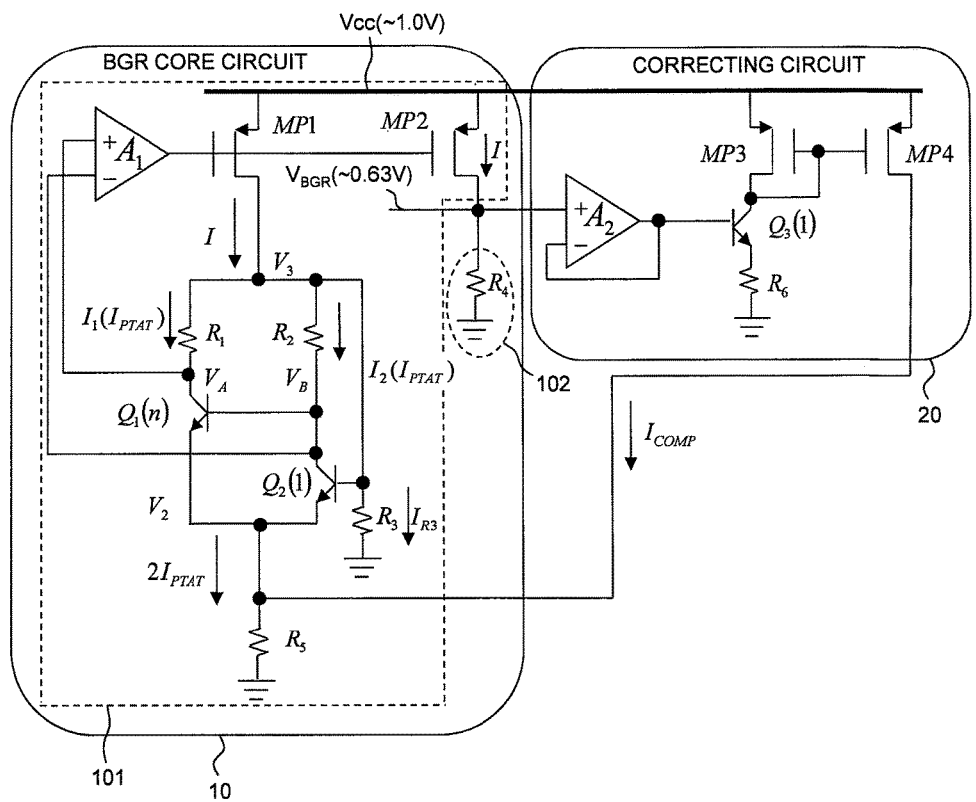
FIG. 2 is a circuit diagram illustrating an example of a specific configuration of the reference voltage generating circuit according to the first embodiment.

FIG. 2 is a circuit diagram illustrating an example of a specific configuration of the reference voltage generating circuit 1. Although there is no particular limitation, the reference voltage generating circuit 1 shown in FIG. 2 is formed on a single semiconductor substrate made of single crystal silicon or the like by a known CMOS integrated circuit manufacturing technique.

A BGR core circuit 10 shown in FIG. 2 generates, by a current generating section 101, a current obtained by adding a current based on a voltage difference (ΔVBE) of base-emitter voltages of two bipolar transistors Q1 and Q2 having different emitter areas and a current based on a base-emitter voltage VBE2 of the bipolar transistor Q2, and converts the generated current into a voltage $V_{BGR}$ for output by a voltage output section 102.

The current generating section 101 includes NPN bipolar transistors Q1 and Q2, resistances R1, R2, R3 and R5, a differential amplifier A1, and P-channel MOS transistors MP1 and MP2, for example. Further, the voltage output section 102 includes a resistance R4, for example. Connection relationships of the respective elements are as follows.

The bipolar transistors Q1 and Q2 are connected in common at emitter terminals thereof. The emitter area of the bipolar transistor Q1 is set to be n (n is an integer of 2 or greater) times larger than that of the bipolar transistor Q2. That is, when the same current flows in the bipolar transistors Q1 and Q2, the emitter current density of the bipolar transistor Q2 is set to be n times the emitter current density of the transistor Q1. The resistance R1 is connected to a base terminal of the bipolar transistor Q2 at one end thereof, and is connected to a collector terminal of the bipolar transistor Q1 at the other end thereof. The resistance R2 is connected to the resistance R1 at one end thereof, and is connected to a collector terminal of the bipolar transistor Q2 at the other end thereof. The resistance R5 is provided between the emitter terminals at which the bipolar transistors Q1 and Q2 are connected in common and a ground node. The resistance R3 is provided between the base terminal of the bipolar transistor Q2 and the ground node. The differential amplifier A1 receives, as inputs, respective electric potentials on the collector sides of the bipolar transistors Q1 and Q2, respectively. The MOS transistors MP1 and MP2 respectively receive, as an input, an output voltage of the differential amplifier A1 at their gate terminals, and are connected to a power supply node Vcc at their source terminals. As a drain terminal of the MOS transistor MP1 is connected to a connection node of the resistances R1 and R2, a feedback loop is formed. Further, as a drain terminal of the MOS transistor MP2 is connected to the resistance R4, a current I is supplied to the resistance R4. A detailed operational principle of the BGR core circuit 10 will be described later.

The correcting circuit 20 shown in FIG. 2 includes an amplifier A2 that receives, as an input, the output voltage $V_{BGR}$ of the BGR core circuit 10 and forms a voltage follower; a bipolar transistor Q3 of which a base terminal is connected to an output terminal of the amplifier A2; a resistance R6 that is provided between an emitter terminal of the bipolar transistor Q3 and the ground node; and P-channel MOS transistors MP3 and MP4 that form a current mirror circuit that outputs a correcting current $I_{COMP}$ according to a current that flows on a collector side of the bipolar transistor Q3. Although there is no particular limitation, the correcting current $I_{COMP}$ is fed back to the resistance R5. With such a feedback method, high accuracy is not necessary in an element circuit such as an amplifier or a current mirror used for the correcting circuit, and thus, it is possible to improve the accuracy without large area or additional current. The amplifier A2 is provided to supply a base current of the bipolar transistor Q3, and may not be provided in a case where the influence on the output voltage $V_{BGR}$ due to direct supply of the base current from the MOS transistor MP2 is negligible. A detailed operational principle of the correcting circuit 20 will be described later.

Hereinafter, an operational principle of the reference voltage generating circuit 1 will be described in detail with reference to the BGR core circuit 10 and the correcting circuit 20.

(1) BGR Core Circuit 10

For ease of understanding about the BGR core circuit 10, a detailed description will be made using FIG. 3 that illustrates only the BGR core circuit 10.

Figure 3:
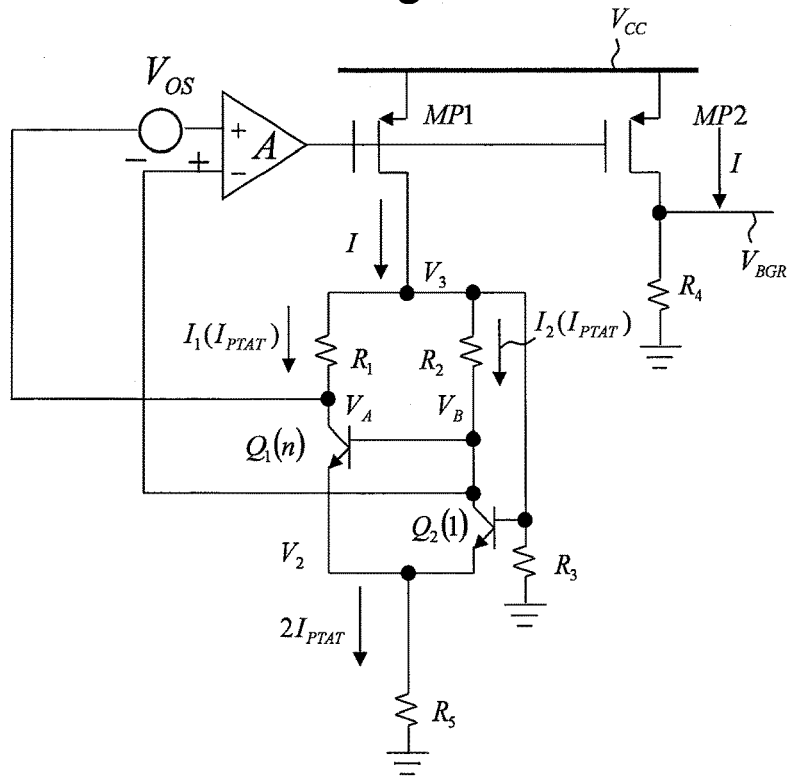
FIG. 3 is a circuit diagram illustrating an example of a BGR core circuit 10 in a reference voltage generating circuit 1.

FIG. 3 is a circuit diagram illustrating an example of the BGR core circuit 10 in the reference voltage generating circuit 1. In FIG. 3, a case where an offset of an amplifier is inserted in a positive side input of the amplifier A1 as an input offset voltage $V_{OS}$ and to be equivalently represented is shown as an example.

In FIG. 3, it is assumed that a current that flows through the resistance R1 is $I_1$, a current that flows through the resistance R2 is $I_2$, a current that flows through MP1 and MP2 is I, a voltage at a junction point of the resistance R1 and the resistance R2 is V3, and $R_1=R_2=R_{12}$. Further, in the following description, it is assumed that the mirror ratio of the current mirror circuit or the like is 1:1, but the mirror ratio may be changed without particular limitation.

For ease of understanding, in the following description, the base current of the bipolar transistor is neglected for calculation, but in a simulation or the like in actual design, the calculation is performed in consideration of the base current.

When a saturation current density of the bipolar transistor is Js, a unit area is A, a thermal voltage VT=kt/q, k is a Boltzmann constant, T is the absolute temperature, and q is an elementary charge, Formula 1 is established with respect to a base-emitter voltage VBE1 of Q1 and a base-emitter voltage VBE2 of Q2.

$$V_{BE1} = V_T \ln\left(\frac{I_1}{nJ_sA}\right), V_{BE2} = V_T \ln\left(\frac{I_2}{J_sA}\right) \quad \text{(Formula 1)}$$

If the feedback by the amplifier A1 is normally operated, Formula 2 is established.

$$R_{12}I_2 + V_{BE1} = V_{BE2} \quad \text{(Formula 2)}$$

If Formula 1 is substituted in Formula 2, Formula 3 is established.

$$I_2 = \frac{V_{BE2} - V_{BE1}}{R_{12}} = \frac{V_T \ln\left(\frac{I_2}{J_s A}\right) - V_T \ln\left(\frac{I_1}{n J_s A}\right)}{R_{12}} = \frac{V_T \ln\left(\frac{I_2}{I_1} n\right)}{R_{12}} \quad \text{(Formula 3)}$$

Further, Formula 4 is established from the Kirchhoff's voltage law from the node of the electric potential V3 to the input of the amplifier A1. If Formula 4 is simplified, Formula 5 is established as the relationship between the currents $I_1$ and $I_2$. If the current $I_2$ is deleted from Formula 3 and Formula 5, Formula 6 that is an approximate formula may be established. Here, it is assumed that $V_{OS}/I_1 \cdot R_{12} \ll 1$.

$$V_3 - R_{12}I_1 + V_{OS} = V_3 - R_{12}I_2 \quad \text{(Formula 4)}$$

$$I_2 = I_1 - \frac{V_{OS}}{R_{12}} \quad \text{(Formula 5)}$$

$$I_1 - \frac{V_{OS}}{R_{12}} = \frac{V_T \ln\left(\frac{I_2}{I_1} n\right)}{R_{12}} = \frac{V_T \ln\left(\frac{I_1 - \frac{V_{OS}}{R_{12}}}{I_1} n\right)}{R_{12}} = \frac{V_T \ln\{(1 - V_{OS}/I_1 R_{12})n\}}{R_{12}} \sim \frac{V_T}{R_{12}}\left\{\ln(n) - \frac{V_{OS}}{I_1 R_{12}}\right\} \quad \text{(Formula 6)}$$

Here, if a quadratic equation with respect to $I_1$ in Formula 6 is solved, $I_1$ is expressed as Formula 7A. Here, D is expressed as Formula 7B.

$$I_1 = \frac{\sqrt{D} + V_T \ln(n) + V_{OS}}{2R_{12}} \quad \text{(Formula 7A)}$$

$$D = (V_T \ln(n))^2 + \{2\ln(n) - 4\}V_{OS}V_T + V_{OS}^2 \quad \text{(Formula 7B)}$$

Accordingly, the output voltage $V_{BGR}$ may be expressed as Formula 8. Further, as obvious from Formula 8, by setting the resistance ratio to be R4<R3, the output voltage $V_{BGR}$ may be a low output voltage (about 1.0 V or less).

$$V_{BGR} = R_4 I = R_4\left(\frac{V_{BE2}}{R_3} + I_1 + I_2\right) = R_4\left(\frac{V_{BE2}}{R_3} + 2I_1 - \frac{V_{OS}}{R_{12}}\right)$$

$$= R_4\left(\frac{V_{BE2}}{R_3} + 2I_1 - \frac{V_{OS}}{R_{12}}\right) = R_4\left(\frac{V_{BE2}}{R_3} + 2\frac{V_T \ln(n) + V_{OS}}{2R_{12}} - \frac{V_{OS}}{R_{12}}\right) \quad \text{(Formula 8)}$$

If $\Delta V_{BGR}$ that indicates an error from $V_{OS}=0$ of the output voltage $V_{BGR}$ is calculated on the basis of Formula 8, Formula 9 is obtained.

$$\Delta V_{BGR} \equiv R_4\left\{\frac{\Delta V_{BE2}}{R_3} + R_1\left(2\Delta I_1 - \frac{V_{OS}}{R}\right)\right\} \quad \text{(Formula 9)}$$

-continued $$= R_4\left\{\frac{V_T}{R_3}\ln\left(\frac{I_2}{I_2(V_{OS}=0)}\right) + \left(2\frac{\sqrt{D} - V_T \ln(n) + V_{OS}}{2R_{12}} - \frac{V_{OS}}{R_{12}}\right)\right\}$$

$$= R_4\left\{\frac{V_T}{R_3}\ln\left(\frac{I_2}{I_2(V_{OS}=0)}\right) + \left(\frac{\sqrt{D} - V_T \ln(n)}{R_{12}}\right)\right\}$$

In Formula 9, for example, when $R_3$=315 k$\Omega$, $R_4$=160 k$\Omega$, $R_{12}$=66 k$\Omega$, n=8 and VT=26 mV (in a case where the temperature is 27° C.), $\Delta V_{BGR}$ in the case of $V_{OS}$=10 mV is about 2.54 mV.

Here, in order to compare operations and effects of the BGR core circuit 10 according to the present embodiment with a BGR circuit in the related art, an operational principle of the related art BGR circuit will be described with reference to FIGS. 4 and 5.

Figure 4:
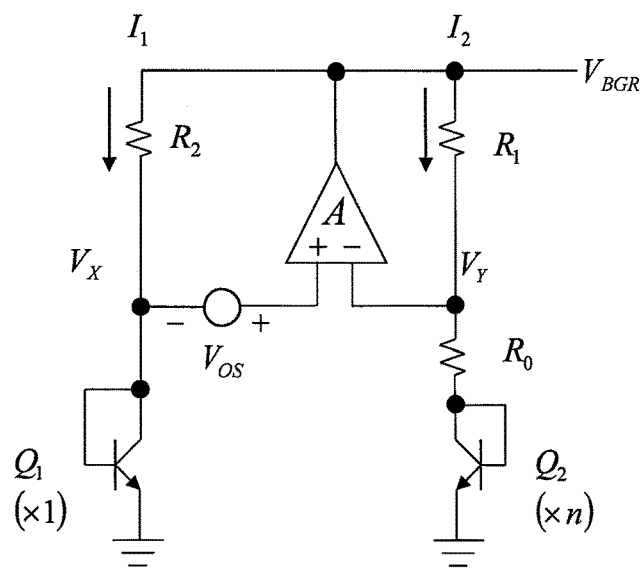
FIG. 4 is a circuit diagram illustrating an example of an analysis BGR core circuit reviewed on the basis of NPL 1.

FIG. 4 is a circuit diagram illustrating an example of an analysis BGR core circuit reviewed on the basis of NPL 1. In FIG. 4, a case where an offset voltage $V_{OS}$ is inserted in a positive side input of an amplifier A is shown as an example. In FIG. 4, it is assumed that the emitter area ratio of bipolar transistors Q1 and Q2 is 1:n, currents are $I_1$ and $I_2$, a saturation current density of the bipolar transistor is Js, a unit area is A, and $R_1=R_2=R_{12}$.

In FIG. 4, Formula 10 is established with respect to a base-emitter voltage VBE1 of Q1 and a base-emitter voltage VBE2 of Q2.

$$V_{BE1} = V_T \ln\left(\frac{I_1}{J_s A}\right), \quad V_{BE2} = V_T \ln\left(\frac{I_2}{n J_s A}\right) \quad \text{(Formula 10)}$$

If the feedback by the amplifier is normally operated, Formula 11 is established.

$$V_{BE1} + V_{OS} = V_{BE2} + R_0 I_2 \quad \text{(Formula 11)}$$

If Formula 10 is substituted in Formula 11, Formula 12A is established. That is, Formula 12B is established.

$$V_T \ln\left(\frac{I_1}{J_s A}\right) + V_{OS} = V_T \ln\left(\frac{I_2}{n J_s A}\right) + R_0 I_2 \quad \text{(Formula 12A)}$$

$$I_2 = \frac{V_T \ln\left(\frac{I_1}{I_2} n\right) + V_{OS}}{R_0} \quad \text{(Formula 12B)}$$

Further, Formula 13 is established from the Kirchhoff's voltage law from a power supply voltage $V_{BGR}$ to the input of the amplifier A, and Formula 14 is established from the relationship between the currents $I_1$ and $I_2$. Thus, Formula 15 that is an approximate formula may be obtained. Here, it is assumed that $V_{OS}/I_1 \cdot R_{12} \ll 1$.

$$V_{BGR} - R_{12}I_1 + V_{OS} = V_{BGR} - R_{12}I_2 \quad \text{(Formula 13)}$$

$$I_1 = I_2 + \frac{V_{OS}}{R_{12}} \quad \text{(Formula 14)}$$

$$I_2 = \frac{V_T \ln\left(\frac{I_2 + \frac{V_{OS}}{R_{12}}}{I_2} n\right) + V_{OS}}{R_0} \sim \frac{V_T\left\{\ln(n) + \frac{V_{OS}}{I_2 R_{12}}\right\} + V_{OS}}{R_0} \quad \text{(Formula 15)}$$

Here, since the Formula 15 may be changed into a simple quadratic equation, if a quadratic equation with respect to $I_2$ is solved, $I_2$ is expressed as Formula 16A. Here, D is expressed as Formula 16B.

$$I_2 = \frac{\sqrt{D} + V_T \ln(n) R_{12} + V_{OS} R_{12}}{2R_0 R_{12}} \quad \text{(Formula 16A)}$$

$$D = (V_T \ln(n) R_{12})^2 + (4R_{12}R_0 + 2\ln(n)R_{12}^2)V_{OS}V_T + R_{12}^2 V_{OS}^2 \quad \text{(Formula 16B)}$$

Accordingly, the output voltage $V_{BGR}$ may be expressed as Formula 17.

$$V_{BGR} = V_{BE1} + R_{12}I_1 = V_{BE1} + R_{12}I_1 = \quad \text{(Formula 17)}$$
$$V_{BE1} + R_{12}\left(\frac{\sqrt{D} + V_T \ln(n) R_{12} + V_{OS} R_{12}}{2R_0 R_{12}} + \frac{V_{OS}}{R_{12}}\right)$$

As shown in Formula 17, the output voltage $V_{BGR}$ has a configuration in which a linear coefficient that is proportional to the temperature is canceled by adding a second term and thereafter to VBE. Accordingly, the output voltage $V_{BGR}$ is about 1.2 V, and thus, it can be understood that the BGR circuit disclosed in NPL 1 is not suitable for a low power supply voltage operation and a low output voltage in which a power supply voltage is 1 V or lower, for example. Further, in Formula 8 and Formula 17, when comparing the second terms that indicate the current $I_1$ ($I_2$) according to the voltage difference between the base-emitter voltages VBE of the bipolar transistors Q1 and Q2, while the offset voltage $V_{OS}$ is handled in a direction of addition in the BGR core circuit in FIG. 4, the offset voltage $V_{OS}$ is handled in a direction of subtraction in the BGR core circuit 10 according to the present embodiment. That is, it is understood that in the BGR core circuit 10 according to the present embodiment, the influence of the offset voltage $V_{OS}$ on the output voltage $V_{BGR}$ is small. Specifically, if $\Delta V_{BGR}$ that indicates an error from $V_{OS}=0$ of the output voltage $V_{BGR}$ of the BGR core circuit in FIG. 4 is calculated, Formula 18 is obtained.

$$\Delta V_{BGR} \equiv \Delta V_{BE1} + R_{12}\Delta I_1 = V_T \ln\left(\frac{I_1}{I_1(V_{OS}=0)}\right) + \quad \text{(Formula 18)}$$
$$R_{12}\left(\frac{\sqrt{D} - V_T \ln(n) R_{12} + V_{OS} R_{12}}{2R_0 R_{12}} + \frac{V_{OS}}{R_{12}}\right)$$

In Formula 18, for example, when $R_{12}$=827.45 kΩ, $R_0$=100 kΩ, n=8 and VT=26 mV (in a case where the temperature is 27° C.), $\Delta V_{BGR}$ in the case of $V_{OS}$=10 mV is about 91.8 mV. It can be understood that the error of the output voltage $V_{BGR}$ due to the offset voltage $V_{OS}$ is larger than that of the BGR core circuit 10 according to the present embodiment.

Figure 5:
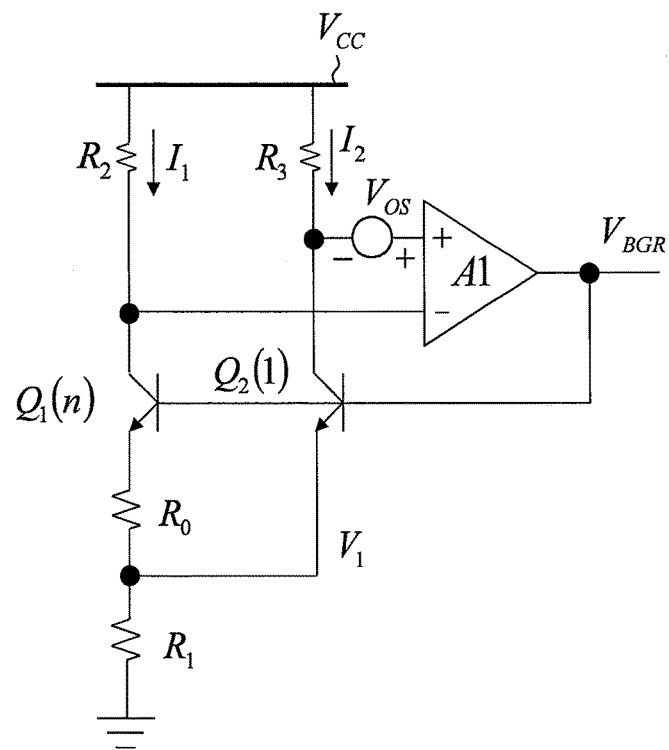
FIG. 5 is a diagram illustrating an example of an analysis BGR core circuit reviewed on the basis of PTL 1.

FIG. 5 is a diagram illustrating an example of an analysis BGR core circuit reviewed on the basis of PTL 1 as another example in the related art.

In FIG. 5, a case where an offset voltage $V_{OS}$ is inserted in a positive side input of an amplifier A is shown as an example. In FIG. 5, assuming that a current that flows through a collector side of a bipolar transistor Q1 is $I_1$, a current that flows through a collector side of a bipolar transistor Q2 is $I_2$, a saturation current density of the bipolar transistor is Js, and a unit area is A, and R2=R3=R, Formula 19 is established with respect to a base-emitter voltage VBE1 of Q1 and a base-emitter voltage VBE2 of Q2.

$$V_{BE1} = V_T \ln\left(\frac{I_1}{nJ_s A}\right), \quad V_{BE2} = V_T \ln\left(\frac{I_2}{J_s A}\right) \quad \text{(Formula 19)}$$

If the feedback by the amplifier is normally operated, Formula 20 is established.

$$R_0 I_1 + V_{BE1} = V_{BE2} \quad \text{(Formula 20)}$$

Further, Formula 21 is established from the Kirchhoff's voltage law from a power supply Vcc to the input of the amplifier A, and Formula 22 is established from the relationship between the currents $I_1$ and $I_2$. Thus, Formula 23 that is an approximate formula may be established. Here, it is assumed that $V_{OS}/I_1 \cdot R \ll 1$.

$$V_{CC} - RI_1 = V_{CC} - RI_2 + V_{OS} \quad \text{(Formula 21)}$$

$$I_2 = I_1 + \frac{V_{OS}}{R} \quad \text{(Formula 22)}$$

$$I_1 = \frac{V_{BE2} - V_{BE1}}{R_0} = \quad \text{(Formula 23)}$$
$$\frac{V_T \ln\left(\frac{I_2}{I_1} n\right)}{R_0} = \frac{V_T \ln\left(\frac{I_1 + \frac{V_{OS}}{R}}{I_1} n\right)}{R_0} \sim \frac{V_T}{R_0}\left\{\ln(n) + \frac{V_{OS}}{I_1 R}\right\}$$

Here, similarly, if a quadratic equation with respect to $I_1$ is solved, $I_1$ is expressed as Formula 24A. Here, D is expressed as Formula 24B.

$$I_1 = \frac{\sqrt{D} + V_T \ln(n) R}{2R_0 R} \quad \text{(Formula 24A)}$$

$$D = (V_T \ln(n) R)^2 + 4RR_0 V_{OS} V_T \quad \text{(Formula 24B)}$$

Accordingly, the output voltage $V_{BGR}$ may be expressed as Formula 25.

$$V_{BGR} = V_{BE2} + R_1(I_1 + I_2) = V_{BE2} + R_1\left(2I_1 + \frac{V_{OS}}{R}\right) \quad \text{(Formula 25)}$$
$$= V_{BE2} + R_1\left(2\frac{\sqrt{D} + V_T \ln(n) R}{2R_0 R} + \frac{V_{OS}}{R}\right)$$

As shown in Formula 25, the output voltage $V_{BGR}$ has a configuration in which a linear coefficient that is proportional to the temperature is canceled by adding a second term and thereafter to VBE. Accordingly, in a similar way to the BGR circuit in FIG. 4, the output voltage $V_{BGR}$ is about 1.2 V, and thus, it can be understood that the BGR circuit disclosed in PTL 1 is not suitable for a low power supply voltage operation and a low output voltage in which a power supply voltage is 1 V or lower, for example.

Here, if $\Delta V_{BGR}$ that indicates an error from $V_{OS}=0$ of the output voltage $V_{BGR}$ is calculated, Formula 26 is obtained.

$$\Delta V_{BGR} \equiv \Delta V_{BE2} + R_1\left(2\Delta I_1 + \frac{V_{OS}}{R}\right) = \quad \text{(Formula 26)}$$

$$V_T \ln\left(\frac{I_2}{I_2(V_{OS}=0)}\right) + \left(\frac{\sqrt{D} - V_T \ln(n)R}{2R_0 R}\right)$$

In Formula 26, for example, when R=540 kΩ, R₀=38 kΩ, n=8 and VT=26 mV (in a case where the temperature is 27° C.), $\Delta V_{BGR}$ in the case of $V_{OS}$=10 mV is 7.01 mV, in which the error of the output voltage $V_{BGR}$ is 1/10 or less compared with that of the BGR core circuit in FIG. 4.

Figure 6:
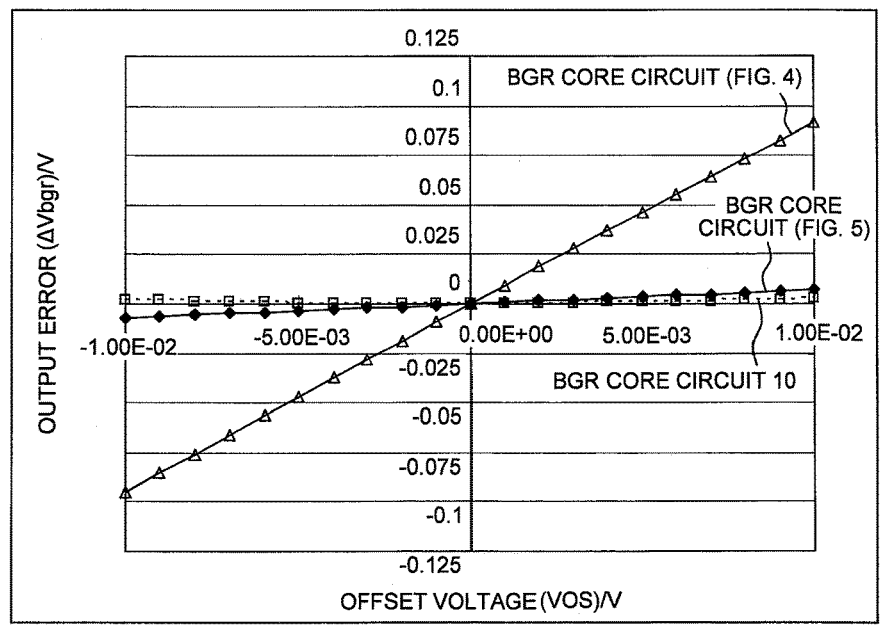
FIG. 6 is a diagram quantitatively illustrating input offset voltage dependence of an output voltage $V_{BGR}$.

FIG. 6 is a diagram quantitatively illustrating input offset voltage dependence of the output voltage $V_{BGR}$ in each BGR core circuit.

Characteristic lines of respective BGR core circuits in FIG. 6 represent respective characteristics of $4V_{BGR}$ when the offset voltages $V_{OS}$ in Formula 9, Formula 18 and Formula 26 are changed. The numerical value examples in the description of the above-mentioned BGR core circuits are applied to constants of resistance values or the like in Formula 9, Formula 18 and Formula 26.

As shown in FIG. 6, it can be understood that the BGR core circuit 10 according to the present embodiment has a low input offset voltage dependence compared with a topology of the circuit in FIG. 4.

Figure 7:
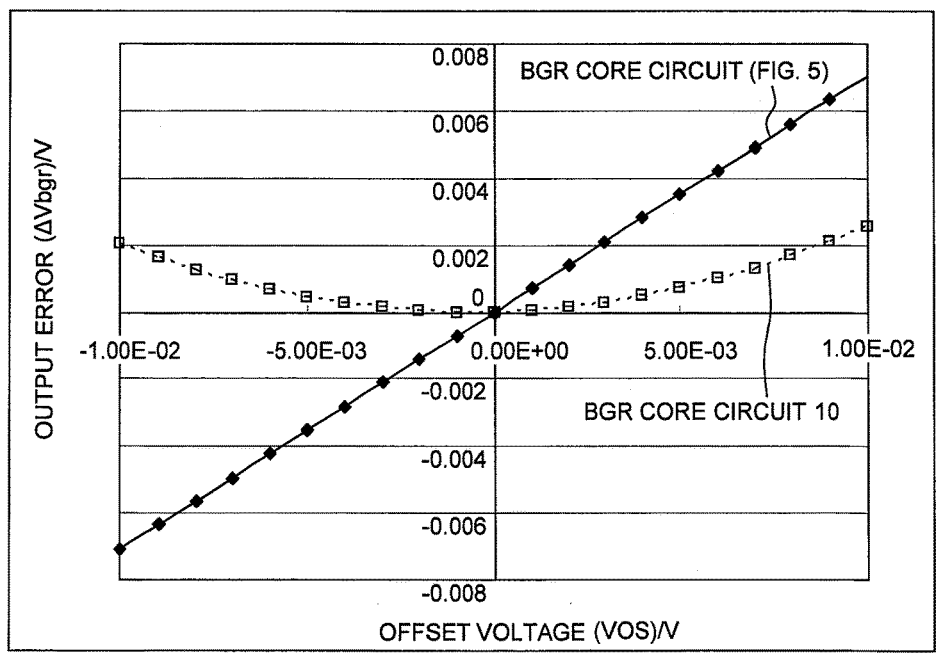
FIG. 7 is an enlarged view of FIG. 6.

FIG. 7 is an enlarged view of FIG. 6. In FIG. 7, characteristic lines of the BGR core circuit 10 and the BGR core circuit (FIG. 5) based on PTL 1 are shown.

As shown in FIG. 7, it can be understood that the BGR core circuit 10 according to the present embodiment has a low input offset voltage dependence compared with a topology of the circuit in FIG. 5. As obvious from Formula 9, it is possible to suppress the variation of the output voltage $V_{BGR}$ compared with the BGR core circuit in FIG. 5 by selecting appropriate values as resistance values and an emitter area ratio n of the bipolar transistors.

Figure 8:
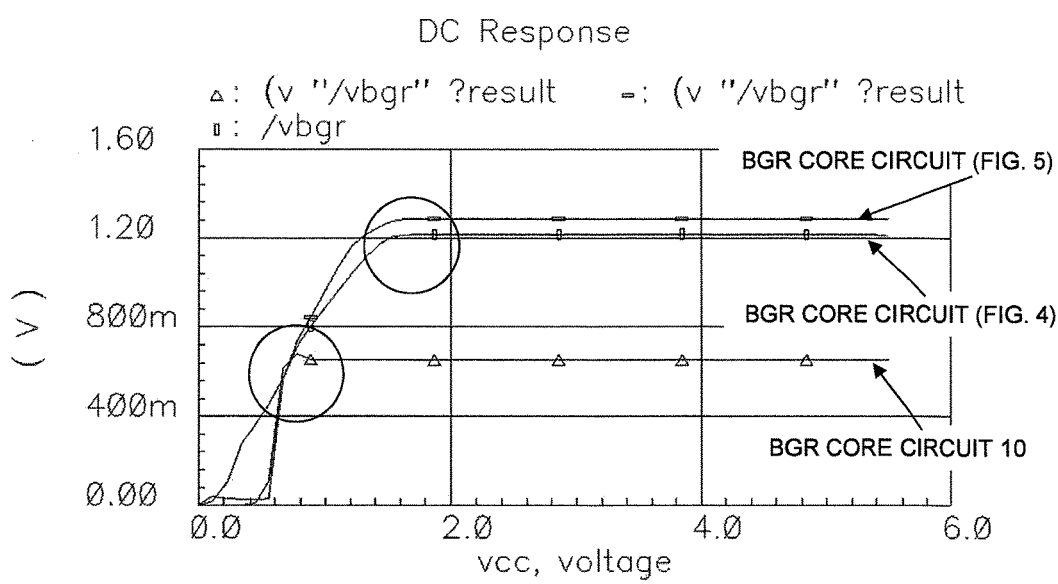
FIG. 8 is a diagram illustrating simulation results of respective BGR core circuits.

FIG. 8 is a diagram illustrating simulation results of three BGR core circuits. Element conditions in simulation are as follows. That is, a gate length in a CMOS process is 90 nm, MOS transistors are used, and resistances and capacitances of a Typ model are used. In FIG. 8, when a junction temperature Tj is 25° C., an output voltage $V_{BGR}$ when the power supply voltage Vcc is changed from 0 V to 5.5 V is shown.

As shown in FIG. 8, since the output voltages $V_{BGR}$ of the BGR core circuit in FIG. 4 and the BGR core circuit in FIG. 5 are about 1.2 V, the power supply voltage Vcc may be operated from about 2.0 V. This is also easily understood from the fact that the output voltage $V_{BGR}$ has the configuration in which the linear coefficient that is proportional to the temperature is canceled by adding a PTAT voltage to VBE, as shown in Formula 17 and Formula 25.

On the other hand, in the BGR core circuit 10 according to the present embodiment, as shown in FIG. 8, it can be understood that the output voltage $V_{BGR}$ is 1.0 V or lower and the power supply voltage Vcc may be operated from about 1.0 V. This is easily understood from Formula 8. That is, since the BGR core circuit 10 according to the present embodiment has the configuration in which the coefficient that is proportional to the temperature is canceled by adding the current that flows through the resistance R3, based on VBE of the bipolar transistor Q2, and a PTAT current that is proportional to the absolute temperature and the added current is converted into a voltage by the resistance R4 to be output, it is possible to obtain a low voltage output by adjusting the ratio of the resistance R3 and the resistance R4.

As described above, according to the BGR core circuit 10 according to the present embodiment, it is possible to reduce the influence of offset of the amplifier A1 on the output voltage $V_{BGR}$. Further, since the low output voltage $V_{BGR}$ may be generated by adjusting the ratio of the resistance R3 and the resistance R4, the BGR core circuit 10 may be operated at a lower power supply voltage Vcc. Further, as shown in FIGS. 2 and 3, as the resistance R5 is inserted between the emitter terminal of the bipolar transistors Q1 and Q2 and the ground node, it is possible to shift a common input voltage of the amplifier A1 to be high, which makes it possible to achieve an easy design.

(2) Correcting Circuit 20

A principle of the temperature correction in the correcting circuit 20 will be described.

First, the temperature dependence of a base-emitter voltage $V_{BE}$ of a bipolar transistor will be described. The temperature dependence of the base-emitter voltage is expressed as Formula 28 when the temperature dependence of a collector current IC is expressed as Formula 27 as shown in the above-mentioned NPL 2.

$$I_C \propto T^m \quad \text{(Formula 27)}$$

$$V_{BE}(T) = V_{G0}\left(1 - \frac{T}{T_R}\right) + \frac{T}{T_R}V_{BE}(T_R) - (\eta - m)\frac{kT}{q}\ln\left(\frac{T}{T_R}\right) \quad \text{(Formula 28)}$$

Here, $T_R$ represents a reference temperature. Further, η is a constant depending on a device structure of a bipolar transistor, and has a value of about 3.6 to 4.0. $V_{G0}$ is an extrapolation value of a band gap voltage to the absolute temperature 0 K. As described above, m is "1" in a case where the collector current Ic is proportional to the absolute temperature. Formula 28 is changed into Formula 29.

$$V_{BE}(T) = \quad \text{(Formula 29)}$$

$$\left\{V_{G0} + (\eta - m)\frac{kT_R}{q}\right\} - \frac{V_{G0} + (\eta - m)\frac{kT_R}{q} - V_{BE}(T_R)}{T_R}T +$$

$$(\eta - m)\frac{k}{q}\left\{T - T_R - T\ln\left(\frac{T}{T_R}\right)\right\}$$

In Formula 29, the first term is a constant that does not depend on the temperature, and the second term is a term that is proportional to the absolute temperature. Further, the third term is a term that is not proportional to the absolute temperature and shows non-linear dependence. That is, the base-emitter voltage VBE shows non-linear dependence on the temperature.

Figure 9:
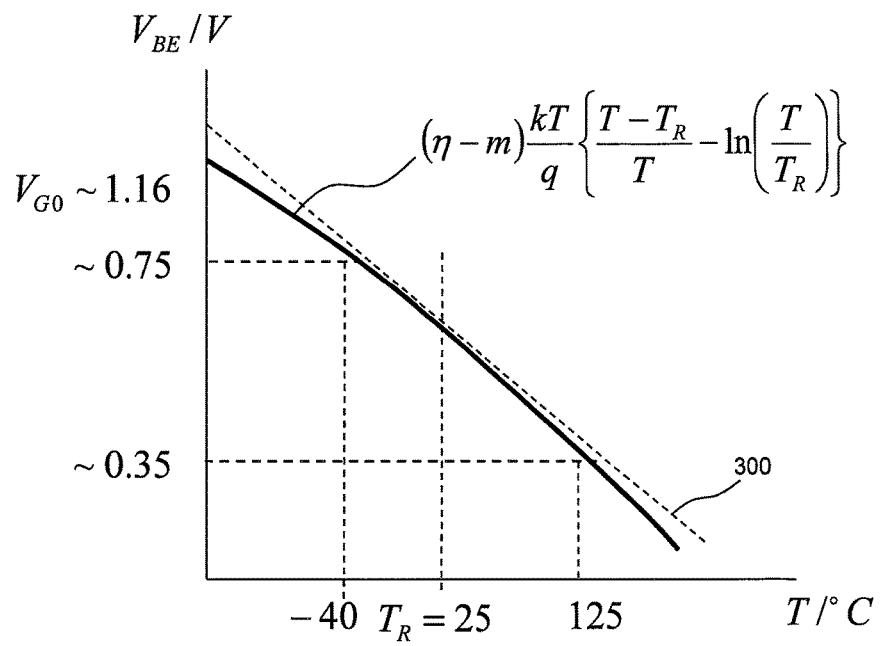
FIG. 9 is a diagram illustrating non-linear dependence of a base-emitter voltage VBE on temperature.

FIG. 9 is a diagram illustrating the non-linear dependence of the base-emitter voltage VBE on the temperature.

As shown in FIG. 9, a characteristic of the third term in Formula 29 is a non-linear characteristic. A straight line indicated by reference numeral 300 is shown for comparison, which is an example of a characteristic that is proportional to the temperature.

A general formula (for example, Formula 8, Formula 17, and Formula 25) of the BGR circuit shown in (1) the BGR core circuit 10 described above may be expressed as Formula 30A or Formula 30B when constants determined by the resistance ratio are K and L. Here, $\Delta V_{BE}$ is a voltage difference of base-emitter voltages VBE of two bipolar transistors Q1 and Q2.

$$V_{BGR} = V_{BE} + K\Delta V_{BE} = V_{BE} + K'V_T = V_{BE} + K'\frac{kT}{q} \quad \text{(Formula 30A)}$$

$$V_{BGR} = \quad \text{(Formula 30B)}$$
$$LV_{BE} + K\Delta V_{BE} = LV_{BE} + K'V_T = LV_{BE} + K'\frac{kT}{q} < 1.2\text{ V}$$

As understood from Formula 30A and Formula 30B, since the temperature dependence of the base-emitter voltage VBE of the first term shows the non-linearity, it can be understood that it is logically impossible to correct the non-linear temperature dependence by only the second term that is proportional to the absolute temperature. Thus, in the reference voltage generating circuit 1 according to the present embodiment, correction of the non-linear temperature dependence of the output voltage $V_{BGR}$ is performed by the following method.

In FIG. 2, an electric potential at the junction point of the resistance R5 and the emitter terminal of the bipolar transistors Q1 and Q2 is set to V2, and the correcting current is set to $I_{COMP}$. Further, for ease of understanding, it is assumed that $R_1 = R_2 = R_{12}$, and $I_1 = I_2 = I_{PTAT}$. Here, $I_{PTAT}$ may be expressed as Formula 31 by $V_{BE2} = V_{BE1} + R_{12} \cdot I_{PTAT}$.

$$I_{PTAT} = \frac{V_{BE2} - V_{BE1}}{R_{12}} = \frac{\Delta V_{BE}}{R_{12}} = V_T \frac{\ln(n)}{R_{12}} \propto T \quad \text{(Formula 31)}$$

Next, since a current I is expressed as Formula 32 from the Kirchhoff's current law and a current $I_{R3}$ that flows through the resistance R3 is expressed as Formula 33, the current I is expressed as Formula 34.

$$I = 2I_{PTAT} + I_{R3} \quad \text{(Formula 32)}$$

$$I_{R3} = \frac{V_{BE2} + V_2}{R_3} = \frac{V_{BE2} + (2I_{PTAT} + I_{COMP})R_5}{R_3} \quad \text{(Formula 33)}$$

$$I = 2I_{PTAT} + \frac{V_{BE2} + (2I_{PTAT} + I_{COMP})R_5}{R_3} \quad \text{(Formula 34)}$$

Accordingly, the output voltage $V_{BGR}$ is expressed as Formula 35.

$$V_{BGR} = R_4 I = R_4 \left\{ 2I_{PTAT} + \frac{V_{BE2} + (2I_{PTAT} + I_{COMP})R_5}{R_3} \right\} \quad \text{(Formula 35)}$$
$$= R_4 \left\{ 2I_{PTAT} + \frac{V_{BE2} + (2I_{PTAT} + I_{COMP})R_5}{R_3} \right\}$$
$$= R_4 \left\{ \frac{V_{BE2}}{R_3} + \left(2 + \frac{2R_5}{R_3}\right)I_{PTAT} + \frac{I_{COMP}R_5}{R_3} \right\}$$

It is possible to lower the output voltage $V_{BGR}$ by adjusting the resistance R3 and the resistance R4 in a similarly way to the above-described BGR core circuit 10 in FIG. 3.

Further, the correcting current $I_{COMP}$ may be expressed as Formula 36 by setting the mirror ratio of MP3 and MP4 to 1:1.

$$I_{COMP} = \frac{V_{BGR} - V_{BE3}}{R_6} \quad \text{(Formula 36)}$$

As shown in Formula 36, the correcting current $I_{COMP}$ is generated on the basis of a voltage difference of the output voltage $V_{BGR}$ and a base-emitter voltage VBE3 of the bipolar transistor Q3. Since $V_{BGR} V_{BE3}$ on low temperature side, the correcting current $I_{COMP}$ does not flow, and on high temperature side, the correcting current $I_{COMP}$ is added from the temperature at which $V_{BGR} = V_{BE3}$. Thus, the correcting current $I_{COMP}$ is expressed as Formula 37.

$$I_{COMP} = \begin{cases} 0 & (V_{BGR} \leq V_{BE3}) \\ \dfrac{V_{BGR} - V_{BE3}}{R_6} & (V_{BGR} \geq V_{BE3}) \end{cases} \quad \text{(Formula 37)}$$

Accordingly, in the reference voltage generating circuit 1, the non-linearity of the base-emitter terminal VBE that is the first term in Formula 35 is linearly corrected by IPTAT that is the second term, and is non-linearly corrected by the correcting current $I_{COMP}$ that is the third term. Further, by generating the correcting current $I_{COMP}$ according to a difference between two voltages (the output voltage $V_{BGR}$ and the base-emitter voltage $V_{BE3}$) with the temperature dependence, it is possible to add the correcting current $I_{COMP}$ from the temperature at which $V_{BGR} = V_{BE3}$. Further, it is possible to control the inclination of the correcting current $I_{Comp}$ by the value of the resistance R6. Thus, if the characteristic of $V_{BGR}$ is adjusted so that $V_{BGR} = V_{BE3}$ in a desired temperature range where the temperature characteristic is to be corrected, it is possible to correct the non-linear temperature characteristic.

The above calculation is an approximate calculation. In actuality, a loop is formed between the BGR core circuit 10 and the correcting circuit 20 to cause feedback, and thus, the values of the resistance, the correcting current $I_{COMP}$ and the like show some variances from the above calculation. Precise values may be calculated by simulation. Further, in this example, since it is assumed that the power supply voltage Vcc is about 1.0 V and the output voltage $V_{BGR}$ is set to be about 0.63 V, the bipolar transistor Q3 of the correcting circuit 20 has a single-stage configuration, but as described later, in a case where the output voltage is about 1.2 V, it is preferable that the bipolar transistor Q3 of the correcting circuit 20 have a double-stage configuration.

Figure 10:
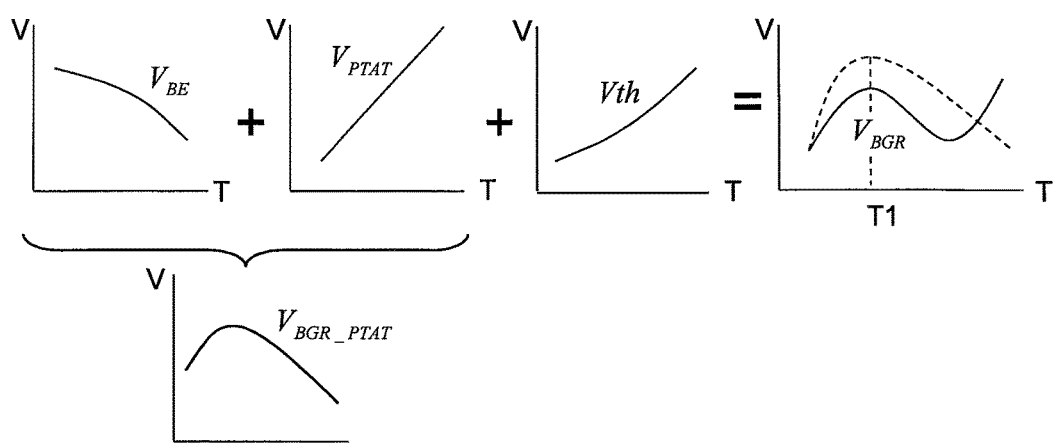
FIG. 10 is a diagram illustrating a principle of a method of correcting a non-linear temperature characteristic by the reference voltage generating circuit 1.

FIG. 10 is a diagram illustrating a principle of a method of correcting a non-linear temperature characteristic by the reference voltage generating circuit 1.

In FIG. 10, VBGR_PTAT shows an example of a waveform in a case where only correction using the voltage VPTAT that is proportional to the absolute temperature is performed for the base-emitter voltage VBE when the correcting current $I_{COMP}$ is neglected. Further, the voltage VBGR_PTAT has a bowl shape, and shows a case where a circuit constant of a resistance value or the like is adjusted so that the temperature at which a temperature coefficient is zero is achieved on low temperature side. Further, Vth shows an example of a voltage waveform corresponding to the third term in Formula 35. As shown in FIG. 10, in the reference voltage generating circuit 1, by adding the voltage Vth that increases on high temperature side from the temperature T1 at which $V_{BGR} = V_{BE3}$, it is possible to reduce the temperature dependence of the output voltage $V_{BGR}$.

Here, in order to compare operations and effects of the non-linear correcting circuit 20 according to the present embodiment with the BGR circuit in the related art, the temperature correction method in the related art will be described.

Figure 11:
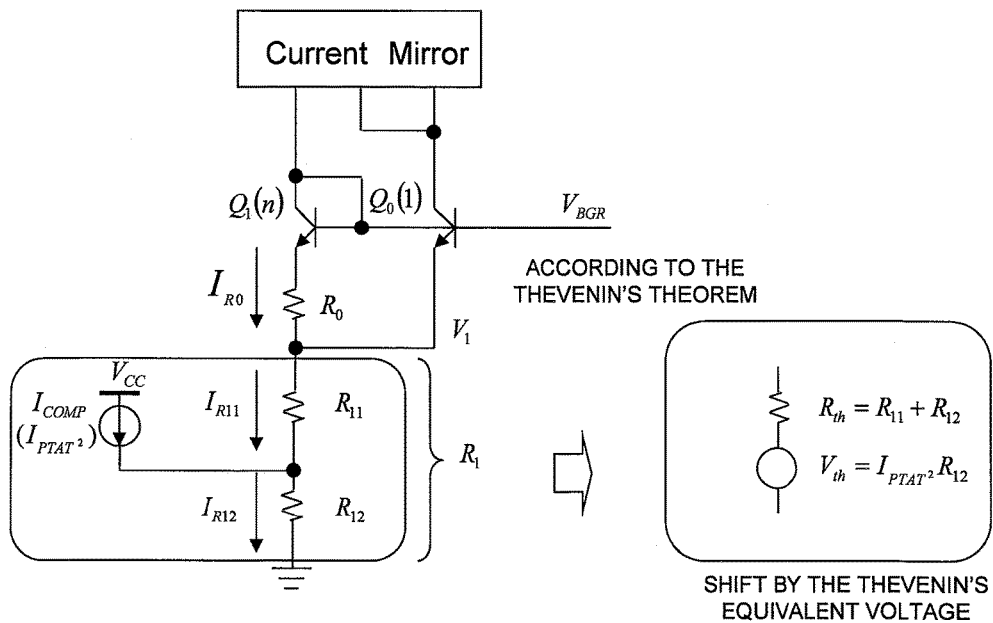
FIG. 11 is a diagram illustrating a correction principle of a non-linear characteristic for a BGR circuit reviewed on the basis of PTL 1.

FIG. 11 is a diagram illustrating a correction principle of a non-linear characteristic for a BGR circuit reviewed on the basis of PTL 1.

In FIG. 11, a resistance R1 is divided into two resistances R11 and R12, an electric potential of a node between R11 and R12 is represented as $V_2$, and respective currents of R11 and R12 are represented as $I_{R11}$ and $I_{R12}$.

An output voltage $V_{BGR}$ in a case where a correcting current $I_{COMP}$ is not added is expressed as Formula 38.

$$V_{BGR} = V_{BE1} + 2\frac{\Delta V_{BE}}{R_0}(R_{11} + R_{12}) \quad \text{(Formula 38)}$$

In this circuit, the correcting current $I_{COMP}$ that is not proportional to the absolute temperature is supplied to a node of an electric potential V2 for correction of the non-linear characteristic. Here, it is assumed that a current $I_{PTAT}^2$ that is proportional to the square of the absolute temperature is set as the correcting current $I_{COMP}$. In this case, since Formula 39 is established according to the Thevenin's theorem, as shown in FIG. 11, a circuit between a node of an electric potential V1 and a ground node may be re-drawn as a serial connection of a resistance Rth and a voltage source Vth.

$$R_{th} = R_{11} + R_{12}, V_{th} = R_{12} I_{PTAT}^2 \quad \text{(Formula 39)}$$

That is, the Thevenin's equivalent voltage VTH has a characteristic (non-linear characteristic) that increases on high temperature side. Accordingly, an output voltage $V_{BGR}$ in a case where the correcting current $I_{COMP}$ ($I_{PTAT}^2$) is added is expressed as Formula 40.

$$V_{BGR} = V_{BE1} + 2\frac{\Delta V_{BE}}{R_0}(R_{11} + R_{12}) + I_{comp} R_{12} \quad \text{(Formula 40)}$$

As shown in Formula 40, if a non-linear correction term (the third term) based on the current $I_{PTAT}^2$ that is proportional to the square of the absolute temperature is added, it is understood that a temperature characteristic of $V_{BGR}$ is formed in a cubic curve and a temperature drift is reduced. As described above, in which a reference voltage source should have a flat temperature characteristic in a predetermined temperature range (for example, −55° C. to 160° C.). Thus, in a case where the temperature correction is performed, it is preferable to perform correction in a necessary temperature range. However, for example, in a case where the current $I_{PTAT}^2$ is generated by the $I_{PTAT}^2$ current generating circuit disclosed in NPL 3 to NPL 5, the current becomes a current that is changed from the absolute temperature 0 K. Thus, as shown in Formula 40, the output voltage $V_{BGR}$ becomes a value in which the non-linear correction term ($I_{comp} \cdot R_{p12}$) is added from the absolute temperature 0 K. This is not suitable for a case where a temperature characteristic in a predetermined temperature range is to be improved. Actually, the present inventors reviewed in advance and found that it is difficult to realize an appropriate temperature correction in the correction method of adding $I_{PTAT}^2$ using the $I_{PTAT}^2$ current generating circuit. Further, in the $I_{PTAT}^2$ current generating circuit, both of the size of the circuit and the number of elements are increased, which complicates a circuit configuration and is not suitable for a low voltage. On the other hand, according to the non-linear correcting circuit 20 according to the present embodiment, it is possible to generate the correcting current $I_{COMP}$ by a simple circuit configuration in which the number of elements is small, and to generate the correcting current $I_{COMP}$ to be changed at a predetermined temperature or higher. Thus, it is possible to easily perform non-linear correction of the output voltage $V_{BGR}$ in a desired temperature range.

Figure 12A:
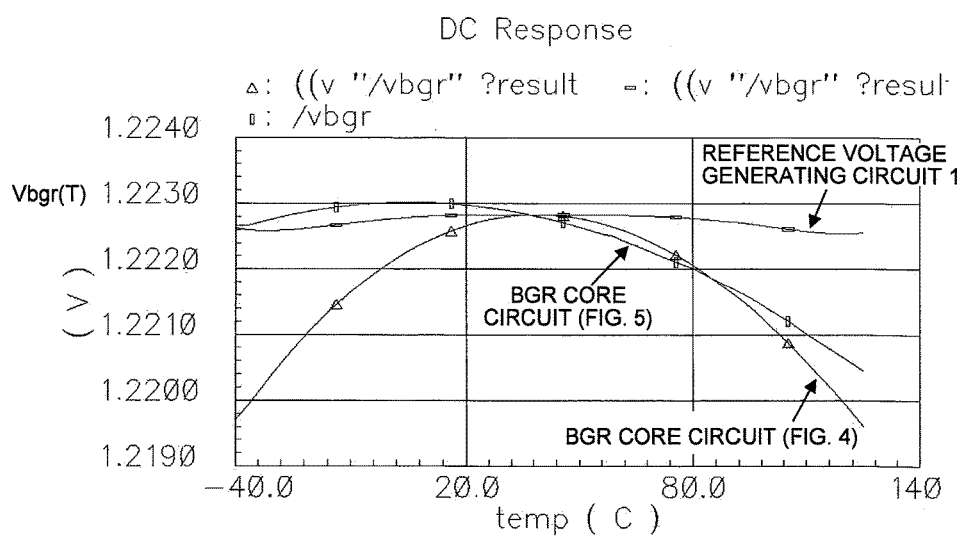

FIGS. 12A and 12B are diagrams illustrating an example of the temperature dependence of a reference voltage generating circuit according to a simulation. In FIGS. 12A and 12B, simulation results of respective output voltages $V_{BGR}$ of the reference voltage generating circuit 1, the BGR circuit (FIG. 4) based on NPL 1 and the BGR circuit (FIG. 5) based on PTL 1 are shown.

In FIG. 12A, characteristic waveforms of three circuits are shown, and in FIG. 12B, values of a temperature coefficient TC (ppm/° C.) and a temperature drift $\Delta V_{BGR}$ (mV) that is a voltage variation due to the temperature change are shown. The temperature coefficient TC is defined as Formula 41A by the BOX method, and the temperature drift $\Delta V_{BGR}$ (mV) is defined as Formula 41B.

$$TC = \frac{1}{V_{ave}} \frac{V_{BGR\ max} - V_{BGR\ min}}{T_{max} - T_{min}} \text{ (ppm/C.)} \quad \text{(Formula 41A)}$$

$$\Delta V_{BGR} = (V_{BGR\ max} - V_{BGR\ min}) \text{ (mV)} \quad \text{(Formula 41B)}$$

In the simulation, a device model is used in which elements such as a MOS transistor, a resistance and a capacitance, manufactured in a standardized manner by a CMOS process having a gate length of 90 nm, are assumed to be provided. The power supply voltage Vcc is set to 3.0 V for the BGR circuit (FIG. 4) based on NPL 1 and the BGR circuit (FIG. 5) based on PTL 1 since it is difficult to achieve a low power supply voltage, and is set to 1.0 V for the reference voltage generating circuit 1. A temperature variable range is −40° C. to 125° C. Since the output voltage $V_{BGR}$ of the reference voltage generating circuit 1 is 1.0 V or lower (about 0.63 V), a characteristic line of the output voltage $V_{BGR}$ of the reference voltage generating circuit 1 is moved in parallel upward on the vertical axis for comparison in FIG. 12A.

As shown in FIGS. 12A and 12B, since the BGR circuit (FIG. 4) based on NPL 1 and the BGR circuit (FIG. 5) based on PTL 1 are only linearly corrected, the temperature drift $\Delta V_{BGR}$ (mV) is from about 2.6 mV to about 3.2 mV, which is large, but in the reference voltage generating circuit 1, it can be understood that the temperature drift $\Delta V_{BGR}$ (mV) is about 0.25 mV that is suppressed into about 1/10.

Next, components or the like in the reference voltage generating circuit 1 will be described in detail.

FIGS. 13A to 13D are diagrams illustrating an example of layouts of bipolar transistors Q1 and Q2 in the BGR core circuit 10. Although there is no particular limitation, in FIGS. 13A to 13D, a case where a collector is formed in a vertical direction using an n-type deep well dwel and the periphery of the bipolar transistors Q1 and Q2 is surrounded by the n-type deep well dwel is shown as an example. Further, although there is no particular limitation, except for FIG. 13C, a case where the emitter area ratio of the bipolar transistors Q1 and Q2 is 8:1 is shown as an example.

In FIG. 13A, a case where the sizes of the n-type deep wells dwel that form the collectors are formed to be the same in two bipolar transistors Q1 and Q2 is shown. With such a configuration, by making the influence of noise that propagate from a semiconductor substrate be uniform in Q1 and Q2 by capacitance coupling, it is possible to cancel the noise as common mode noise.

In FIG. 13B, a case where eight bipolar transistors that include a dummy are arranged in a similar way to Q1 in a deep well dwel where the bipolar transistor Q2 having a small emitter area is formed, in addition to formation of the n-type deep well dwel shown in FIG. 13A, is shown. In this case, by providing interconnection for one among eight transistors in the region where Q2 is formed, the size ratio of Q1 and Q2 is set to 8:1. Thus, in addition to the effect of FIG. 13A, it is possible to reduce the influence of the dimensional variation in formation of the transistors.

Figures 13C, 13D:
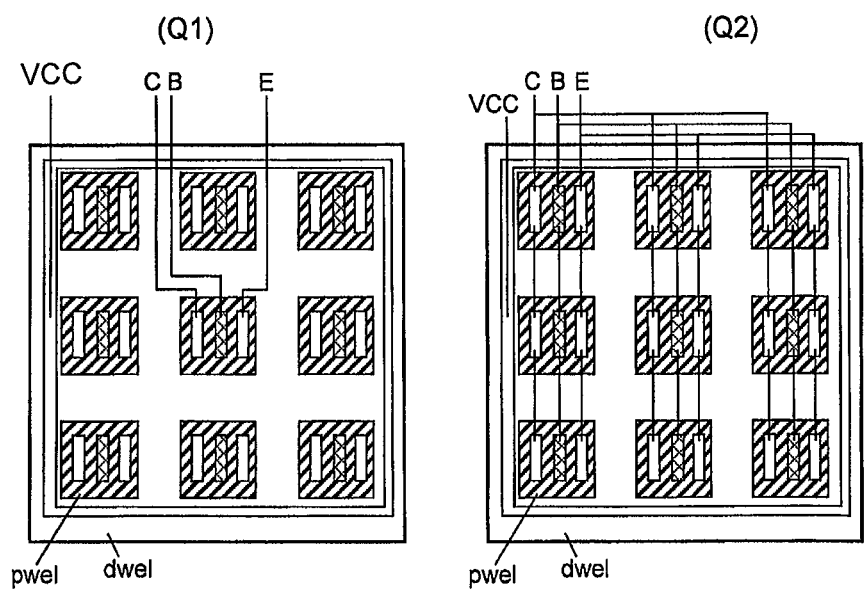

In FIG. 13C, a case where nine bipolar transistors that include a dummy are arranged in each deep well dwel where the bipolar transistors Q1 and Q2 are formed, in addition to formation of the n-type deep well dwel shown in FIG. 13A, is shown. For example, in a case where one of Q1 and Q2 becomes the exponent of 2 so that the size ratio of Q1 and Q2 becomes 9:1, if a transistor at the center of the transistors that are arranged by the same number as that of Q1 is set to Q2, it is possible to further reduce the dimensional variation.

In FIG. 13D, a case where nine bipolar transistors that include a dummy are arranged in one deep well dwel, in addition to formation of the n-type deep well dwel shown in FIG. 13A, is shown. In this case, if a transistor (B) that is at the center of the transistors in the region of the deep well dwel is set to Q2 and the other eight transistors (A) are set to Q1, it is possible to reduce the dimensional variation, and to form the transistors with a small area compared with FIG. 13C.

Figure 14A:
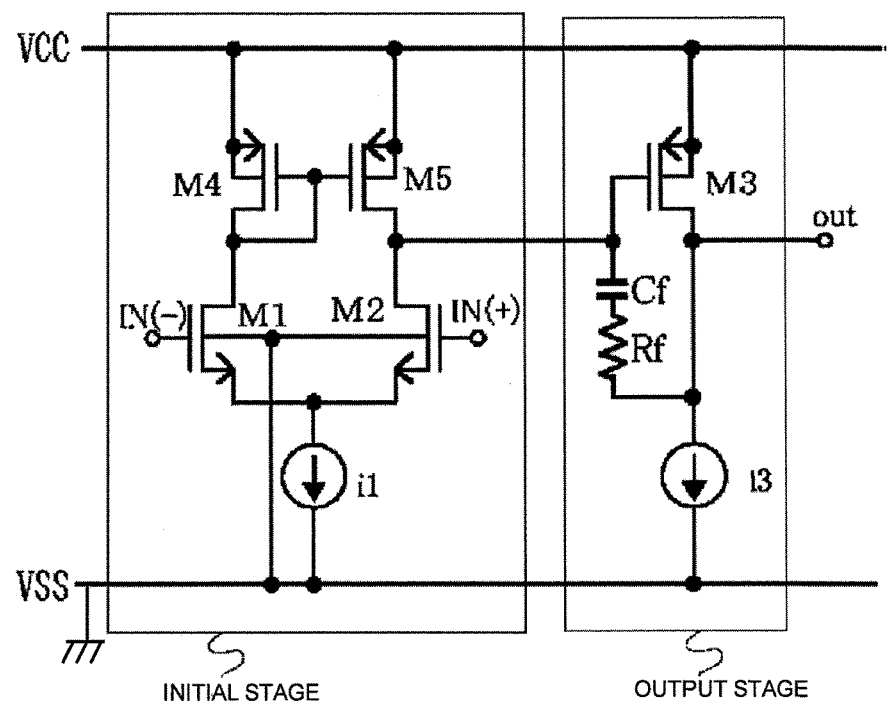
FIGS. 14A and 14B are circuit diagrams illustrating an example of an amplifier A1 of the reference voltage generating circuit 1.
Figure 14B:
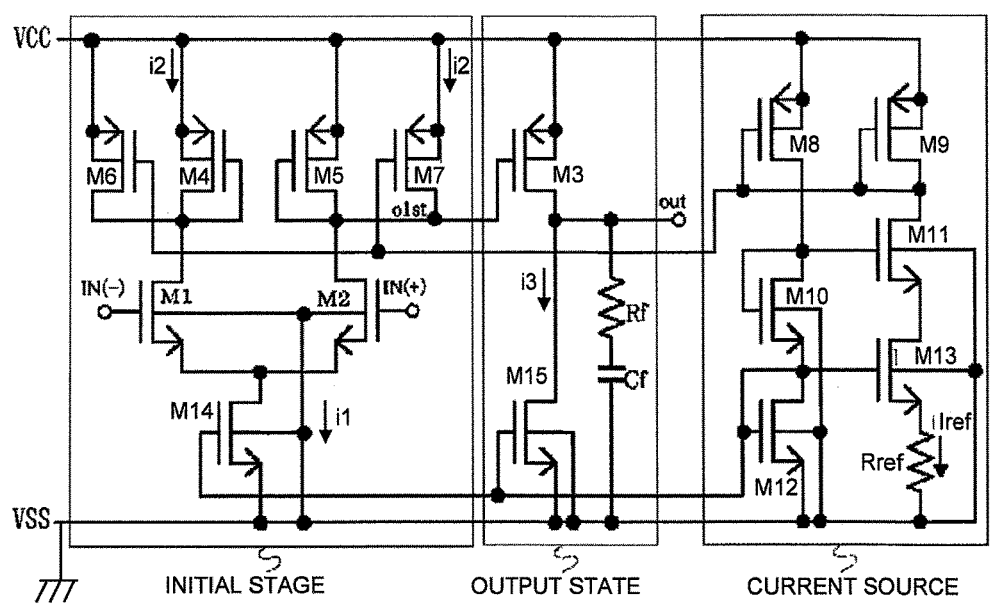

FIGS. 14A and 14B are circuit diagrams illustrating an example of an amplifier A1 in the reference voltage generating circuit 1.

FIG. 14A shows an example of the amplifier A1 that uses an N-channel MOS transistor as an input stage. The amplifier in FIG. 14A includes an initial stage section and an output stage section. The initial stage section includes two N-channel MOS transistors M1 and M2 that form a differential input stage, a current source it that is provided between a source terminal and the ground node, and two P-channel MOS transistors M3 and M4 that are provided between drain terminals of M1 and M2 and a power supply voltage Vcc and form an active load by a current mirror circuit. Further, the output stage section includes the P-channel MOS transistor M3 in which an initial stage output signal is input to the gate terminal and a source is connected to a node of the power supply voltage Vcc, and an inverting amplifier circuit that uses a current source i3 provided between a drain terminal of M3 and the ground node as a load. A capacitor Cf that is a phase compensating circuit and a resistance Rf are provided between a gate terminal and the drain terminal of M3.

FIG. 14B shows an example of the amplifier A1 that uses an N-channel MOS transistor as an input stage. The amplifier in FIG. 14B includes an initial stage section, an output stage section and a current source section. In a case where the reference voltage generating circuit 1 is formed, it is necessary to reduce power consumption, but a gain of the amplifier unnecessarily increases to cause a disadvantageous effect and phase compensation may become difficult. The amplifier shown in FIG. 14B has a circuit configuration for reduction in power consumption, and includes an amplifying section at the initial stage section that receives a differential input by the N-channel MOS transistors, an output stage section that includes an inverting amplifying circuit that includes a P-channel MOS transistor and is connected to the ground at its source, and a current source section that drives these components. The current source section converts a voltage difference of gate-source voltages of n-channel MOS transistors M12 and M13 for a stable supply of a fine current into a current by a resistance Rref to generate a converted current Iref. The current Iref determines bias currents i1 and i3 of the initial stage section and the output stage section in the MOS transistors M14 and M15 as the form of a current mirror. In a case where a current value of the current i1 is set to be small, in order to prevent the gain of the amplifier in the initial stage from being increased and to prevent phase compensation from being difficult, current sources M6 and M7 in which a constant current i2 flows are respectively connected in parallel with MOS transistors M4 and M5 that form the current mirror that functions to determine the gain. As the constant current Iref flows in the MOS transistors M13 and M11, and M9 of diode connection and MOS transistors M6 to M9 have the form of the current mirror, it is possible to form a constant current i3. Thus, it is easy to perform phase compensation. That is, pole-zero compensation (Rf and Cf are connected in series at the output stage) that is easy for designing may be performed, in addition to the mirror compensation used in the related art.

In the above description of FIG. 2, a circuit configuration that excludes a start-up circuit for ease of understanding of the operational principle of the reference voltage generating circuit 1 is shown, but the reference voltage generating circuit 1 further includes the start-up circuit.

Figure 15:
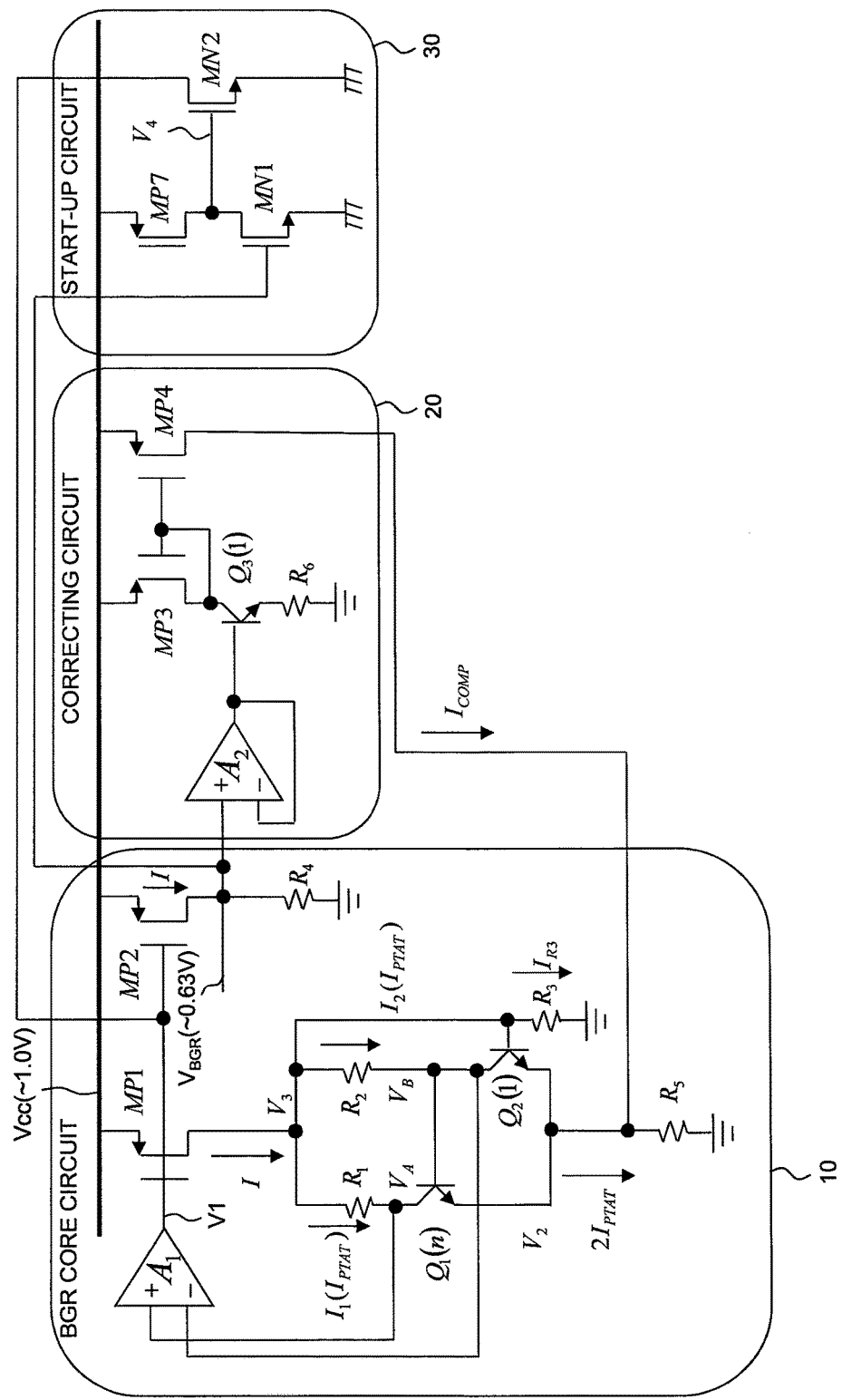
FIG. 15 is a circuit diagram illustrating an example of the reference voltage generating circuit 1 that includes a start-up circuit.

FIG. 15 is a circuit diagram illustrating an example of the reference voltage generating circuit 1 that includes a start-up circuit.

In the reference voltage generating circuit 1, the output voltage $V_{BGR}$ may be stabilized at 0 V in start-up, for example, when a power supply voltage is input. As a solution of this problem, a start-up circuit 30 is provided in the reference voltage generating circuit 1 to force a current to flow, to thereby start up the circuit.

Hereinafter, an operation of the start-up circuit 30 will be described. For example, when a gate electric potential V1 of a MOS transistor MP1 is Vcc, MP1 is turned off, and thus, a current does not flow. Here, since a MOS transistor MP2 is turned off, the output voltage $V_{BGR}$ becomes a ground electric potential, and a MOS transistor MN1 is turned off. An electric potential V4 of a node to which a drain terminal of the MOS transistor MN1 is connected becomes Vcc−|VTHP| when a threshold voltage of a MOS transistor MP7 is set to VTHP, and a MOS transistor MN2 is turned on. Thus, the gate electric potential V1 of MP1 drops from Vcc, and the BGR core circuit 10 may be operated at a normal bias.

The output voltage $V_{BGR}$ may be generated by the start-up circuit 30 without error when power is input or sleep is released, for example. Further, even in a case where disturbance or the like occurs in a normal operation, the output voltage $V_{BGR}$ is returned without delay and is stably generated. Furthermore, according to the circuit configuration of the start-up circuit 30, since the gate electric potential V4 of the MOS transistor MN2 may be reduced to be equal to or lower than a threshold voltage VTHN of the MOS transistor MN2 by appropriately selecting transistor sizes of the MOS transistors MP7, MN1 and MN2, it is possible to neglect the current of the MOS transistor MN2, and not to give an influence on the operation of the BGR core circuit 10. The start-up circuit 30 is an example, and a start-up circuit with a different circuit configuration may be provided in the reference voltage generating circuit 1.

Figure 16:
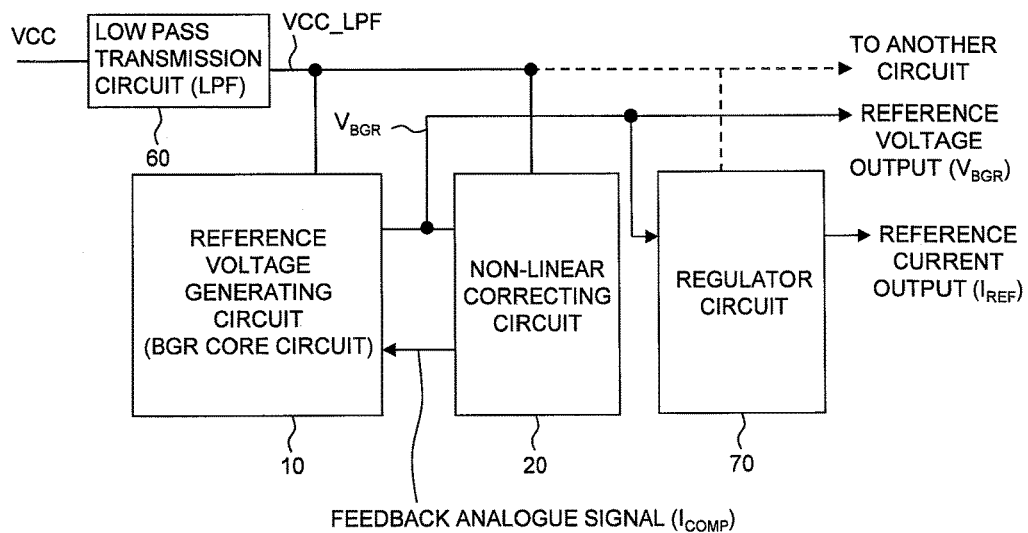
FIG. 16 is a diagram illustrating a configuration example of a circuit in which an LPF (low pass filter) is inserted in a power supply line (Vcc).

FIG. 16 is a diagram illustrating a configuration example of a circuit in which an LPF (low pass filter) is inserted in a power supply (Vcc) line.

Since the BGR core circuit 10 and the correcting circuit 20 according to the present embodiment have a small circuit size and achieve low power consumption, as shown in FIG. 16, a configuration in which a low pass filter 60 is inserted in the power source Vcc line and an output voltage Vcc LPF of the low pass filter 60 is supplied to the BGR core circuit 10, the correcting circuit 20, a regulator circuit (reference current source) 70 and the like may be used. Thus, it is possible to reduce a power supply rejection ratio (PSRR), and to increase resistance against power supply voltage variation. The low pass filter 60 is realized by a resistance element and a capacitance element, for example, but a different circuit configuration may be used as long as a low pass transmission property is obtained.

Next, a system to which the reference voltage generating circuit 1 is applied will be described.

FIGS. 17A to 17D are diagrams illustrating an example of the system to which the reference voltage generating circuit 1 is applied.

Figure 17A:
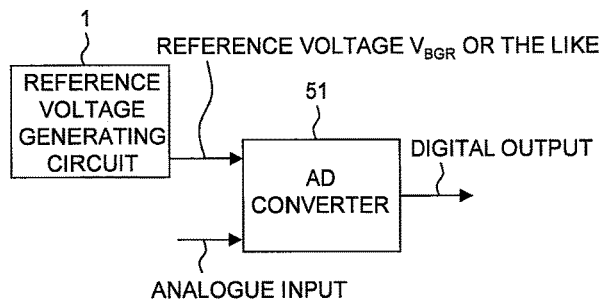
FIGS. 17A to 17D are diagrams illustrating an example of a system to which a reference voltage generating circuit 1 is applied.

FIG. 17A shows an application example to an AD converter. The AD converter converts an analog input signal into a digital signal on the basis of a $V_{BGR}$ voltage generated by the reference voltage generating circuit 1 or a voltage generated on the basis of the $V_{BGR}$ voltage, and outputs the result.

Figure 17B:
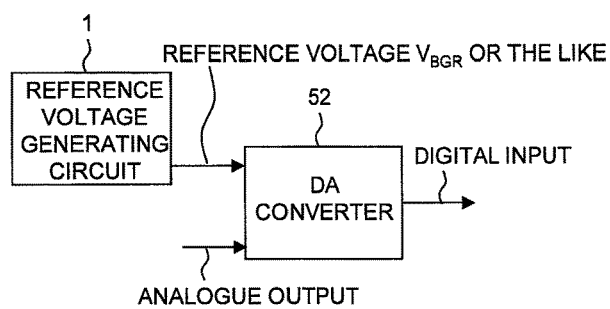

FIG. 17B shows an application example to a DA converter. The DA converter converts a digital input signal into an analog signal on the basis of a $V_{BGR}$ voltage generated by the reference voltage generating circuit 1 or a voltage generated on the basis of the $V_{BGR}$ voltage, outputs the result.

Figure 17C:
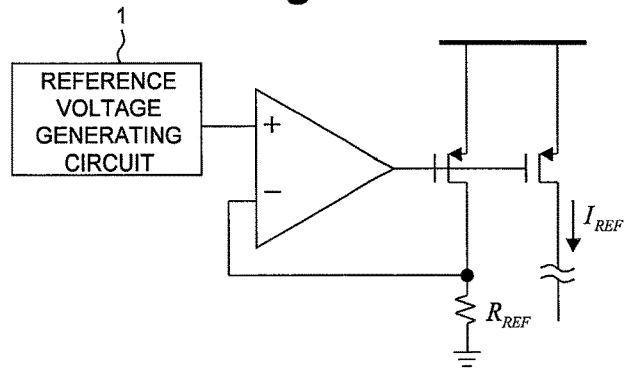

FIG. 17C shows an application example to a reference current source. The reference current source generates a reference current IREF on the basis of a $V_{BGR}$ voltage generated by the reference voltage generating circuit 1 or a voltage generated on the basis of the $V_{BGR}$ voltage, and outputs the result.

Figure 17D:
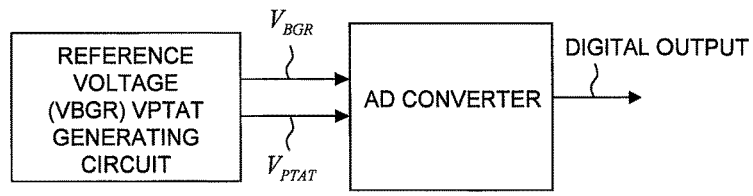

FIG. 17D shows an application example to a temperature sensor. The temperature sensor measures the temperature on the basis of a VPTAT voltage that is proportional to the temperature and a $V_{BGR}$ voltage with low temperature dependence, and outputs the measurement result. A method of generating the VPTAT voltage will be described later.

Figure 18:
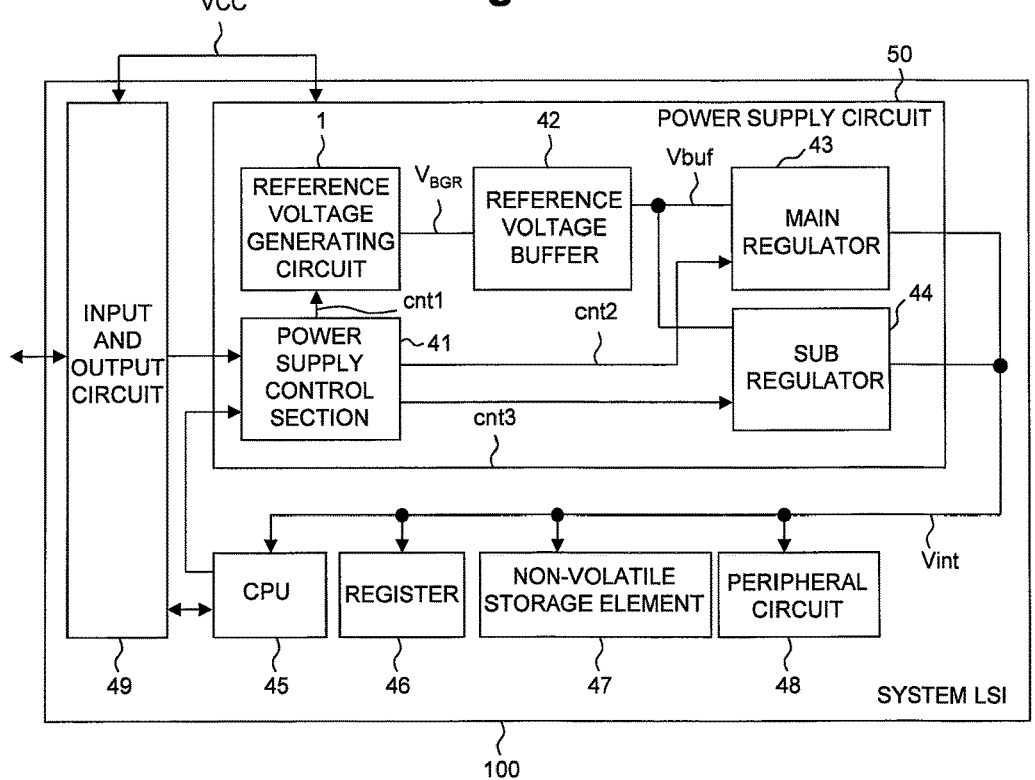
FIG. 18 is a block diagram illustrating an example of a semiconductor integrated circuit device to which the reference voltage generating circuit 1 is applied.

FIG. 18 is a block diagram illustrating an example of a semiconductor integrated circuit device to which the reference voltage generating circuit 1 is applied.

Although there is no particular limitation, the semiconductor integrated circuit device 100 is a system LSI in which a power supply circuit is installed, for example.

The semiconductor integrated circuit device 100 includes a power supply circuit 50, a CPU (central processing unit) 45, a register 46, a non-volatile storage element 47, a peripheral circuit 48, and an input and output circuit 49, for example. The power supply circuit 50 includes the reference voltage generating circuit 1, a reference voltage buffer circuit 42, a main regulator 43 that is a main power source, a sub regulator 44 that is a standby power source, and a power supply control section 41, for example. These circuits are operated by receiving a power supply voltage VCC supplied from an external terminal, generate an internal voltage Vint by decreasing VCC, and supply the result as an operating voltage of the CPU 45, the register 46, the non-volatile storage element 47 and the peripheral circuit 48 that form the system LSI.

For example, in a case where the system LSI 100 is driven by a battery, a low power supply voltage and low power consumption are obtained. However, since each circuit is not able to secure a sufficient margin due to the low power supply voltage, a request for a high accurate characteristic is expected. Thus, by applying the reference voltage generating circuit 1 according to the present embodiment to the system LSI, the low power supply voltage operation and the low output voltage may be effectively realized. Further, for higher accuracy, it is preferable that the reference voltage generating circuit 1 be formed by the CMOS process. Particularly, since the influence of offset of the differential amplifier A1 is small (equivalent to mismatching of current), the circuit is suitable for being mounted in an SOC (system on a chip) memory and a microprocessor. Further, a chopper may be employed to reduce element mismatching of the amplifier A1, or a DEM (dynamic element matching) may be employed to improve matching of the MOS transistor.

Hereinbefore, according to the reference voltage generating circuit 1 according to the first embodiment, by configuring the BGR core circuit 10 to have the above-described circuit configuration, it is possible to perform the low voltage output and the low power supply voltage operation, and to reduce the influence of the offset of the amplifier on the output voltage $V_{BGR}$. Further, by generating the correcting current $I_{COMP}$ by the non-linear correcting circuit 20 to cause the current to be fed back to the BGR core circuit 10, it is possible to further reduce the temperature dependence of the output voltage $V_{BGR}$.

Second Embodiment

Figure 19:
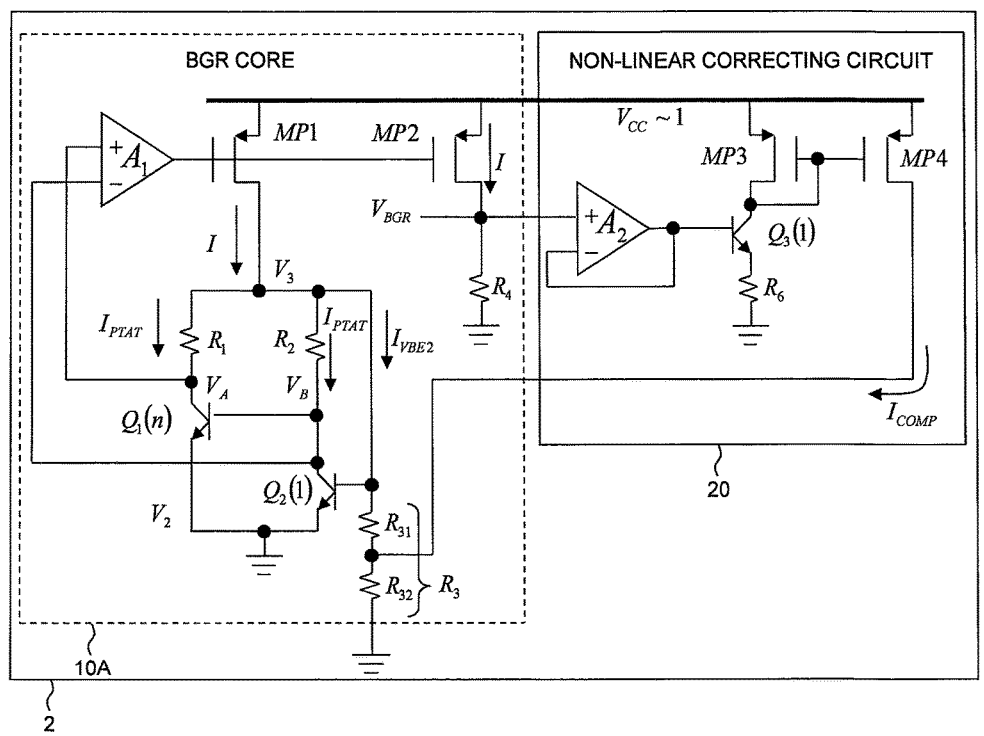
FIG. 19 is a diagram illustrating an example of a reference voltage generating circuit according to a second embodiment.

FIG. 19 is a circuit diagram illustrating an example of a reference voltage generating circuit according to a second embodiment.

In FIG. 19, the same reference numerals are given to the same components and the like as in the reference voltage generating circuit 1 according to the first embodiment, and detailed description thereof will not be shown.

A reference voltage generating circuit 2 shown in FIG. 19 includes a BGR core circuit 10A and a non-linear correcting circuit 20. The BGR core circuit 10A has a configuration in which the resistance R5 is removed from the BGR core circuit 10 according to the first embodiment.

In the reference voltage generating circuit 2, a feedback destination of the correcting current $I_{COMP}$ is the resistance R3. Although there is no particular limitation, in the present embodiment, a configuration is used in which the resistance R3 is divided into a resistance R31 and a resistance R32 and the current $I_{COMP}$ is fed back to a connection node of the respective resistances.

The output voltage $V_{BGR}$ in the reference voltage generating circuit 2 is as follows.

If $R_1=R_2=R_{12}$ in a similar way to the first embodiment, Formula 42 is established from the Kirchhoff's voltage law at the node of the electric potential V3.

$$I=2I_{PTAT}+I_{VBE2} \qquad \text{(Formula 42)}$$

Further, Formula 43 is established according to the Thevenin's theorem.

$$V_{BE2}=I_{VBE2}(R_{31}+R_{32})+I_{COMP}R_{32} \qquad \text{(Formula 43)}$$

Further, the correcting current $I_{COMP}$ is expressed as Formula 44. Here, with respect to the direction of the correcting current $I_{COMP}$, a direction where the current flows into the resistance R3 from the MOS transistor MP4 is represented as positive, as shown in FIG. 19.

$$I_{COMP} = \frac{V_{BGR} - V_{BE3}}{R_6} \quad \text{(Formula 44)}$$

Further, since Formula 45A is established from the Kirchhoff's voltage law from the ground (ground node) to the node of the voltage V3, an IPTAT current is expressed as Formula 45B.

$$V_{BE1} + I_{PTAT}R_{12} = V_{BE2} \quad \text{(Formula 45A)}$$

$$I_{PTAT} = \frac{V_{BE2} - V_{BE1}}{R_{12}} = \frac{V_T \ln(n)}{R_{12}} \quad \text{(Formula 45B)}$$

If Formula 43 and Formula 45B are substituted in Formula 42 to calculate the output voltage $V_{BGR}$, Formula 46 is obtained. Here, it is noted that VCOMP that is the third term in Formula 46 shows a negative value.

$$V_{BGR} = R_4 I = R_4 \left\{ 2\frac{V_T \ln(n)}{R_{12}} + \frac{V_{BE2} - I_{COMP}R_{32}}{R_{31} + R_{32}} \right\} \quad \text{(Formula 46)}$$

$$= \underbrace{\underbrace{\frac{R_4 V_{BE2}}{R_{31} + R_{32}}}_{VCTAT} + 2\underbrace{\frac{R_4 V_T \ln(n)}{R_{12}}}_{VPTAT}}_{VBGR\_PTAT} - \underbrace{\frac{R_4 I_{COMP} R_{32}}{R_{31} + R_{32}}}_{VCOMP}$$

Figure 20:
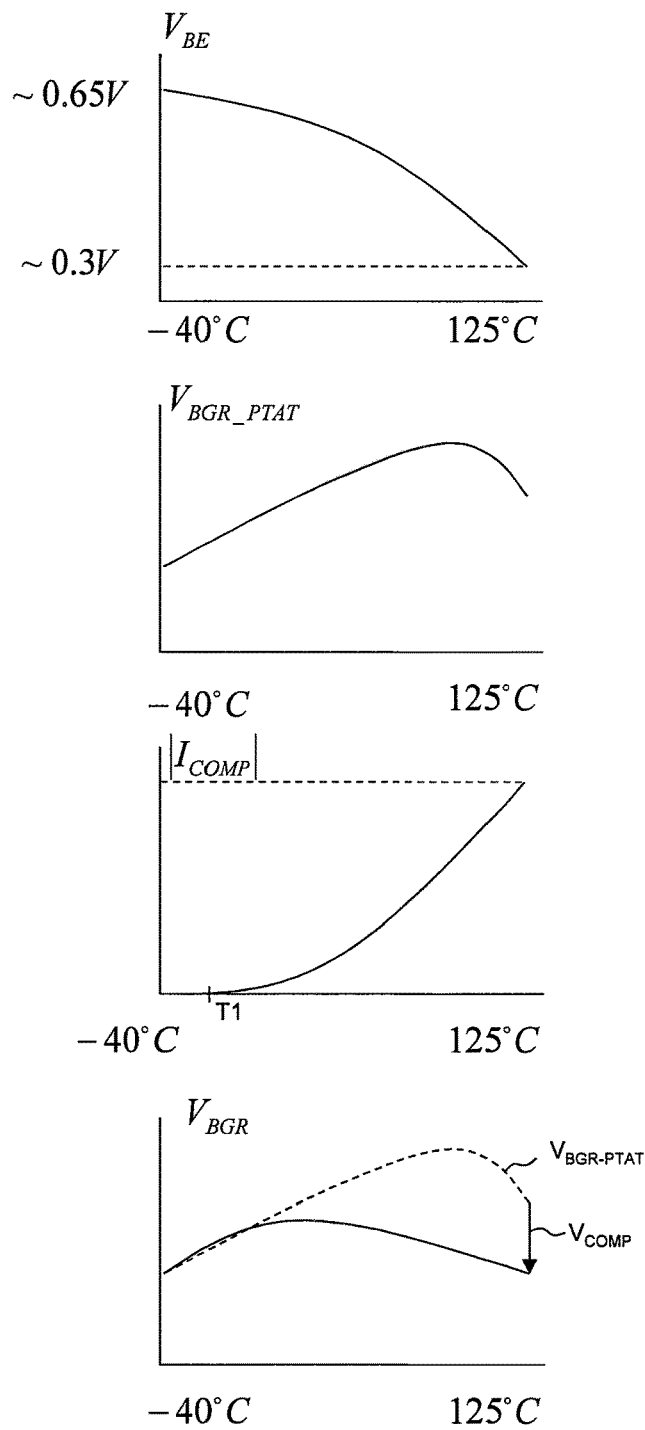
FIG. 20 is a diagram illustrating a principle of a method of correcting a non-linear temperature characteristic by a reference voltage generating circuit 2.

FIG. 20 is a diagram illustrating a principle of a method of correcting a non-linear temperature characteristic by the reference voltage generating circuit 2.

The reference voltage generating circuit 2 corrects a negative temperature dependence (first term: VCTAT) of the base-emitter voltage VBE of the bipolar transistor Q2 by a voltage (second term: VPTAT) that is proportional to the absolute temperature and a non-linear correcting voltage (third term: VCOMP). The correcting current $I_{COMP}$ has a characteristic that it increases on high temperature side with reference to a predetermined temperature T1 in a similar way to the reference voltage generating circuit 1, but the non-linear correcting voltage (third term: VCOMP) has a characteristic that it becomes negative on the high temperature side. Accordingly, in the reference voltage generating circuit 2, as shown in FIG. 20, the sum (VBGR_PTAT) of the first term and the second term is optimized so that the temperature coefficient is zero on the high temperature side. Thus, it is possible to reduce the temperature drift of the output voltage $V_{BGR}$.

The above-described calculation is an approximate calculation in a similar way to the first embodiment, and precise values of the resistance value, the correcting current value and the like are calculated by simulation. Further, addition of the start-up circuit and the low pass filter, and application to a system LSI or the like may be applied in a similar way to the first embodiment.

Hereinbefore, according to the reference voltage generating circuit 2 according to the second embodiment, in a similar way to the reference voltage generating circuit 1, it is possible to perform the low voltage output and the low power supply voltage operation, and to reduce the influence of the offset of the amplifier on the output voltage $V_{BGR}$.

Further, it is possible to further reduce the temperature dependence of the output voltage $V_{BGR}$.

Third Embodiment

Figure 21:
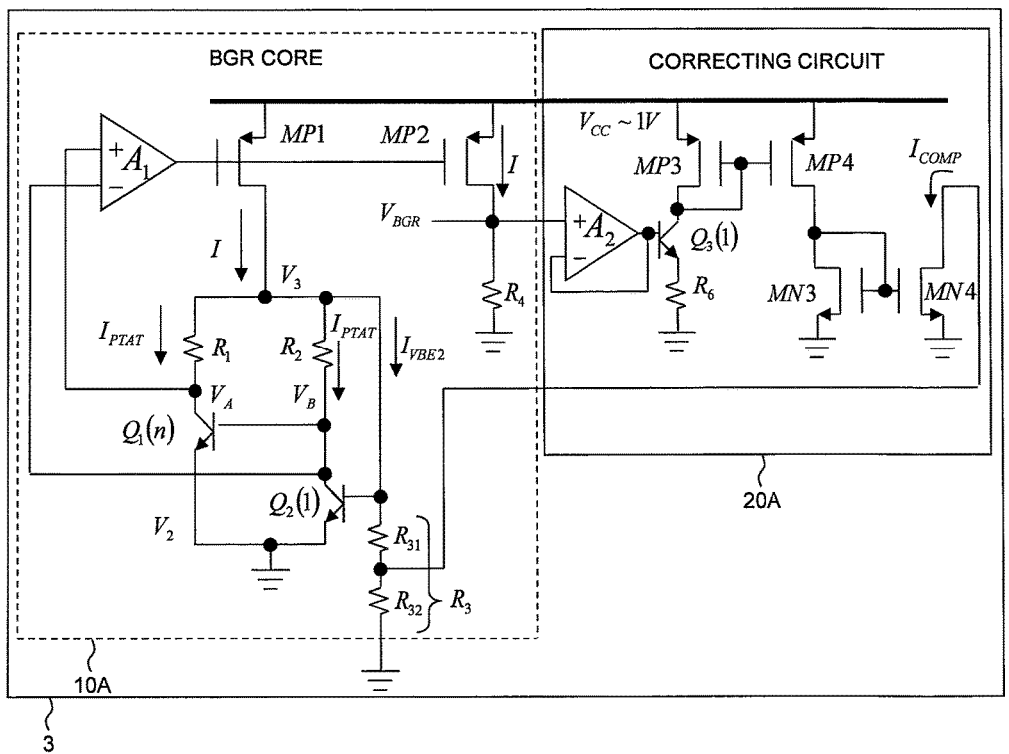
FIG. 21 is a circuit diagram illustrating an example of a reference voltage generating circuit according to a third embodiment.

FIG. 21 is a circuit diagram illustrating an example of a reference voltage generating circuit according to a third embodiment.

In FIG. 21, the same reference numerals are given to the same components and the like as in the first and second embodiments, and detailed description thereof will not be shown.

A reference voltage generating circuit 3 shown in FIG. 21 includes the BGR core circuit 10A and a non-linear correcting circuit 20A. The non-linear correcting circuit 20A has a configuration in which the generated correcting current $I_{COMP}$ is returned to be output.

In the reference voltage generating circuit 3, a feedback destination of the correcting current $I_{COMP}$ is the resistance R3. Although there is no particular limitation, in the present embodiment, a configuration is used in which the resistance R3 is divided into the resistance R31 and the resistance R32 and the current is fed back to the connection node of the respective resistances.

The output voltage $V_{BGR}$ in the reference voltage generating circuit 3 is as follows.

With respect to the direction of the correcting current $I_{COMP}$, a direction where the current flows into the MOS transistor MP4 from the resistance R3 is represented as positive, as shown in FIG. 21. Then, if the calculation is performed by the same method as in the reference voltage generating circuit 2 according to the second embodiment, the output voltage $V_{BGR}$ is expressed as Formula 47. Here, attention should be given the fact that the third term (VCOMP) in Formula 47 is a positive value on high temperature side.

$$V_{BGR} = R_4 I = R_4 \left\{ 2\frac{V_T \ln(n)}{R_{12}} + \frac{V_{BE2} - I_{COMP}R_{32}}{R_{31} + R_{32}} \right\} \quad \text{(Formula 47)}$$

$$= \underbrace{\underbrace{\frac{R_4 V_{BE2}}{R_{31} + R_{32}}}_{VCTAT} + 2\underbrace{\frac{R_4 V_T \ln(n)}{R_{12}}}_{VPTAT}}_{VBGR\_PTAT} + \underbrace{\frac{R_4 I_{COMP} R_{32}}{R_{31} + R_{32}}}_{VCOMP}$$

Figure 22:
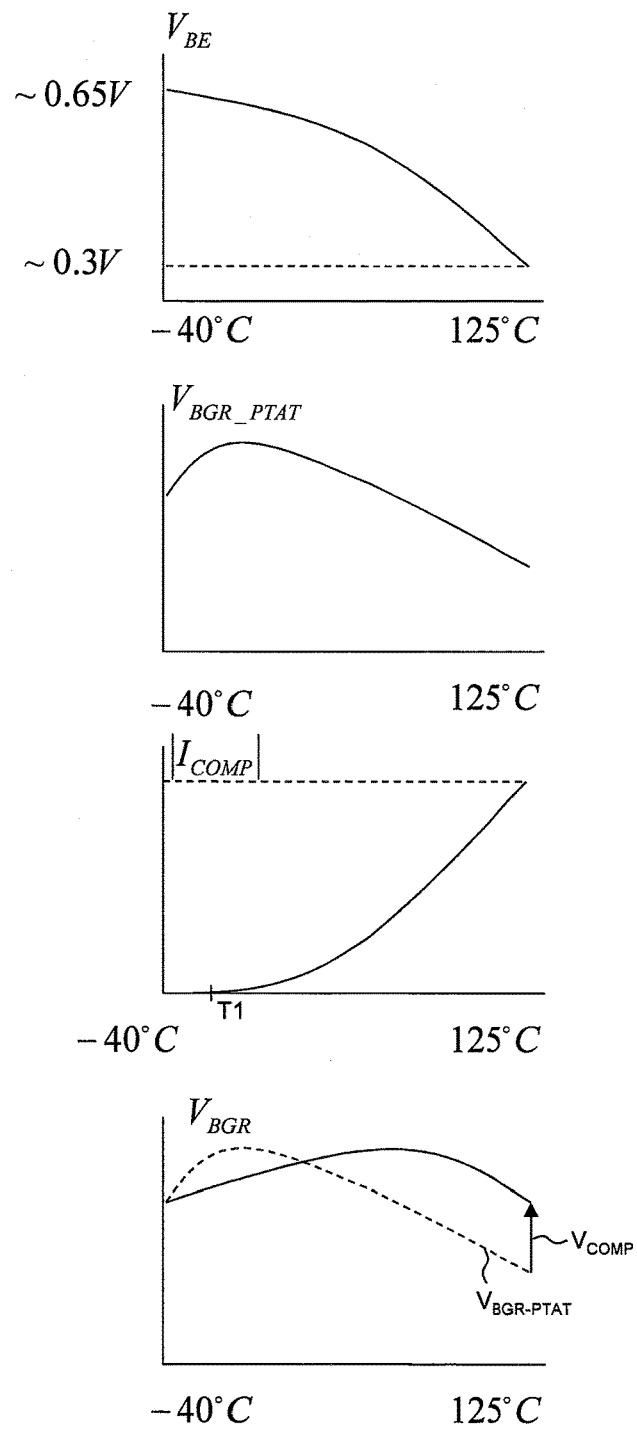
FIG. 22 is a diagram illustrating a principle of a method of correcting a non-linear temperature characteristic by a reference voltage generating circuit 3.

FIG. 22 is a diagram illustrating a principle of a method of correcting a non-linear temperature characteristic by the reference voltage generating circuit 3.

The reference voltage generating circuit 3 corrects a negative temperature dependence (first term: VCTAT) of the base-emitter voltage VBE of the bipolar transistor Q2 by a voltage (second term: VPTAT) that is proportional to the absolute temperature and a non-linear correcting voltage (third term: VCOMP). The correcting current $I_{COMP}$ has a characteristic that it increases on high temperature side with reference to a predetermined temperature T1 in a similar way to the reference voltage generating circuit 1, but since the correcting current $I_{COMP}$ is returned by the current mirror circuit that includes the MOS transistors MN3 and MN4, the correcting current $I_{COMP}$ is extracted from the connection node of the resistances R31 and R32. Thus, the non-linear correcting voltage (third term: VCOMP) becomes positive on the high temperature side. Accordingly, in the reference voltage generating circuit 2, as shown in FIG. 22, the sum (VBGR_PTAT) of the first term and the second term is optimized so that the temperature coefficient is zero on the low temperature side. Thus, it is possible to reduce the temperature drift of the output voltage $V_{BGR}$. The above-described calculation is an approximate calculation in a similar way to the first embodiment, and precise values of the resistance value, the correcting current value and the like are calculated by simulation.

Further, addition of the start-up circuit and the low pass filter, and application to a system LSI or the like may be applied in a similar way to the first embodiment.

Hereinbefore, according to the reference voltage generating circuit 3 according to the third embodiment, in a similar way to the reference voltage generating circuit 1, it is possible to perform the low voltage output and the low power supply voltage operation, and to reduce the influence of the offset of the amplifier on the output voltage $V_{BGR}$. Further, it is possible to further reduce the temperature dependence of the output voltage $V_{BGR}$.

Fourth Embodiment

Figure 23:
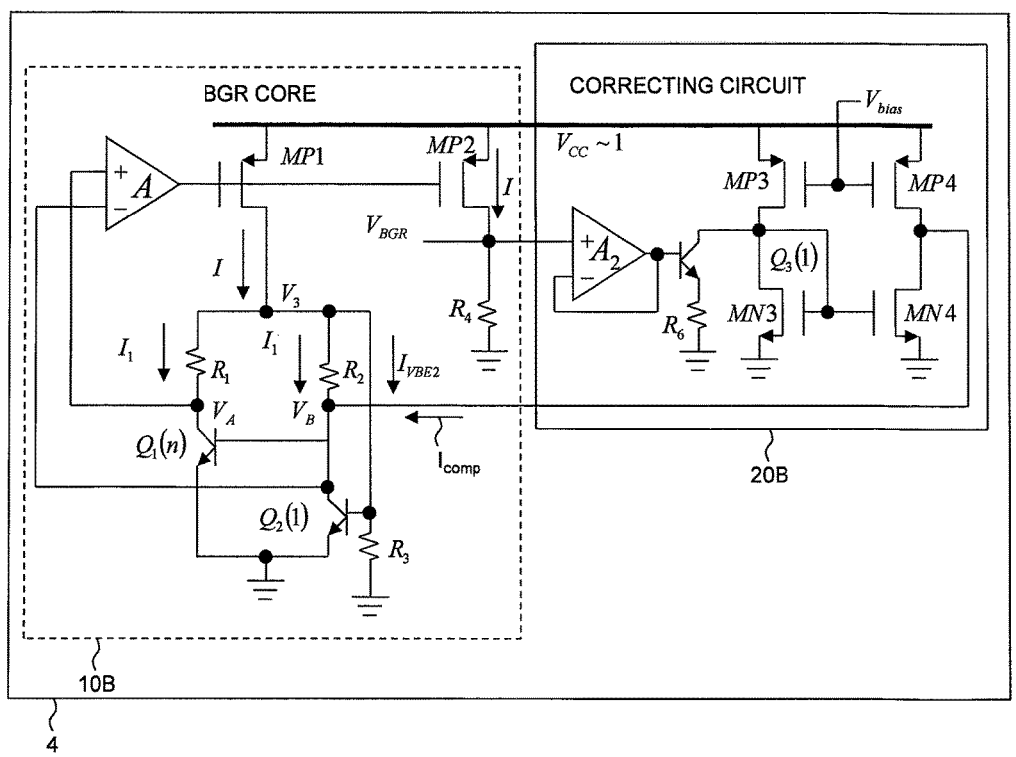
FIG. 23 is a circuit diagram illustrating an example of a reference voltage generating circuit according to a fourth embodiment.

FIG. 23 is a circuit diagram illustrating an example of a reference voltage generating circuit according to a fourth embodiment.

In FIG. 23, the same reference numerals are given to the same components and the like as in the first to third embodiments, and detailed description thereof will not be shown.

A reference voltage generating circuit 4 shown in FIG. 23 includes a BGR core circuit 10B and a non-linear correcting circuit 20B. The BGR core circuit 10B has a configuration in which the resistance R5 is removed from the BGR core circuit 10. The non-linear correcting circuit 20B has a configuration in which the current mirror circuit of the non-linear correcting circuit 20 is a folded current mirror circuit. A bias voltage Vbias is supplied to gate terminals of the MOS transistors MP3 and MP4 that form the folded current mirror circuit, for example, from a self bias circuit (not shown) or the like.

In the reference voltage generating circuit 4, a feedback destination of the correcting current $I_{COMP}$ is a connection node of the resistance R2 and the collector terminal of the bipolar transistor Q2.

The output voltage $V_{BGR}$ in the reference voltage generating circuit 4 is as follows. Although there is no particular limitation, for simplicity, the mirror ratio of the correcting current $I_{COMP}$ is set to 1:1.

If R1=R2=R12 in a similar way to the first embodiment, Formula 48A and Formula 48B are established from the approximation of the bipolar transistor.

$$V_{BE1} = V_T \ln\left(\frac{I_1}{nI_S}\right) \quad \text{(Formula 48A)}$$

$$V_{BE2} = V_T \ln\left(\frac{I_1 + I_{comp}}{I_S}\right) \quad \text{(Formula 48B)}$$

Since Formula 49 is established from the Kirchhoff's voltage law from the ground (ground node) to the node of the electric potential V3, a current I1 may be approximated as Formula 50. Here, it is assumed that $I_{COMP}/I_1 \ll 1$.

$$V_{BE2} = V_{BE1} + R_{12} I_1 \quad \text{(Formula 49)}$$

$$I_1 = \frac{V_{BE2} - V_{BE1}}{R_{12}} = \quad \text{(Formula 50)}$$

$$\frac{V_T}{R_{12}}\left\{\ln\left(\frac{I_1 + I_{comp}}{I_S}\right) - \ln\left(\frac{I_1}{nI_S}\right)\right\} = \frac{V_T}{R_{12}}\left\{\ln\left(\frac{I_1 + I_{comp}}{I_1}n\right)\right\} =$$

$$\frac{V_T}{R_{12}}\left\{\ln(n) + \ln\left(1 + \frac{I_{comp}}{I_1}\right)\right\} \sim \frac{V_T}{R_{12}}\left\{\ln(n) + \frac{I_{comp}}{I_1}\right\}$$

Since Formula 50 is a simple quadratic equation, if the quadratic equation is solved, it becomes as Formula 51 and the output voltage $V_{BGR}$ is expressed as Formula 52. Here, it is assumed that Formula 53 is established.

$$I_1 = \frac{\sqrt{\ln(n)^2 V_T^2 + 4 I_{comp} R_1 V_T} + \ln(n) V_T}{2 R_{12}} \quad \text{(Formula 51)}$$

$$V_{BGR} = R_4\left(\frac{V_{BE2}}{R_3} + 2I_1\right) = \quad \text{(Formula 52)}$$

$$R_4\left(\frac{V_{BE2}}{R_3} + 2\frac{\sqrt{\ln(n)^2 V_T^2 + 4 I_{comp} R_1 V_T} + \ln(n) V_T}{2 R_{12}}\right)$$

$$= R_4\left(\frac{V_{BE2}}{R_3} + \frac{\sqrt{\ln(n)^2 V_T^2 + 4 I_{comp} R_1 V_T} + \ln(n) V_T}{R_{12}}\right)$$

$$= R_4\left(\frac{V_{BE2}}{R_3} + \frac{\ln(n) V_T}{R_{12}}\left[\sqrt{1 + \frac{4 I_{comp} R_{12} V_T}{\ln(n)^2 V_T^2}} + 1\right]\right) \sim$$

$$R_4\left(\frac{V_{BE2}}{R_3} + \frac{\ln(n) V_T}{R_{12}}\left[2 + \frac{4 I_{comp} R_{12} V_T}{2\ln(n)^2 V_T^2}\right]\right)$$

$$1 \gg \frac{4 I_{comp} R_{12} V_T}{\ln(n)^2 V_T^2} \quad \text{(Formula 53)}$$

Accordingly, the output voltage $V_{BGR}$ may be expressed as Formula 54.

$$V_{BGR} \sim R_4\left(\frac{V_{BE2}}{R_3} + \frac{\ln(n) V_T}{R_{12}}\left[2 + \frac{2 I_{comp} R_{12}}{\ln(n)^2 V_T}\right]\right) = \quad \text{(Formula 54)}$$

$$\underbrace{\frac{R_4}{R_3} V_{BE2}}_{VCTAT} + \underbrace{\frac{2 R_4}{R_{12}} \ln(n) V_T}_{VPTAT} + \underbrace{\frac{R_4}{R_{12}} \frac{2 I_{comp} R_{12}}{\ln(n)}}_{Vcomp}$$

$$\underbrace{\phantom{\frac{R_4}{R_3} V_{BE2} + \frac{2 R_4}{R_{12}} \ln(n) V_T}}_{VBGR\_PTAT}$$

Figure 24:
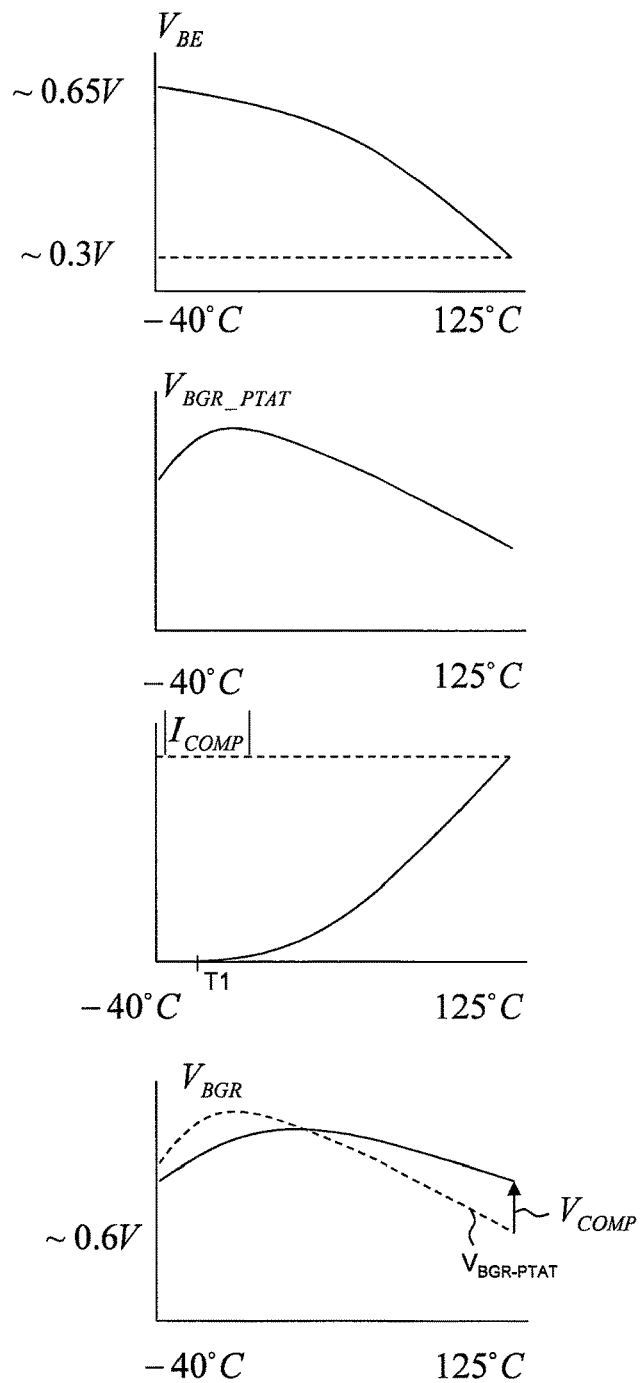
FIG. 24 is a diagram illustrating a principle of a method of correcting a non-linear temperature characteristic by a reference voltage generating circuit 4.

FIG. 24 is a diagram illustrating a principle of a method of correcting a non-linear temperature characteristic by the reference voltage generating circuit 4.

The reference voltage generating circuit 4 corrects a negative temperature dependence (first term: VCTAT) of the base-emitter voltage VBE of the bipolar transistor Q2 by a voltage (second term: VPTAT) that is proportional to the absolute temperature and a non-linear correcting voltage (third term: VCOMP). The correcting current $I_{COMP}$ has a characteristic that it increases on high temperature side with reference to a predetermined temperature T1 in a similar way to the reference voltage generating circuit 1, and the non-linear correcting voltage (third term: VCOMP) becomes positive on the high temperature side. Accordingly, in the reference voltage generating circuit 4, as shown in FIG. 24, the sum (VBGR_PTAT) of the first term and the second term is optimized so that the temperature coefficient is zero on the low temperature side. Thus, it is possible to reduce the temperature drift of the output voltage $V_{BGR}$. The above-described calculation is an approximate calculation in a similar way to the first embodiment, and precise values of the resistance value, the correcting current value and the like are calculated by simulation.

Further, addition of the start-up circuit and the low pass filter, and application to a system LSI or the like may be applied in a similar way to the first embodiment.

Hereinbefore, according to the reference voltage generating circuit 4 according to the fourth embodiment, in a similar way to the reference voltage generating circuit 1, it is possible to perform the low voltage output and the low power supply voltage operation, and to reduce the influence of the offset of the amplifier on the output voltage $V_{BGR}$. Further, it is possible to further reduce the temperature dependence of the output voltage $V_{BGR}$. Further, since the correcting circuit 20B does not have a circuit configuration in which the current mirror circuit is stacked on the bipolar transistor Q3 as in the correcting circuit 20 or the like, the correcting circuit 20B may be operated at a lower power supply voltage. The correcting circuit 20B may also be applied to a reference voltage generating circuit according to another embodiment.

Fifth Embodiment

Figure 25:
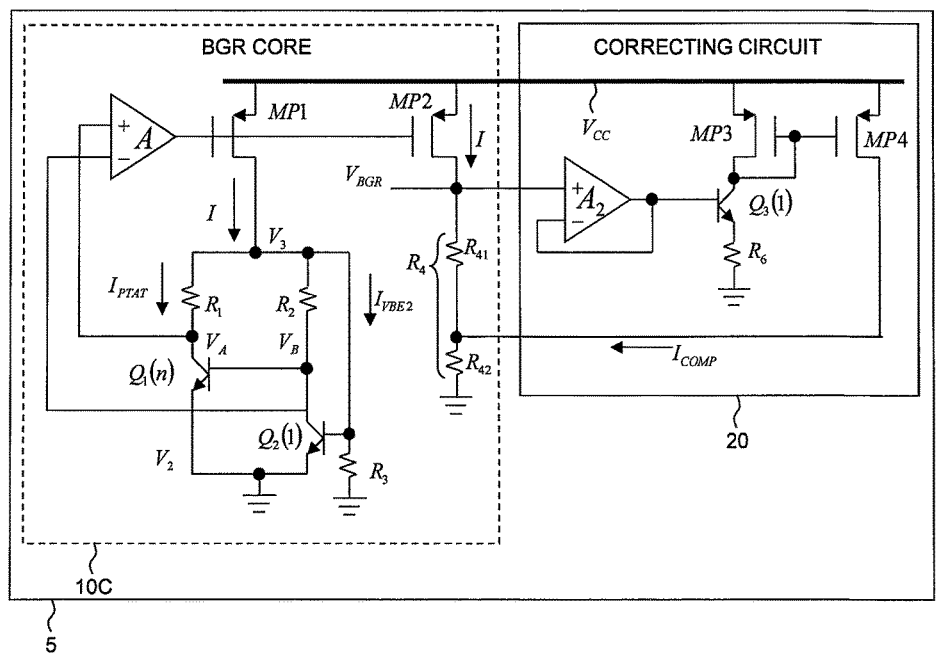
FIG. 25 is a circuit diagram illustrating an example of a reference voltage generating circuit according to a fifth embodiment.

FIG. 25 is a circuit diagram illustrating an example of a reference voltage generating circuit according to a fifth embodiment.

In FIG. 25, the same reference numerals are given to the same components and the like as in the first to fourth embodiments, and detailed description thereof will not be shown.

A reference voltage generating circuit 5 shown in FIG. 25 includes a BGR core circuit 10C and the non-linear correcting circuit 20. The BGR core circuit 10C has a configuration in which the resistance R4 is divided into a resistance R41 and a resistance R42 from the BGR core circuit 10. The reference voltage generating circuit 5 is different from the reference voltage generating circuit 1 in that a feedback destination of the correcting current $I_{COMP}$ is a connection node of the resistance R41 and the resistance R42.

The output voltage $V_{BGR}$ in the reference voltage generating circuit 5 is as follows.

If $R_1=R_2=R_{12}$ in a similar way to the first embodiment, Formula 55 is established from the Kirchhoff's voltage law at the node of the electric potential V3.

$$I=2I_{PTAT}+I_{VBE2} \quad \text{(Formula 55)}$$

Further, Formula 56 is established.
(Formula 56)

$$V_{BE2}=I_{VBE2}R_3 \quad \text{(Formula 56)}$$

Further, the correcting current $I_{COMP}$ is expressed as Formula 57. Here, with respect to the direction of the correcting current $I_{COMP}$, a direction where the current flows into the resistance R4 from the MOS transistor MP4 is represented as positive, as shown in FIG. 25.

$$I_{COMP} = \frac{V_{BGR} - V_{BE3}}{R_6} \quad \text{(Formula 57)}$$

Further, since Formula 58A is established from the Kirchhoff's voltage law from the ground (ground node) to the node of the voltage V3, an IPTAT current is expressed as Formula 58B.

$$V_{BE1} + I_{PTAT}R_{12} = V_{BE2} \quad \text{(Formula 58A)}$$

$$I_{PTAT} = \frac{V_{BE2} - V_{BE1}}{R_{12}} = \frac{V_T \ln(n)}{R_{12}} \quad \text{(Formula 58B)}$$

If Formula 56 and Formula 58B are substituted in Formula 55 to calculate the output voltage $V_{BGR}$ according to the Thevenin's theorem, Formula 59 is obtained.

$$V_{BGR} = (R_{41} + R_{42})I + R_{42}I_{COMP} = \quad \text{(Formula 59)}$$

$$(R_{41} + R_{42})\left\{2\frac{V_T \ln(n)}{R_{12}} + \frac{V_{BE2}}{R_3}\right\} +$$

$$R_{42}I_{COMP}$$

$$= \underbrace{\underbrace{(R_{41} + R_{42})\frac{V_{BE2}}{R_3}}_{VCTAT} + \underbrace{(R_{41} + R_{42})\left\{2\frac{V_T \ln(n)}{R_{12}}\right\}}_{VPTAT}}_{VBGR\_PTAT} +$$

$$\underbrace{R_{42}I_{COMP}}_{VCOMP}$$

Figure 26:
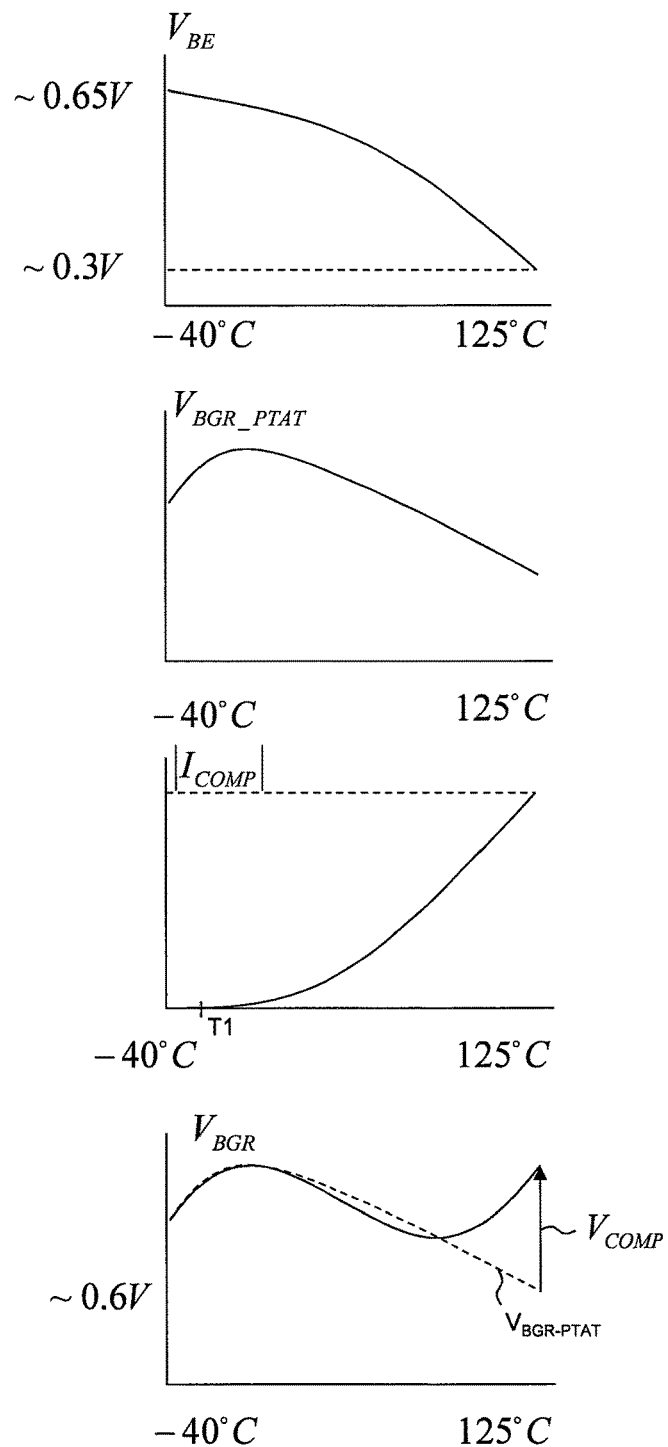
FIG. 26 is a diagram illustrating a principle of a method of correcting a non-linear temperature characteristic by a reference voltage generating circuit 5.

FIG. 26 is a diagram illustrating a principle of a method of correcting a non-linear temperature characteristic by the reference voltage generating circuit 5.

The reference voltage generating circuit 5 corrects a negative temperature dependence (first term: VCTAT) of the base-emitter voltage VBE of the bipolar transistor Q2 by a voltage (second term: VPTAT) that is proportional to the absolute temperature and a non-linear correcting voltage (third term: VCOMP). Since the correcting current $I_{COMP}$ has a characteristic that it increases on high temperature side with reference to a predetermined temperature T1 in a similar way to the reference voltage generating circuit 1, the non-linear correcting voltage (third term: VCOMP) becomes positive on the high temperature side, which is added as a Thevenin voltage. Accordingly, in the reference voltage generating circuit 5, as shown in FIG. 26, the sum (VBGR_PTAT) of the first term and the second term is optimized so that the temperature coefficient is zero on the low temperature side. Thus, it is possible to reduce the temperature drift of the output voltage $V_{BGR}$.

The above-described calculation is an approximate calculation in a similar way to the first embodiment, and precise values of the resistance value, the correcting current value and the like are calculated by simulation.

Further, addition of the start-up circuit and the low pass filter, and application to a system LSI or the like may be applied in a similar way to the first embodiment.

Hereinbefore, according to the reference voltage generating circuit 5 according to the fifth embodiment, in a similar way to the reference voltage generating circuit 1, it is possible to perform the low voltage output and the low power supply voltage operation, and to reduce the influence of the offset of the amplifier on the output voltage $V_{BGR}$. Further, it is possible to further reduce the temperature dependence of the output voltage $V_{BGR}$. Further, a method of adding the correcting current to the resistance R4 that generates the output voltage $V_{BGR}$ shown in the present embodiment may also be applied to the BGR circuit having a configuration in which the current is converted into the voltage and output as in PTL 2, and thus, it is similarly possible to reduce the temperature dependence of the output voltage $V_{BGR}$.

Sixth Embodiment

Figure 27:
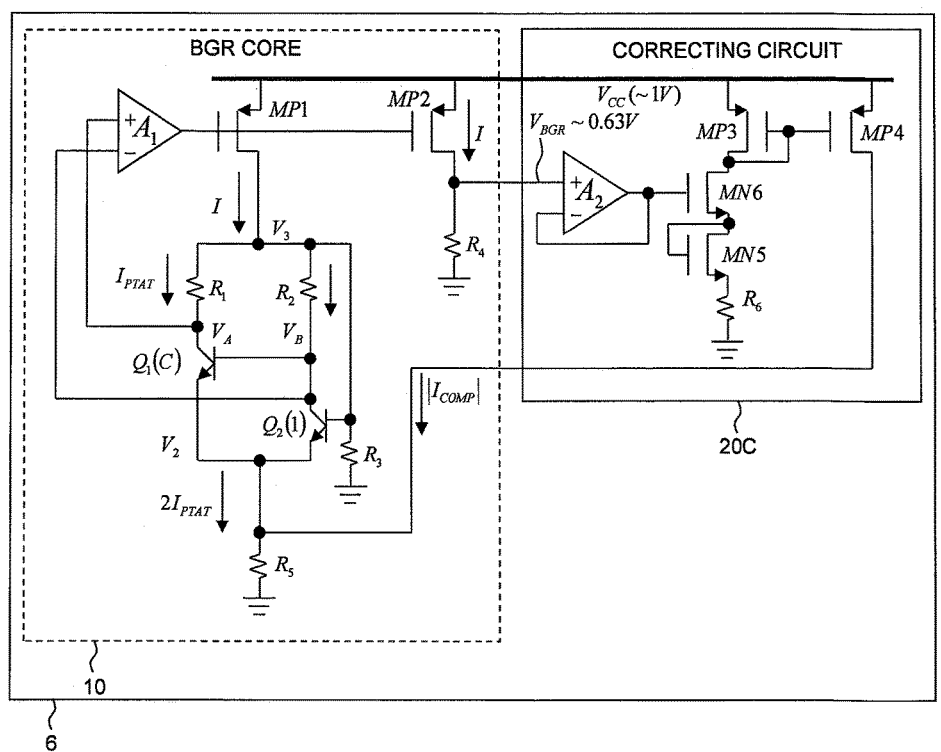
FIG. 27 is a circuit diagram illustrating an example of a reference voltage generating circuit according to a sixth embodiment.

FIG. 27 is a circuit diagram illustrating an example of a reference voltage generating circuit according to a sixth embodiment.

In FIG. 27, the same reference numerals are given to the same components and the like as in the reference voltage generating circuit 1 according to the first embodiment, and detailed description thereof will not be shown.

A reference voltage generating circuit 6 shown in FIG. 27 includes the BGR core circuit 10 and a non-linear correcting circuit 20C. The non-linear correcting circuit 20C generates the correcting current $I_{COMP}$ using a characteristic of a sub threshold region of a MOS transistor, unlike the non-linear correcting circuit 20 according to the first embodiment. The correcting circuit 20C includes an amplifier A2 that receives the output voltage $V_{BGR}$ of the BGR core circuit 10 as an input and buffers the received voltage to be output, an N-type MOS transistor MN6 that receives an output voltage of the amplifier A2 as an input at a gate terminal thereof, an N-type MOS transistor MN5 in which a drain terminal at the same electric potential as that of a gate terminal thereof is connected to a source terminal of the MN6, a resistance R6 that is provided between a source terminal of the MN5 and the ground node, and P-type MOS transistors MP3 and MP4 that form a current mirror circuit for outputting a correcting current on the basis of a current that flows in the MN6.

The correcting current $I_{COMP}$ may be expressed as Formula 60 when gate-source voltages of the MN5 and MN6 are represented as $V_{GS5}$ and $V_{GS6}$.

$$I_{COMP} = \frac{V_{BGR} - (V_{GS5} + V_{GS6})}{R_6} \quad \text{(Formula 60)}$$

Since the characteristic of the sub threshold region of the MOS transistor is a characteristic that is close to an $I_c$-$V_{BE}$ characteristic of the bipolar transistor, the MOS transistors MN5 and MN6 are operated in the sub threshold region, and thus, in a similar way to the correcting circuit 20 or the like, it is possible to generate the correcting current $I_{COMP}$ that increases on high temperature side with reference to a predetermined temperature. Thus, in a similar way to the first embodiment, it is possible to improve the non-linear temperature dependence of the output voltage.

The number of stages of the MOS transistors may be changed according to the characteristic of the sub threshold region of the MOS transistor. In FIG. 27, an example in which one MOS transistor MN5 is inserted and the correcting current is generated by two-stages of MOS transistors is shown as an example. Further, in FIG. 27, the amplifier A2 is inserted as a buffer, but the output voltage $V_{BGR}$ of the BGR core circuit 10 may be directly input to a gate side of the MN 6.

A feedback destination of the correcting current $I_{COMP}$ generated by the method according to the present embodiment is not limited to the resistance R5, and may be the resistance R3, a node of an electric potential VB, or the like, as shown in the other embodiments.

Further, addition of the start-up circuit and the low pass filter, and application to a system LSI or the like may be applied in a similar way to the other embodiments.

Hereinbefore, according to the reference voltage generating circuit 6 according to the sixth embodiment, in a similar way to the reference voltage generating circuit 1, it is possible to perform the low voltage output and the low power supply voltage operation, and to reduce the influence of the offset of the amplifier on the output voltage $V_{BGR}$. Further, it is possible to further reduce the temperature dependence of the output voltage $V_{BGR}$.

Seventh Embodiment

Figure 28:
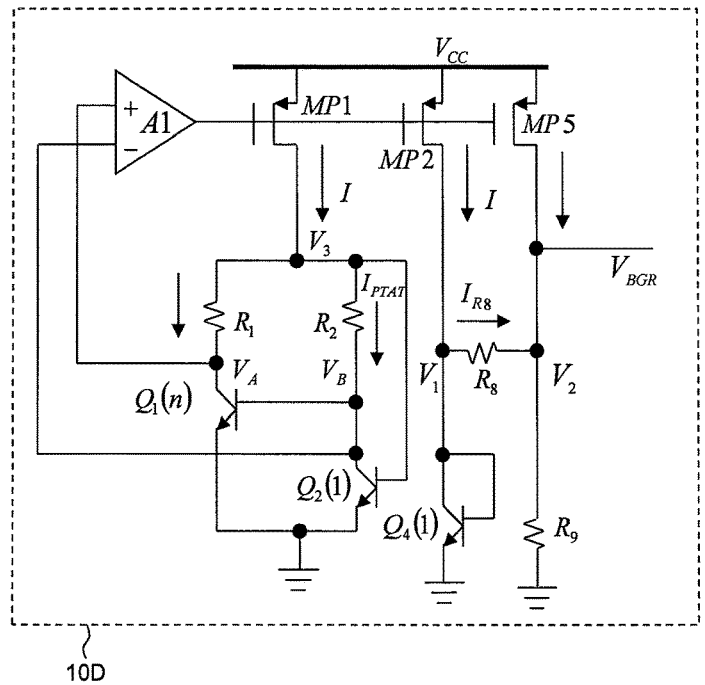
FIG. 28 is a circuit diagram illustrating an example of a BGR core circuit according to a seventh embodiment.

FIG. 28 is a circuit diagram illustrating an example of a BGR core circuit according to a seventh embodiment.

A BGR core circuit 10D shown in FIG. 28 is an example of another circuit configuration of the BGR core circuit in the above-described reference voltage generating circuit 1. In FIG. 28, the same reference numerals are given to the same components and the like as in the reference voltage generating circuit 1 according to the first embodiment, and detailed description thereof will not be shown.

The BGR core circuit 10D has a configuration in which the resistance R5 and the resistance R3 are removed from the BGR core circuit 10 and a circuit of an output stage that generates the output voltage $V_{BGR}$ is changed. Specifically, the circuit of the output stage includes a bipolar transistor Q4 that is grounded at an emitter terminal thereof and is diode-connected; a resistance R9 that is grounded at one terminal thereof; a resistance R8 that is provided between a collector side of the bipolar transistor Q4 and the other end of the resistance R9; and MOS transistors MP2 and MP5 that are connected on their drain sides to nodes to which both ends of the resistance R8 are connected and have the same electric potential as that of the gate terminal of the MOS transistor MP1 at their gate terminals.

The output voltage $V_{BGR}$ of the BGR core circuit 10D is as follows.

If $R_1=R_2=R_{12}$, in a similar way to the first embodiment, Formula 61, Formula 62A and Formula 62B are established in FIG. 28.

$$V_{BE1} + R_2 I_{PTAT} = V_{BE2} \quad \text{(Formula 61)}$$

$$V_{BE1} = V_T \ln\left(\frac{I_{PTAT}}{nI_S}\right) \quad \text{(Formula 62A)}$$

$$V_{BE2} = V_T \ln\left(\frac{I_{PTAT}}{I_S}\right) \quad \text{(Formula 62B)}$$

The current $I_{PTAT}$ is expressed as Formula 63 from Formula 61, Formula 62A and Formula 62B. Further, the current I is expressed as Formula 64 from the Kirchhoff's voltage law.

$$I_{PTAT} = \frac{V_{BE2} - V_{BE1}}{R_2} = \frac{V_T \ln(n)}{R_2} \quad \text{(Formula 63)}$$

$$I = 2I_{PTAT} \quad \text{(Formula 64)}$$

If the Kirchhoff's voltage law is applied to the output stage of FIG. 28, a current $I_{R8}$ is expressed as Formula 65. Further, since a current that is the sum of the current $I_{R8}$ and a drain current I of the MP5 flows through the resistance R9, the $V_{BGR}$ is expressed as Formula 66.

$$I_{R8} = \frac{V_{VBE4} - V_{BGR}}{R_8} \quad \text{(Formula 65)}$$

-continued $$V_{BGR} = R_9(I + I_{R8}) \quad \text{(Formula 66)}$$

Accordingly, Formula 67 is obtained from Formula 63 to Formula 66, and from Formula 67, the output voltage $V_{BGR}$ is expressed as Formula 68.

$$V_{BGR} = R_9\left(2\frac{V_T \ln(n)}{R_2} + \frac{V_{VBE4} - V_{BGR}}{R_8}\right) \quad \text{(Formula 67)}$$

$$V_{BGR} = \frac{R_9}{R_8 + R_9}\left\{V_{BE3} + \frac{2R_8}{R_{12}}V_T \ln(n)\right\} \quad \text{(Formula 68)}$$

In Formula 68, if $R_4/(R_3+R_4)<1$, the output voltage $V_{BGR}$ may be 1.0 V or lower. Accordingly, according to the BGR core circuit 10D, in a similar way to the BGR core circuit 10, it is possible to perform the low voltage output and the low power supply voltage operation, and to reduce the influence of the offset of the amplifier on the output voltage $V_{BGR}$.

Further, as understood from Formula 64, the current I output from the MOS transistor MP1 does not include a current having a non-linear temperature characteristic based on the base-emitter voltage VBE. That is, according to the BGR core circuit 10D, it is possible to generate and output a current IPTAT that is proportional to the temperature.

Figure 29:
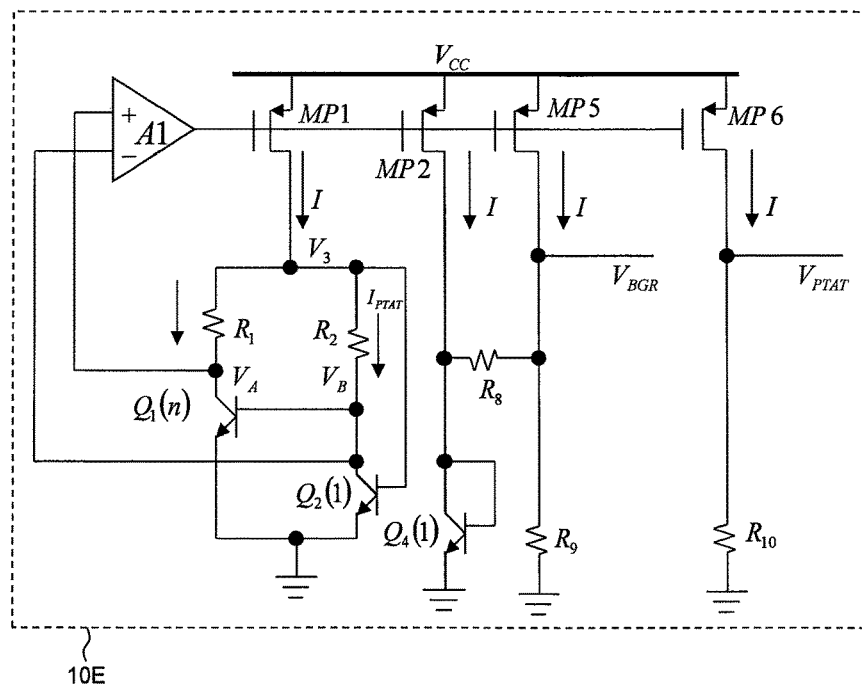
FIG. 29 is a circuit diagram illustrating an example of a BGR core circuit that includes a voltage generating section that generates a voltage (VPTAT) that is proportional to the absolute temperature.

FIG. 29 is a circuit diagram illustrating an example of a BGR core circuit that includes a voltage generating section that generates a voltage (VPTAT) that is proportional to the absolute temperature.

A BGR core circuit 10E shown in FIG. 29 includes a PTAT voltage generating section that includes a P-channel MOS transistor MP6 in which a source electric potential and a gate electric potential are the same as in MP1 and a resistance R10 that is provided between a drain terminal of the MP6 and the ground node, in addition to the BGR core circuit 10D. Accordingly, it is possible to easily generate the PTAT voltage.

Figure 30:
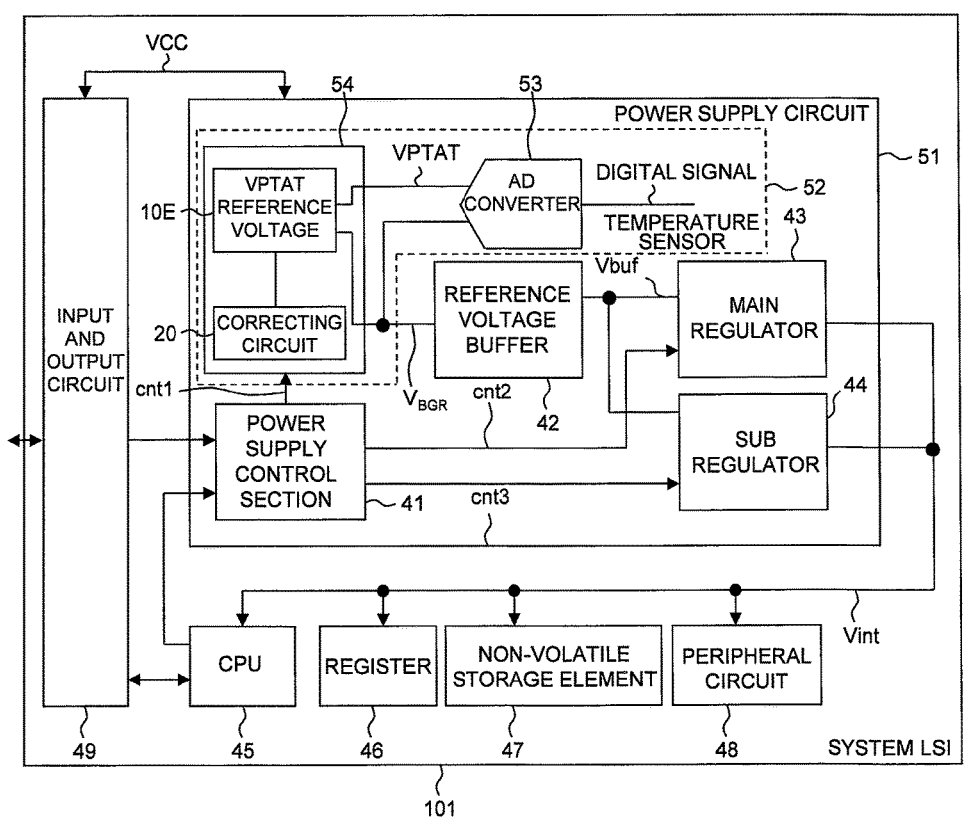
FIG. 30 is a block diagram illustrating an example of a semiconductor integrated circuit device to which a reference voltage generating circuit that includes a BGR core circuit 10E and a non-linear correcting circuit is applied.

FIG. 30 is a block diagram illustrating an example of a semiconductor integrated circuit device to which a reference voltage generating circuit that includes the BGR core circuit 10E and a non-linear correcting circuit is applied.

Although there is no particular limitation, a semiconductor integrated circuit device 101 is a system LSI in which a power supply circuit is installed, for example.

The semiconductor integrated circuit device 101 has a configuration in which a temperature sensor 52 is added to the semiconductor integrated circuit device (system LSI) 100 described above in FIG. 18. The temperature sensor 52 includes a reference voltage generating circuit 54 and an AD converter 53. The reference voltage generating circuit 54 includes the BGR core circuit 10E and the non-linear correcting circuit 20, for example.

According to the above-described BGR core circuits 10D and 10E according to the seventh embodiment, in a similar way to the BGR circuit 10 according to the first embodiment, it is possible to perform the low voltage output and the low power supply voltage operation, and to reduce the influence of the offset of the amplifier on the output voltage $V_{BGR}$. Further, it is possible to easily generate the PTAT voltage.

Eighth Embodiment

Figure 31:
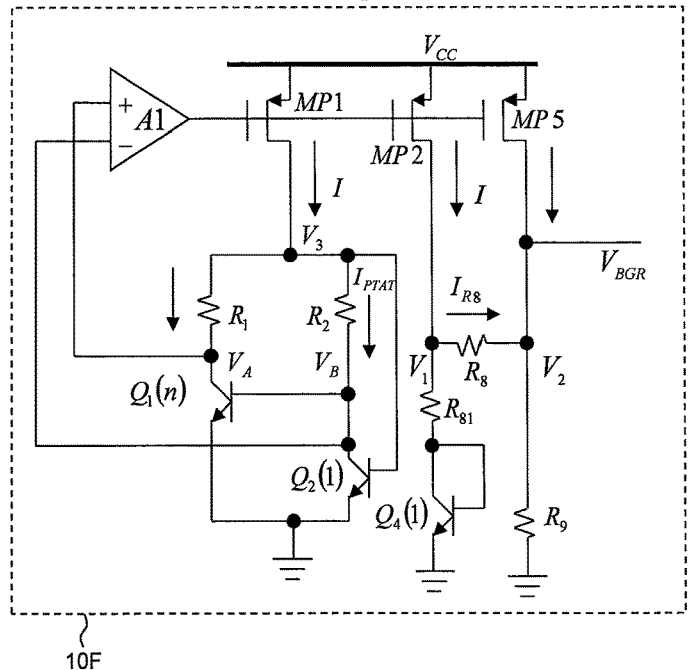
FIG. 31 is a circuit diagram illustrating an example of a BGR core circuit according to an eighth embodiment.

FIG. 31 is a circuit diagram illustrating an example of a BGR core circuit according to an eighth embodiment of the invention.

A BGR core circuit 10F shown in FIG. 31 is an example of another circuit configuration of the BGR core circuit in the above-described reference voltage generating circuit 1. In FIG. 31, the same reference numerals are given to the same components and the like as in the reference voltage generating circuit 1 according to the first embodiment, and detailed description thereof will not be shown.

The BGR core circuit 10F has a configuration in which a resistance R81 is added on a collector side of the bipolar transistor Q4 with respect to the BGR core circuit 10D.

Accordingly, in a similar way to the BGR circuit 10D, it is possible to perform the low voltage output and the low power supply voltage operation, and to reduce the influence of the offset of the amplifier on the output voltage $V_{BGR}$. Further, it is possible to easily generate the VPTAT voltage.

Ninth Embodiment

Figure 32:
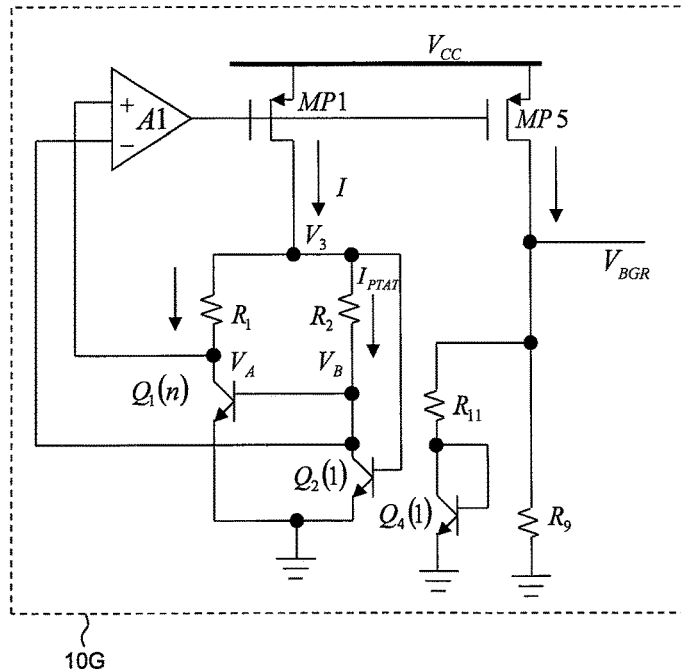
FIG. 32 is a circuit diagram illustrating an example of a BGR core circuit according to a ninth embodiment.

FIG. 32 is a circuit diagram illustrating an example of a BGR core circuit according to a ninth embodiment of the invention.

A BGR core circuit 10G shown in FIG. 32 is an example of another circuit configuration of the BGR core circuit in the above-described reference voltage generating circuit 1. In FIG. 32, the same reference numerals are given to the same components and the like as in the reference voltage generating circuit 1 according to the first embodiment, and detailed description thereof will not be shown.

The BGR core circuit 10G has a configuration in which the resistance R5 and the resistance R3 are removed from the BGR core circuit 10 and a circuit of an output stage that generates the output voltage $V_{BGR}$ is modified. Specifically, the circuit of the output stage includes a bipolar transistor Q4 that is grounded at an emitter terminal thereof and is diode-connected; a resistance R9 that is grounded at one terminal thereof; a resistance R11 that is provided between a collector side of the bipolar transistor Q4 and the other end of the resistance R9; and a MOS transistor MP5 that is connected to a connection node of the resistances R11 and R9 on a drain side thereof and includes a gate terminal at the same electric potential as that of the gate terminal of the MOS transistor Mph.

The output voltage $V_{BGR}$ of the BGR core circuit 10G is expressed as Formula 69.

$$V_{BGR} = \frac{R_9}{R_{11} + R_9}\left\{V_{BE3} + \frac{2R_{11}}{R_{12}}V_T \ln(n)\right\} \quad \text{(Formula 69)}$$

Figure 33:
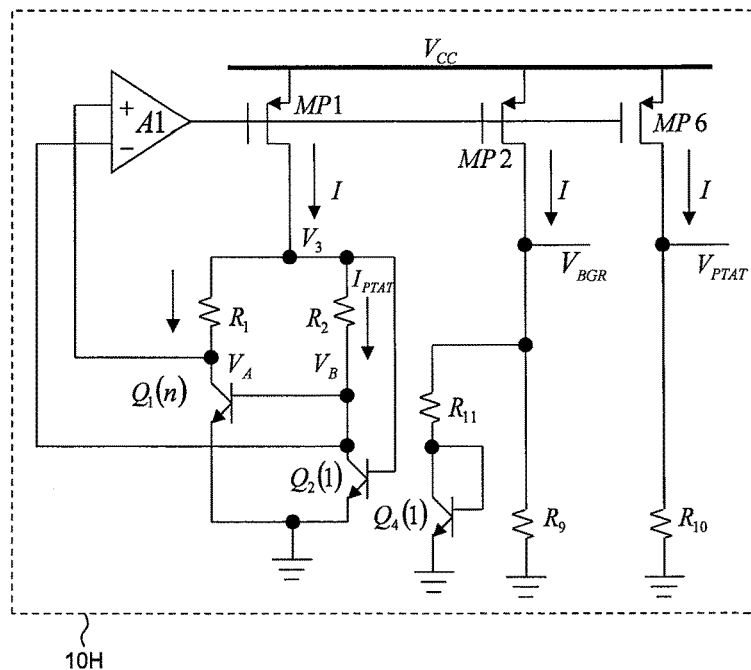
FIG. 33 is a circuit diagram illustrating another example of a BGR core circuit that includes a voltage generating section that generates a voltage (VPTAT) that is proportional to the absolute temperature.

FIG. 33 is a diagram illustrating an example of a circuit that includes a voltage generating section that generates a voltage (VPTAT) that is proportional to the absolute temperature in the BGR core circuit 10G in FIG. 32.

A BGR core circuit 10H shown in FIG. 33 includes a PTAT voltage generating section that includes a P-channel MOS transistor MP6 in which a source electric potential and a gate electric potential are the same as in MP1 and a resistance R10 that is provided between a drain terminal of the MP6 and the ground node, in addition to the BGR core circuit 10G. Accordingly, it is possible to easily generate the PTAT voltage.

According to the above-described BGR core circuit 10H according to the ninth embodiment, in a similar way to the BGR core circuit 10D, it is possible to perform the low voltage output and the low power supply voltage operation,

Tenth Embodiment

Figure 34:
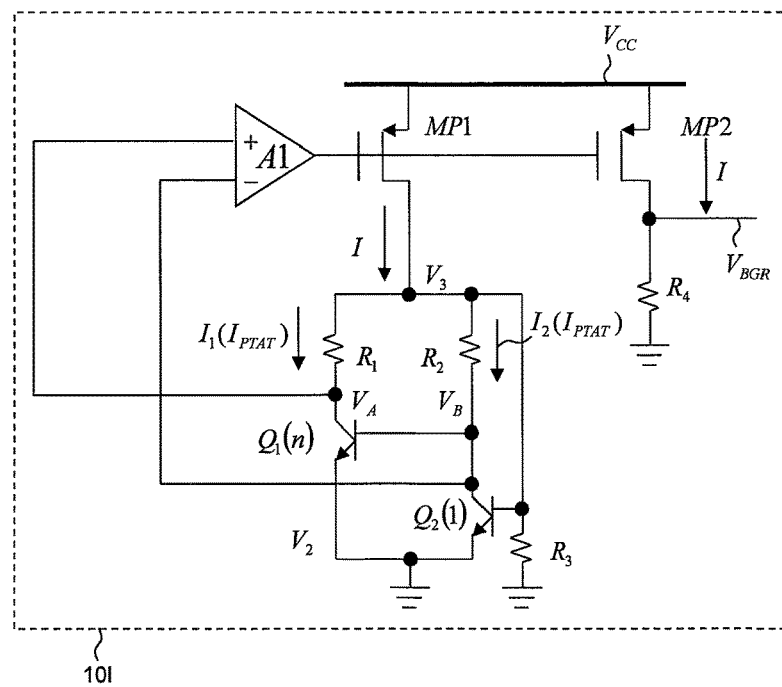
FIG. 34 is a circuit diagram illustrating an example of a BGR core circuit according to a tenth embodiment.

FIG. 34 is a circuit diagram illustrating an example of a BGR core circuit according to a tenth embodiment of the invention.

A BGR core circuit 10I shown in FIG. 34 is an example of another circuit configuration of the BGR core circuit in the above-described reference voltage generating circuit 1. In FIG. 34, the same reference numerals are given to the same components and the like as in the reference voltage generating circuit 1 according to the first embodiment, and detailed description thereof will not be shown.

The BGR core circuit 10I has a configuration in which the resistance R5 is removed from the BGR core circuit 10. Thus, the common input voltages of the amplifier A1 are low compared with the BGR core circuit 10. The output voltage $V_{BGR}$ of the BGR core circuit 10I is the same as in the BGR core circuit 10. According to the BGR core circuit 10I, it is possible to perform the low voltage output and the low power supply voltage operation, and to reduce the influence of the offset of the amplifier on the output voltage $V_{BGR}$.

Eleventh Embodiment

Figure 35:
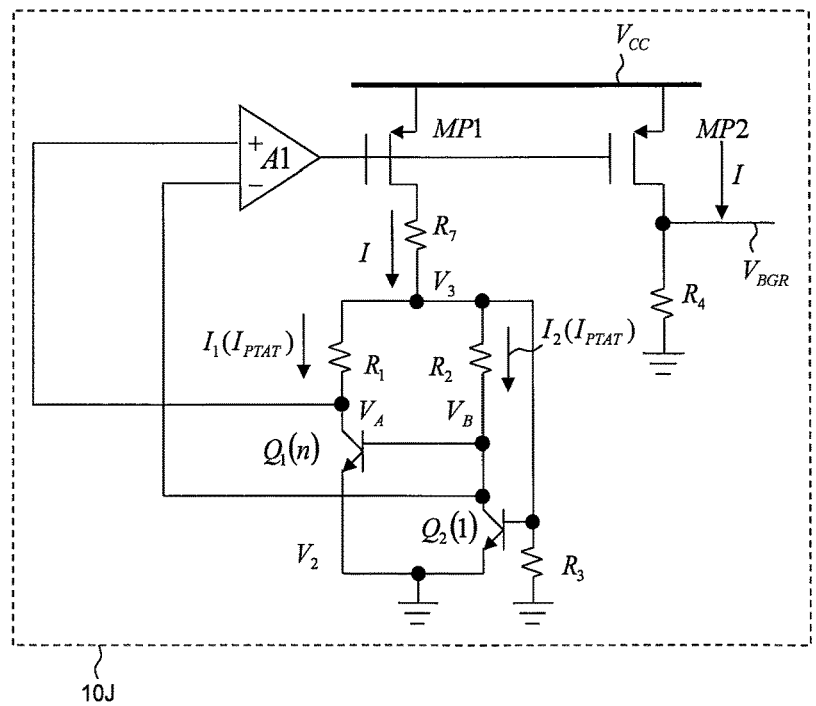
FIG. 35 is a circuit diagram illustrating an example of a BGR core circuit according to an eleventh embodiment.

FIG. 35 is a circuit diagram illustrating an example of a BGR core circuit according to an eleventh embodiment of the invention.

A BGR core circuit 10J shown in FIG. 35 is an example of another circuit configuration of the BGR core circuit in the above-described reference voltage generating circuit 1. In FIG. 35, the same reference numerals are given to the same components and the like as in the reference voltage generating circuit 1 according to the first embodiment, and detailed description thereof will not be shown.

The BGR core circuit 10J has a configuration in which the resistance R5 is removed from the BGR core circuit 10 and a resistance R7 is provided between the drain terminal of the MOS transistor MP1 and the connection node of the resistances R1 and R2. Thus, it is possible to adjust the common input voltages of the amplifier A1. The output voltage $V_{BGR}$ of the BGR core circuit 10J is the same as in the BGR core circuit 10. According to the BGR core circuit 10J, it is possible to perform the low voltage output and the low power supply voltage operation, and to reduce the influence of the offset of the amplifier on the output voltage $V_{BGR}$.

Twelfth Embodiment

Figure 36:
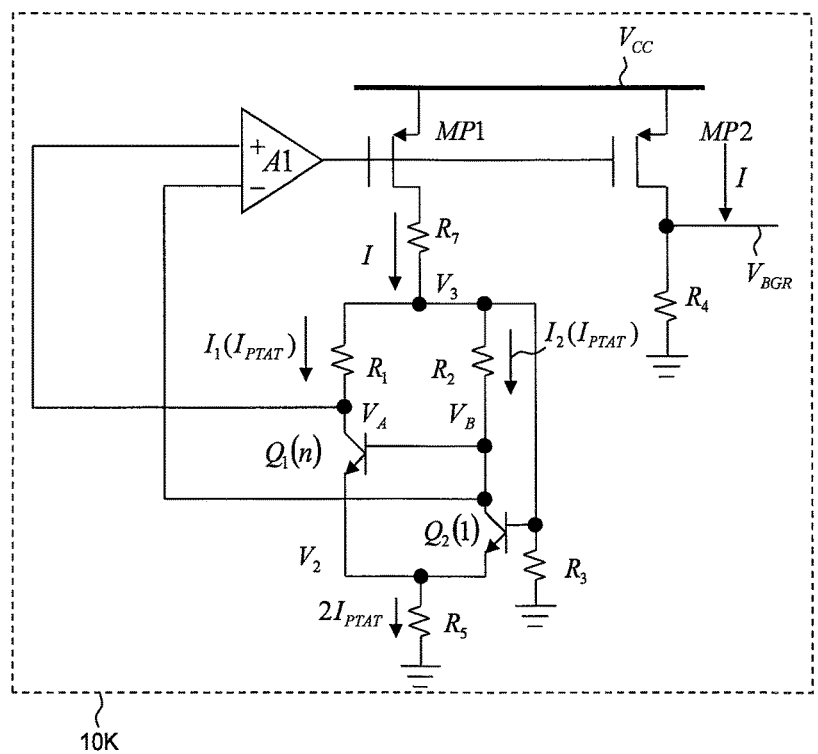
FIG. 36 is a circuit diagram illustrating an example of a BGR core circuit according to a twelfth embodiment.

FIG. 36 is a circuit diagram illustrating an example of a BGR core circuit according to a twelfth embodiment of the invention.

The BGR core circuit 10K shown in FIG. 36 is an example of another circuit configuration of the BGR core circuit in the above-described reference voltage generating circuit 1. In FIG. 36, the same reference numerals are given to the same components and the like as in the reference voltage generating circuit 1 according to the first embodiment, and detailed description thereof will not be shown.

The BGR core circuit 10K has a configuration in which the resistance R7 is provided between the drain terminal of the MOS transistor MP1 and the connection node of the resistances R1 and R2, to the BGR core circuit 10. Thus, it is possible to adjust the common input voltages of the amplifier A1. The output voltage $V_{BGR}$ of the BGR core circuit 10K is the same as in the BGR core circuit 10. According to the BGR core circuit 10K, it is possible to perform the low voltage output and the low power supply voltage operation, and to reduce the influence of the offset of the amplifier on the output voltage $V_{BGR}$.

Thirteenth Embodiment

Figure 37:
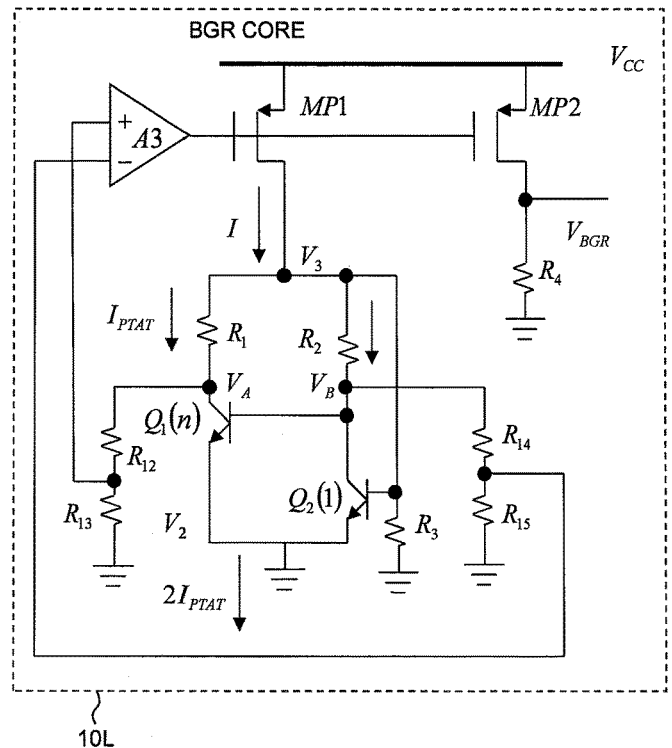
FIG. 37 is a circuit diagram illustrating an example of a BGR core circuit according to a thirteenth embodiment.

FIG. 37 is a circuit diagram illustrating an example of a BGR core circuit according to a thirteenth embodiment.

The BGR core circuit 10L shown in FIG. 37 is an example of another circuit configuration of the BGR core circuit in the above-described reference voltage generating circuit 1. In FIG. 37, the same reference numerals are given to the same components and the like as in the reference voltage generating circuit 1 according to the first embodiment, and detailed description thereof will not be shown.

The BGR core circuit 10L has a configuration in which the resistance R5 is removed from the BGR core circuit 10 and the voltages on the collector sides of the bipolar transistors Q1 and Q2 are divided to be input to an amplifier A3. In FIG. 37, a method of dividing the voltages by resistances R12 and R13 and resistances R14 and R15 is shown as an example. Thus, it is possible to lower the common input voltages of the amplifier A3, and to easily design the amplifier A3.

Figure 38:
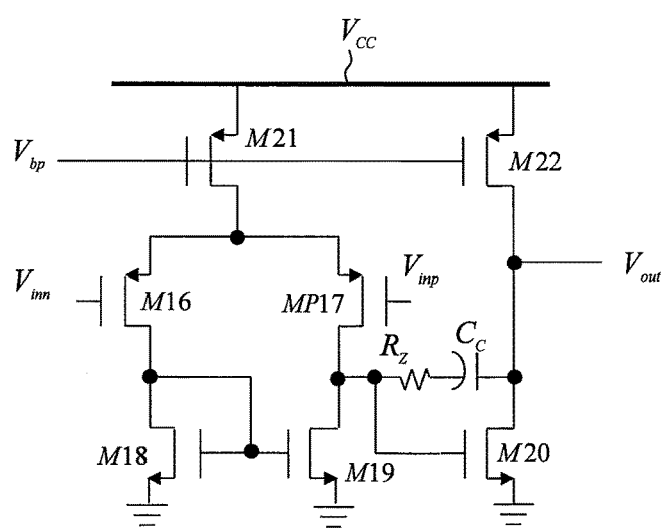
FIG. 38 is a circuit diagram illustrating an example of an amplifier A3 of a BGR core circuit 10L.

FIG. 38 is a circuit diagram illustrating an example of the amplifier A3.

As shown in FIG. 38, by lowering the common input voltages of the amplifier, it is possible to use a differential amplifier that uses a P-channel MOS transistor at an input stage, as the amplifier A3. In FIG. 38, a voltage Vbp represents a bias voltage.

The output voltage $V_{BGR}$ of the BGR core circuit 10L is the same as in the BGR core circuit 10. According to the BGR core circuit 10L, it is possible to perform the low voltage output and the low power supply voltage operation, and to reduce the influence of the offset of the amplifier on the output voltage $V_{BGR}$.

A method of dividing and adjusting the common input voltages of the amplifier A3 (A1) may be applied to the BGR core circuit according to the other embodiments. Further, in the present embodiment, an example of a configuration in which the resistance R5 is removed is shown, but the resistance R5 may be connected as it is.

Fourteenth Embodiment

Figure 39:
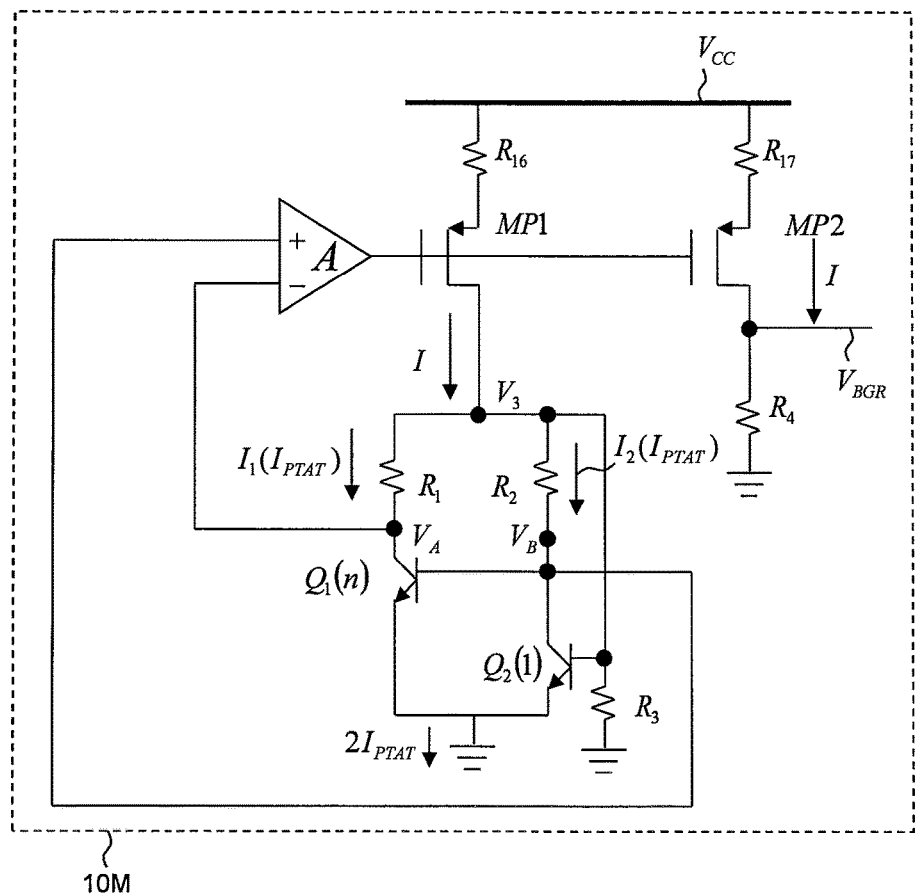
FIG. 39 is a circuit diagram illustrating an example of a BGR core circuit according to a fourteenth embodiment.

FIG. 39 is a circuit diagram illustrating an example of a BGR core circuit according to a fourteenth embodiment.

A BGR core circuit 10M shown in FIG. 39 is an example of another circuit configuration of the BGR core circuit in the above-described reference voltage generating circuit 1. In FIG. 39, the same reference numerals are given to the same components and the like as in the reference voltage generating circuit 1 according to the first embodiment, and detailed description thereof will not be shown.

The BGR core circuit 10M has a configuration in which the resistance R5 is removed from the BGR core circuit 10, a resistance R16 is provided between a source terminal of the MOS transistor MP1 and the power source Vcc and a resistance R17 is provided between a source terminal of the MOS transistor MP2 and the power source Vcc. Accordingly, it is possible to reduce mismatching of the current of the MOS transistor MP1 and the current of the MOS transistor MP2 by source degeneration.

The output voltage $V_{BGR}$ of the BGR core circuit 10L is the same as in the BGR core circuit 10. According to the BGR core circuit 10L, it is possible to perform the low voltage output and the low power supply voltage operation, and to reduce the influence of the offset of the amplifier on the output voltage $V_{BGR}$.

A method of inserting the degeneration resistances R16 and R17 may be applied to the BGR core circuit according to the other embodiments. Further, in the present embodiment, an example of a configuration in which the resistance R5 is removed is shown, but the resistance R5 may be connected as it is.

Fifteenth Embodiment

Figure 40:
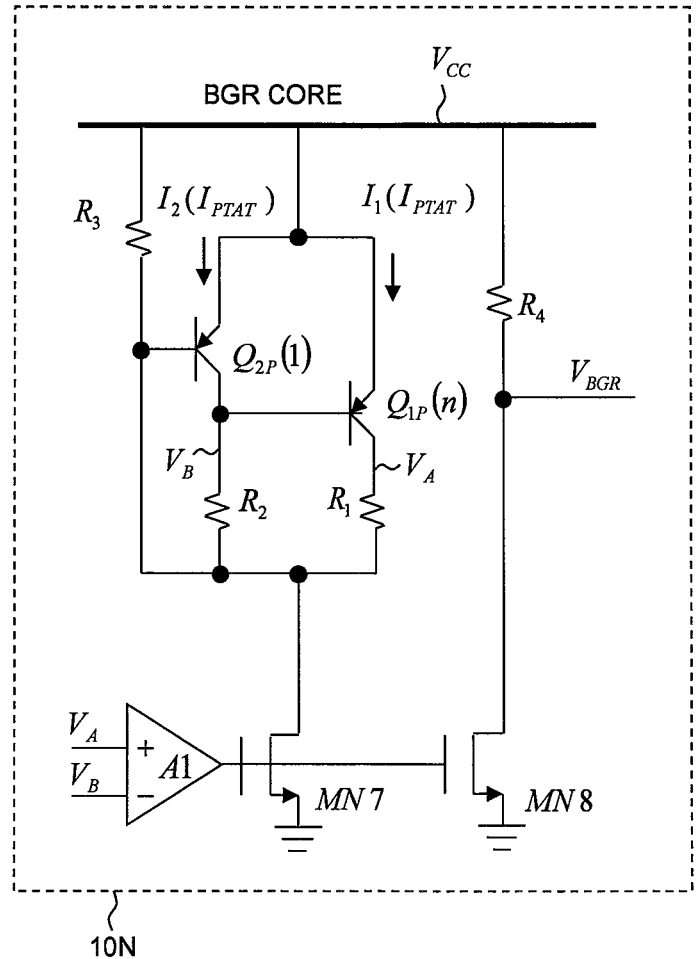
FIG. 40 is a circuit diagram illustrating an example of a BGR core circuit according to a fifteenth embodiment.

FIG. 40 is a circuit diagram illustrating an example of a BGR core circuit according to a fifteenth embodiment.

A BGR core circuit 10N shown in FIG. 40 is an example of another circuit configuration of the BGR core circuit in the above-described reference voltage generating circuit 1. In FIG. 40, the same reference numerals are given to the same components and the like as in the reference voltage generating circuit 1 according to the first embodiment, and detailed description thereof will not be shown.

The BGR core circuit 10N is a circuit in which PNP bipolar transistors are used, unlike the BGR core circuit 10. A specific circuit configuration thereof is as follows. As shown in FIG. 40, the BGR core circuit 10N includes a pair of PNP bipolar transistors Q1P and Q2P that are connected in common at emitter terminals thereof; resistances R1 and R2 that are connected in common to a base terminal of the bipolar transistor Q2P at one end thereof and are connected to collector terminals of the bipolar transistors Q1P and Q2P at the other ends thereof; and a resistance R3 that is provided between the base terminal of the bipolar transistor Q2P and a power supply Vcc. Further, the BGR core circuit 10 includes a differential amplifier A1 that receives, as inputs, respective electric potentials on the collector sides of the bipolar transistors Q1 and Q2, respectively; N-channel MOS transistors MN7 and MN8 that receive an output voltage of the differential amplifier A1 as an input at a gate terminal thereof and include a source terminal connected to the ground node; and a resistance R4 that is provided between a drain terminal of the MOS transistor MN8 and the power supply Vcc. As the drain terminal of the MOS transistor MN7 is connected to a connection node of the resistances R1 and R2, a feedback loop is formed. Further, in the bipolar transistors Q1P and Q2P, the emitter area of the bipolar transistor Q1P is larger than the emitter area of the bipolar transistor Q2P by n (n is an integer of 2 or more) times. That is, when the same current flows in the bipolar transistors Q1P and Q2P, the emitter current density of the bipolar transistor Q2P is set to be n times the emitter current density of the transistor Q1P.

Here, if $R_1=R_2=R_{12}$, $I_{PTAT}$ is expressed as Formula 70, and thus, the output voltage $V_{BGR}$ of the BGR core circuit 10N is expressed as Formula 71.

$$I_{PTAT} = \frac{V_T \ln(n)}{R_{12}} \quad \text{(Formula 70)}$$

$$V_{BGR} = V_{CC} - 2R_4 I_{PTAT} = V_{CC} - 2R_4 \frac{V_T \ln(n)}{R_{12}} \quad \text{(Formula 71)}$$

According to the BGR core circuit 10N that has a configuration in which the BGR core circuit 10 is inverted, in a similar way to the BGR core circuit 10, it is possible to perform the low voltage output and the low power supply voltage operation, and to reduce the influence of the offset of the amplifier on the output voltage $V_{BGR}$.

Sixteenth Embodiment

Figure 41:
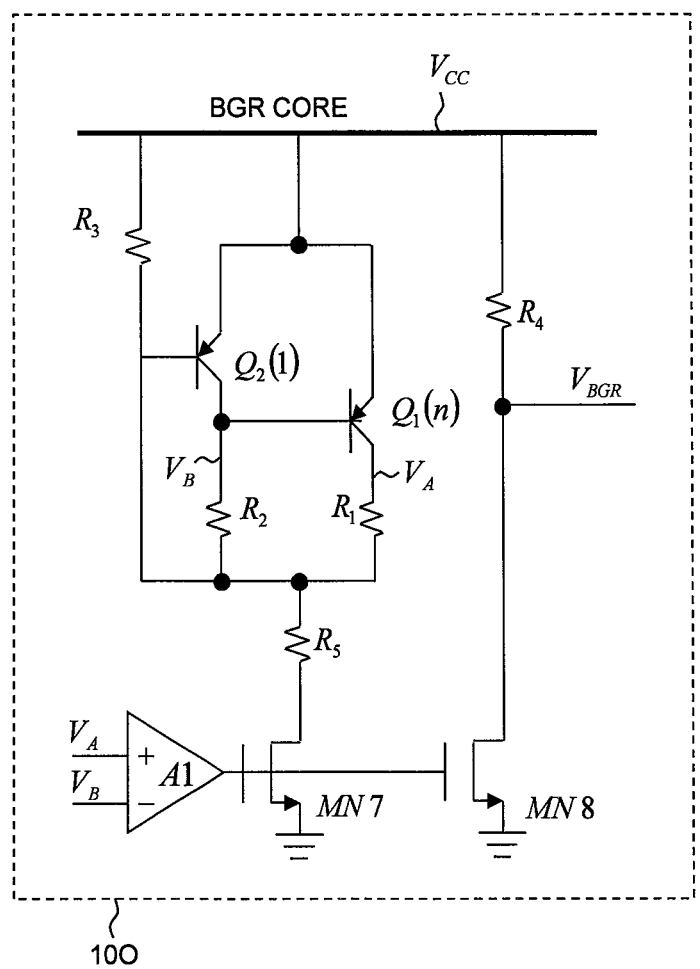
FIG. 41 is a circuit diagram illustrating an example of a BGR core circuit according to a sixteenth embodiment.

FIG. 41 is a circuit diagram illustrating an example of a BGR core circuit according to a sixteenth embodiment.

A BGR core circuit 100 shown in FIG. 41 is an example of another circuit configuration of the BGR core circuit in the above-described reference voltage generating circuit 1. In FIG. 41, the same reference numerals are given to the same components and the like as in the reference voltage generating circuit 1 according to the first embodiment, and detailed description thereof will not be shown.

The BGR core circuit 100 has a configuration in which the resistance R5 is inserted between a connection node of the resistance R1 and the resistance R2 and a drain terminal of MN7 with respect to the BGR core circuit 10N according to the fifteenth embodiment. Accordingly, it is possible to adjust the common input voltages of the amplifier A1 to be increased. The output voltage $V_{BGR}$ of the BGR core circuit 100 is the same in the BGR core circuit 10N. According to the BGR core circuit 100, it is possible to perform the low voltage output and the low power supply voltage operation, and to reduce the influence of the offset of the amplifier on the output voltage $V_{BGR}$.

Seventeenth Embodiment

Figure 42:
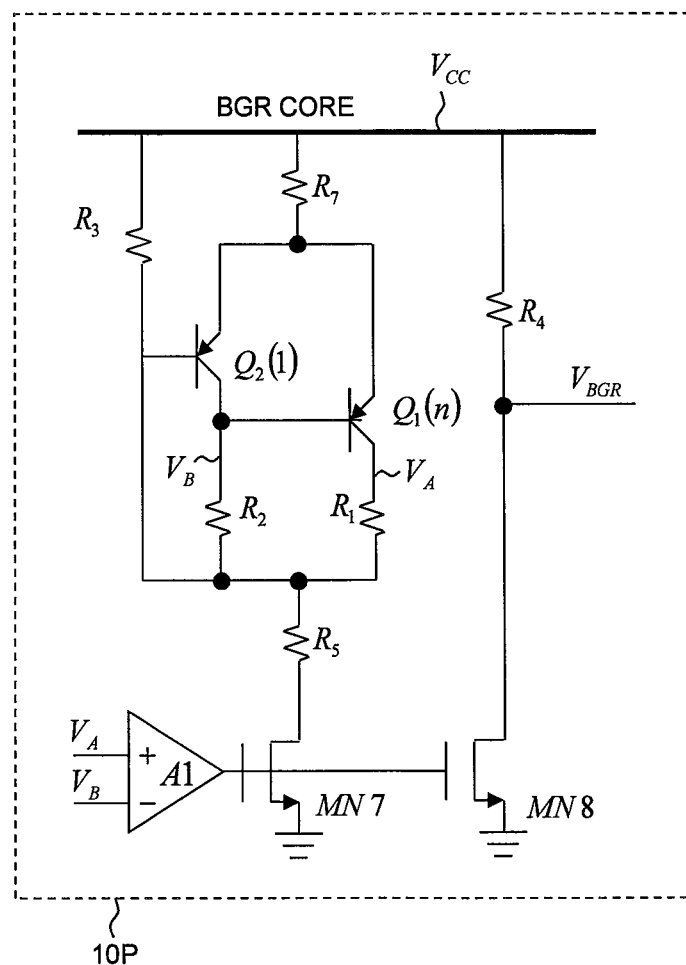
FIG. 42 is a circuit diagram illustrating an example of a BGR core circuit according to a seventeenth embodiment.

FIG. 42 is a circuit diagram illustrating an example of a BGR core circuit according to a seventeenth embodiment.

A BGR core circuit 10P shown in FIG. 42 is an example of another circuit configuration of the BGR core circuit in the above-described reference voltage generating circuit 1. In FIG. 42, the same reference numerals are given to the same components and the like as in the reference voltage generating circuit 1 according to the first embodiment, and detailed description thereof will not be shown.

The BGR core circuit 10P has a configuration in which the resistance R5 is inserted between a connection node of the resistance R1 and the resistance R2 and a drain terminal of MN7 and the resistance R7 is inserted between a connection node of the bipolar transistors Q1P and Q2P and the power supply Vcc with respect to the BGR core circuit 10N according to the fifteenth embodiment. Accordingly, it is possible to adjust the common input voltages of the amplifier A1. The output voltage $V_{BGR}$ of the BGR core circuit 10P is the same in the BGR core circuit 10N. According to the BGR core circuit 10P, it is possible to perform the low voltage output and the low power supply voltage operation, and to reduce the influence of the offset of the amplifier on the output voltage $V_{BGR}$.

Eighteenth Embodiment

Figure 43:
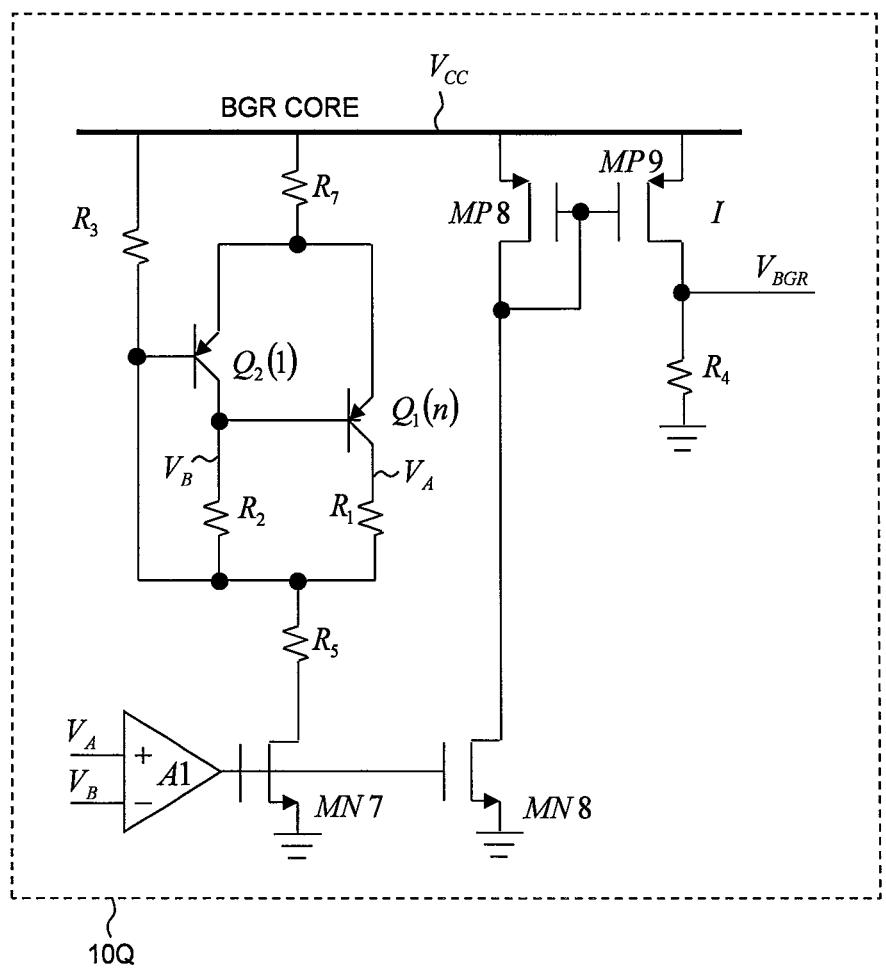
FIG. 43 is a circuit diagram illustrating an example of a BGR core circuit according to an eighteenth embodiment.

FIG. 43 is a circuit diagram illustrating an example of a BGR core circuit according to an eighteenth embodiment.

A BGR core circuit 10Q shown in FIG. 43 is an example of another circuit configuration of the BGR core circuit in the above-described reference voltage generating circuit 1. In FIG. 43, the same reference numerals are given to the same components and the like as in the reference voltage generating circuit 1 according to the first embodiment, and detailed description thereof will not be shown.

The BGR core circuit 10Q has a configuration in which the output voltage $V_{BGR}$ is generated on the basis of a current obtained by inverting the current that flows in MN8, unlike the BGR core circuit 10N according to the fifteenth embodiment. Specifically, the BGR core circuit 10Q further includes a current mirror circuit (MP8 and MP9) that generates a current I on the basis of the current that flows in MN8 and supplies the generated current to the resistance R4.

The BGR core circuits in the fifteenth embodiment to the seventeenth embodiment are methods of obtaining the output voltages $V_{BGR}$ based on the power supply VCC, but according to the BGR core circuit 10Q according to the present embodiment, it is possible to obtain an output voltage based on the ground. Further, in a similar way to the BGR core circuit 10N or the like, it is possible to achieve the low voltage output and the low power supply voltage operation, and to reduce the influence of the offset of the amplifier on the output voltage V.

In the present embodiment, a configuration example in which the resistances R5 and R6 are inserted is shown, but a configuration in which any one or both of the resistances R5 and R6 are removed may be used.

Nineteenth Embodiment

Figure 44:
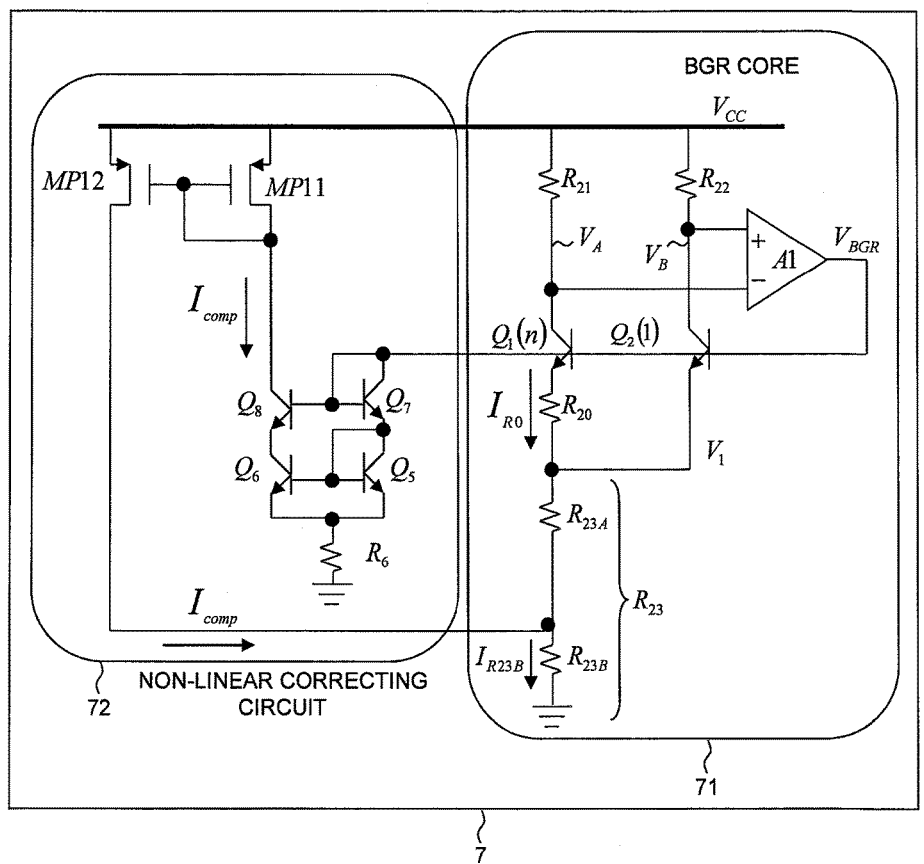
FIG. 44 is a circuit diagram illustrating an example of a reference voltage generating circuit according to a nineteenth embodiment.

FIG. 44 is a circuit diagram illustrating an example of a reference voltage generating circuit according to a nineteenth embodiment.

A reference voltage generating circuit 7 shown in FIG. 44 has a configuration in which a non-linear correction is performed in a BGR core circuit having an output of about 1.2 V. Although there is no particular limitation, the BGR core circuit shown in FIG. 5 is shown as an example of the BGR core circuit having the output of about 1.2 V in FIG. 44.

The reference voltage generating circuit 7 shown in FIG. 44 includes a BGR core circuit 71 and a non-linear correcting circuit 72.

The BGR core circuit 71 has a circuit configuration in which the BGR core circuit in FIG. 5 is used as a base as described above. A specific configuration thereof is as follows. The BGR core circuit 71 shown in FIG. 44 includes a pair of NPN bipolar transistors Q1 and Q2 that are connected in common at base terminals thereof; a resistance R22 that is provided between a collector terminal of the bipolar transistor Q2 and a power supply Vcc; a resistance R21 that is provided between a collector terminal of the bipolar transistor Q1 and the power supply Vcc; a resistance R20 that is provided between an emitter terminal of the bipolar transistor Q1 and an emitter terminal of the bipolar transistor Q2; a resistance R23 that is provided between the emitter terminal of the bipolar transistor Q2 and the ground (ground node). Further, the BGR core circuit includes a differential amplifier A1 that receives, as inputs, respective electric potentials on the collector sides of the bipolar transistors Q1 and Q2, respectively and is connected to the base sides of the bipolar transistors Q1 and Q2 at an output thereof. In the bipolar transistors Q1 and Q2, the emitter area of the bipolar transistor Q1 is larger than the emitter area of the bipolar transistor Q2 by n (n is an integer of 2 or more) times. That is, when the same current flows in the bipolar transistors Q1 and Q2, the emitter current density of the bipolar transistor Q2 is set to be n times the emitter current density of the transistor Q1. Further, the resistance R23 is divided into a resistance R23A and a resistance R23B, and a correcting current $I_{COMP}$ is supplied to a connection node of both the resistances.

The correcting circuit 72 has a configuration in which the correcting current $I_{COMP}$ is generated from bipolar transistors Q5 to Q8 and the resistance R6 on the basis of the output voltage $V_{BGR}$ and the correcting current $I_{COMP}$ is fed back to the BGR core by a current mirror circuit that includes MP11 and MP12. The correcting current $I_{COMP}$ is expressed as Formula 72 by the correcting circuit 72.

$$I_{COMP} = \begin{cases} 0 (V_{BGR} \leq 2V_{BE5,7}) \\ \dfrac{V_{BGR} - 2V_{BE5,7}}{2R_6} (V_{BGR} \geq 2V_{BE5,7}) \end{cases} \quad \text{(Formula 72)}$$

A principle of generation of the correcting current $I_{COMP}$ is the same as in the correcting circuit 20 according to the first embodiment, but in the case of the BGR core circuit 71, since the output voltage $V_{BGR}$ is about 1.2 V, by forming the bipolar transistors Q5 and Q7 (Q6 and Q8) in a double-stage structure, a base-emitter voltage VBE becomes two times, to thereby generate a preferable correcting current $I_{COMP}$. Here, VBE is set to be two times in consideration of a case where VBE of the bipolar transistor is about 0.7 V at low temperature and about 0.35 V at high temperature, and thus, the number of stages of the bipolar transistors Q5 and Q7 (Q6 and Q8) is adjusted according to the value of the output voltage $V_{BGR}$ and the value of VBE.

The above calculation is an approximate calculation. In actuality, a loop is formed between the BGR core circuit 71 and the correcting circuit 72 to cause feedback, and thus, the values of the resistance, the correcting current $I_{COMP}$ and the like show some variances from the above calculation. Precise values may be calculated by simulation.

FIGS. 45A to 45D are diagrams illustrating a principle of a method of correcting a non-linear temperature characteristic by the reference voltage generating circuit 7.

Figure 45A:
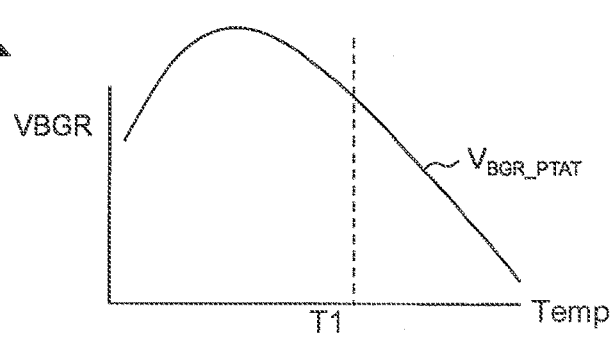
FIGS. 45A to 45D are diagrams illustrating a principle of a method of correcting a non-linear temperature characteristic by a reference voltage generating circuit 7.
Figure 45B:
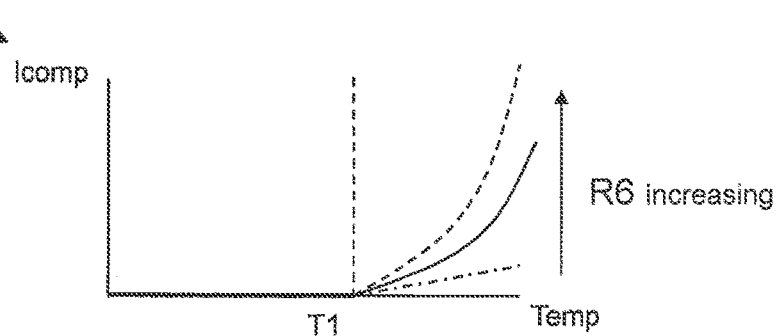
Figure 45C:
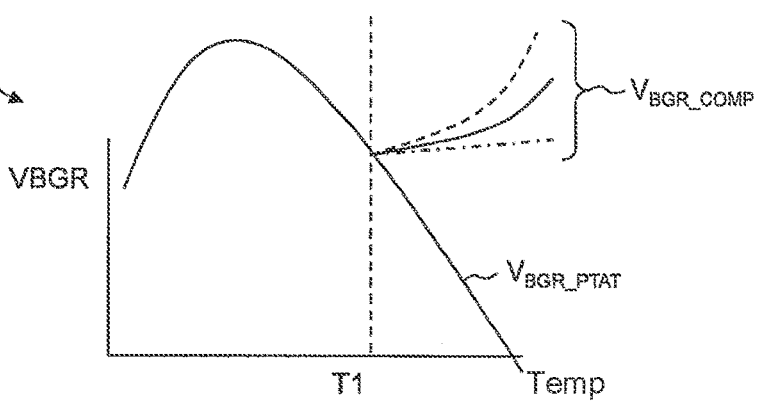

VBGR_PTAT shown in FIG. 45A shows an example of a waveform in a case where only correction using the voltage VPTAT that is proportional to the absolute temperature is performed for the base-emitter voltage VBE when the correcting current $I_{COMP}$ is neglected. Further, the voltage VBGR_PTAT has a bowl shape, and shows a case where a constant of each element is adjusted so that the temperature at which a temperature coefficient is zero is achieved on low temperature side. Further, in FIG. 45B, the correcting current $I_{COMP}$ is shown. In FIG. 45C, an example of a waveform in a case where the correcting voltage VCOMP is added to the output voltage VBGR_PTAT is shown.

Figure 45D:
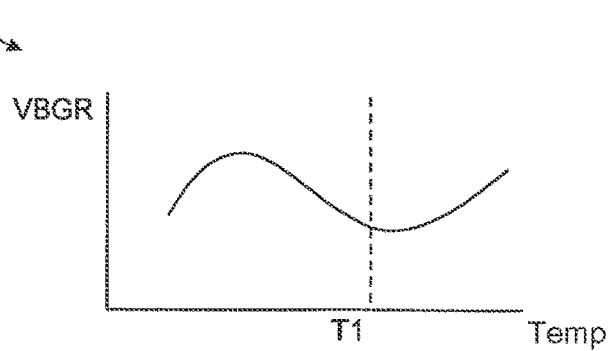

As described above, in order to reduce the temperature drift of the voltage VBGR_PTAT that has the non-linear temperature dependence, a correction method of adding a current $I_{PTAT}^2$ that is proportional to the square of the absolute temperature may be considered, for example. However, in the non-linear correction method of adding the current $I_{PTAT}^2$ using the absolute temperature 0 K as a starting point, it is difficult to obtain a current or a voltage that is rapidly changed in a temperature range (for example, temperature range that is necessary in specification, or the like) in which the correction is to be performed. Thus, in the reference voltage generating circuit 7 according to the present embodiment, in a similar way to the reference voltage generating circuit 1, the correcting current $I_{COMP}$ in which a characteristic thereof is changed with reference to a predetermined temperature T1 is generated, and the correcting voltage VCOMP based on the correcting current $I_{COMP}$ is added to the voltage VBGR_PTAT to perform the non-linear correction. Accordingly, as shown in FIG. 45D, it is possible to reduce the temperature drift in the predetermined temperature range. Further, as shown in FIGS. 45A to 45D, it is possible to control the inclination of the correcting current $I_{COMP}$ by the value of the resistance R6.

A waveform example of FIG. 45C is made to emphasize the waveform of the output voltage $V_{BGR}$ after the non-linear correction, and in actuality, since the temperature T1 at which the size relationship between "$V_{BGR}$" and "$2V_{BE5,\,7}$" is reversed is not discontinuous but continuous, the output voltage $V_{BGR}$ becomes a smooth curve as shown in FIG. 45D.

Further, if the term of "$V_{BGR}-2\,V_{BE5,\,7}$" in Formula 72 is approximately expressed as a characteristic obtained by subtracting the base-emitter voltage VBE of the non-linear temperature characteristic from the voltage $V_{BGR}$ that is corrected in a linear form (PTAT), which draws a curve that also includes a higher term. In order to reduce the temperature drift at a predetermined temperature range, the curve may be monotonically increased as in a characteristic indicated by a solid line or a dashed line shown in FIG. 45B, and may not be particularly linear.

According to the above-described reference voltage generating circuit 7 according to the nineteenth embodiment, by generating the correcting current $I_{COMP}$ by the non-linear correcting circuit 72 to be fed back to the BGR core circuit 71, it is possible to further reduce the temperature dependence of the output voltage $V_{BGR}$. Further, it is possible to reduce the value of the resistance R6 compared with a twenty first embodiment to be described later.

The temperature correction method in the non-linear correcting circuit 72 may also be applied to the BGR circuits having the different topologies. Further, by forming the current mirror circuit (MP11 and MP12) of the non-linear correcting circuit 72 to have a cascode configuration if there is a room in an operating voltage, or by inserting the degeneration resistances on the source sides thereof as in FIG. 39 described above, it is possible to prevent current mismatching.

Twentieth Embodiment

Figure 46:
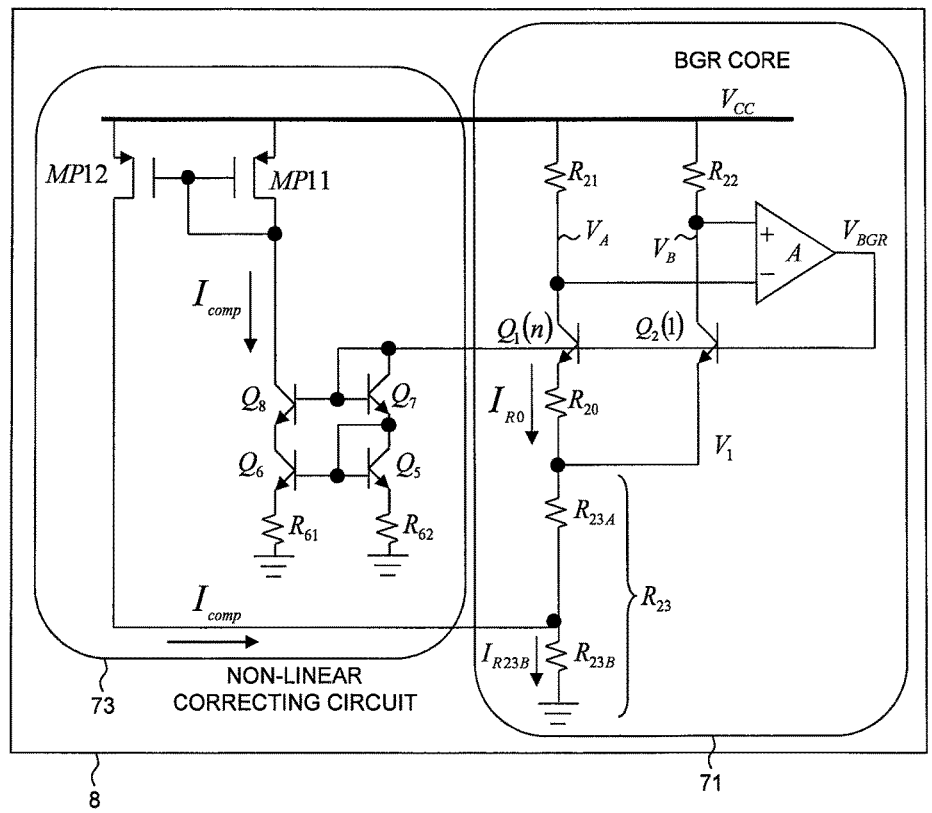
FIG. 46 is a circuit diagram illustrating an example of a reference voltage generating circuit according to a twentieth embodiment.

FIG. 46 is a circuit diagram illustrating an example of a reference voltage generating circuit according to a twentieth embodiment.

In FIG. 46, the same reference numerals are given to the same components and the like as in the reference voltage generating circuit 7 according to the nineteenth embodiment, and detailed description thereof will not be shown.

A reference voltage generating circuit 8 shown in FIG. 46 includes a BGR core circuit 71 and a non-linear correcting circuit 73. The non-linear correcting circuit 73 has a configuration in which the resistance R6 of the non-linear correcting circuit 72 according to the twentieth embodiment is divided, a resistance R62 is provided between an emitter terminal of the bipolar transistor Q5 and the ground node and a resistance R61 is provided between an emitter terminal of the bipolar transistor Q6 and the ground node. The correcting current $I_{COMP}$ generated by the correcting circuit 73 is expressed as Formula 73 when $R_{61}=R_{62}$.

$$I_{COMP} = \begin{cases} 0 & (V_{BGR} \leq 2V_{BE5,7}) \\ \dfrac{V_{BGR} - 2V_{BE5,7}}{R_{62}} & (V_{BGR} \geq 2V_{BE5,7}) \end{cases} \quad \text{(Formula 73)}$$

According to the reference voltage generating circuit 8 according to the twentieth embodiment, in a similar way to the reference voltage generating circuit 7, it is possible to further reduce the temperature dependence of the output voltage $V_{BGR}$.

The temperature correction method in the non-linear correcting circuit 73 may also be applied to the BGR circuits having the different topologies. Further, by forming the current mirror circuit (MP11 and MP12) of the non-linear correcting circuit 73 to have a cascode configuration if there is a room in an operating voltage, or by inserting the degeneration resistances on the source sides thereof as in FIG. 39 described above, it is possible to prevent current mismatching.

Twenty First Embodiment

Figure 47:
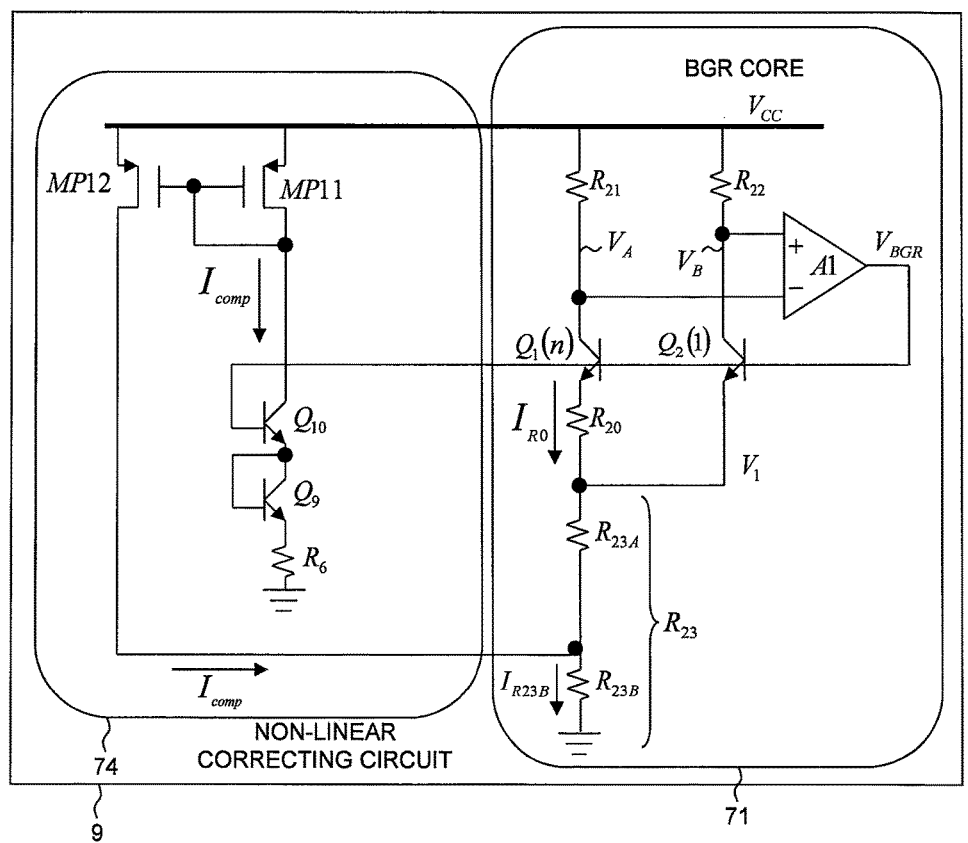
FIG. 47 is a circuit diagram illustrating an example of a reference voltage generating circuit according to a twenty first embodiment.

FIG. 47 is a circuit diagram illustrating an example of a reference voltage generating circuit according to a twenty first embodiment.

In FIG. 47, the same reference numerals are given to the same components and the like as in the reference voltage generating circuit 7 according to the nineteenth embodiment, and detailed description thereof will not be shown.

A reference voltage generating circuit 9 shown in FIG. 47 includes a BGR core circuit 71 and a non-linear correcting circuit 74. The non-linear correcting circuit 74 includes a bipolar transistor Q10 in which an output of the BGR core circuit is input to a base side thereof; a bipolar transistor Q9 that is diode-connected and is connected to an emitter side of the bipolar transistor Q10 on a collector side thereof; a resistance R6 that is provided between an emitter terminal of the bipolar transistor Q9 and the ground node; and a current mirror circuit (MP11 and MP12) that generates a correcting current $I_{COMP}$. The bipolar transistors Q9 and Q10 are stacked at two stages for the same purpose as in the non-linear correcting circuit 72 according to the twentieth embodiment.

According to the reference voltage generating circuit 9 according to the twenty first embodiment, in a similar way to the reference voltage generating circuit 7, it is possible to further reduce the temperature dependence of the output voltage $V_{BGR}$. Further, since the non-linear correcting circuit 74 does not have the cascode configuration of the current mirror circuit, differently from the non-linear correcting circuits 72 and 73, and the number of elements is small, it is possible to further reduce the chip area.

The temperature correction method in the non-linear correcting circuit 74 may also be applied to the BGR circuits having the different topologies. Further, by forming the current mirror circuit (MP11 and MP12) of the non-linear correcting circuit 73 to have a cascode configuration if there is a room in an operating voltage, or by inserting the degenerating resistances on the source sides thereof as in FIG. 39 described above, it is possible to prevent current mismatching.

Twenty Second Embodiment

Figure 48:
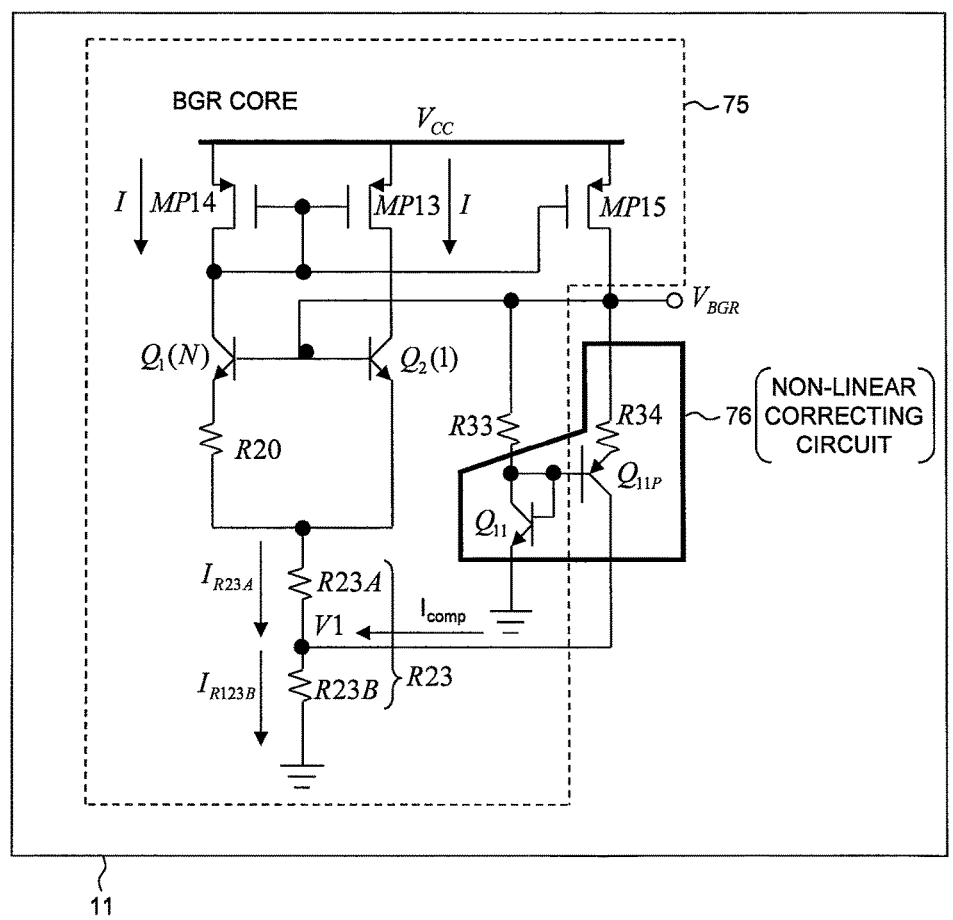
FIG. 48 is a circuit diagram illustrating an example of a reference voltage generating circuit according to a twenty second embodiment.

FIG. 48 is a circuit diagram illustrating an example of a reference voltage generating circuit according to a twenty second embodiment.

A reference voltage generating circuit 11 shown in FIG. 48 includes a BGR core circuit 75 and a non-linear correcting circuit 76. The BGR core circuit 75 includes a pair of NPN bipolar transistors Q1 and Q2 that are connected in common at base terminals thereof; a resistance R20 that is connected in common at one end thereof, is connected to the base terminal of the bipolar transistor Q2, and is provided between an emitter side of the bipolar transistor Q1 and an emitter side of the bipolar transistor Q2; a resistance R23 that is divided into a resistance R23A and a resistance R23B and is provided between the emitter terminals of the bipolar transistors Q1 and Q2 and the ground node; MOS transistors MP13 to MP15 that form a current mirror circuit; an NPN bipolar transistor Q11 that is diode-connected and is connected to a ground node on an emitter side thereof; and a resistance R33 that is provided between the base terminals of the bipolar transistors Q1 and Q2 and a collector terminal of the bipolar transistor Q11. Further, the bipolar transistor Q11 forms a non-linear correcting circuit 76 in cooperation with a resistance R34 and a PNP bipolar transistor Q11P. In the non-linear correcting circuit 76, the resistance R34 is connected to a connection node of a drain terminal of the MOS transistor MP3 and the base terminals of the bipolar transistors Q1 and Q2 at one end thereof. Further, the bipolar transistor Q11P is connected to a base terminal of the bipolar transistor Q11 at a base terminal thereof, is connected to the other end of the resistance R4 at an emitter terminal thereof, and is connected to the connection node of the resistances R11 and R12 at a collector terminal thereof.

The correcting current $I_{COMP}$, generated by the correcting circuit 75 is expressed as Formula 74.

$$I_{COMP} = \begin{cases} 0 & (V_{BGR} \leq (V_{BE11} + V_{BE11P})) \\ \dfrac{V_{BGR} - (V_{BE11} + V_{BE11P})}{R_{34}} & (V_{BGR} \geq (V_{BE11} + V_{BE11P})) \end{cases} \quad \text{(Formula 74)}$$

In the case of the BGR core circuit 75, since the output voltage $V_{BGR}$ is about 1.2 V, by forming the bipolar transistors Q11 and Q11P in the double-stage structure, a base-emitter voltage VBE becomes two times, and thus, a preferable correcting current $I_{COMP}$ is generated. Here, VBE is set to be two times in consideration of a case where VBE of the bipolar transistor is about 0.7 V at low temperature and about 0.35 V at high temperature.

According to the reference voltage generating circuit 11 according to the twenty second embodiment, in a similar way to the reference voltage generating circuit 7, it is possible to further reduce the temperature dependence of the output voltage $V_{BGR}$. Further, by using a configuration in which elements that form the BGR core circuit 75 and the non-linear correcting circuit 76 are shared, it is possible to reduce the number of elements, and to reduce the chip area.

The temperature correction method in the non-linear correcting circuit 75 may also be applied to the BGR circuits having the different topologies. Further, by forming the current mirror circuit (MP1, MP2 and MP3) of the non-linear correcting circuit 75 to have a cascode configuration if there is a room in an operating voltage, or by inserting the degenerating resistances on the source sides thereof as in FIG. 39 described above, it is possible to prevent current mismatching.

Hereinbefore, the invention made by the inventors has been specifically described, but the invention is not limited thereto, and various modifications may be made in a range without departing from the spirit of the invention.

For example, the types of combination of the BGR core circuit and the non-linear correcting circuit shown in the first to twenty second embodiments are not limited to the above examples, and if the correcting current $I_{COMP}$ may be appropriately fed back to the BGR core circuit, different combinations may be used to perform the non-linear correction. For example, in the reference voltage generating circuit 2 according to the second embodiment, any one of the BGR core circuits 10I to 10Q may be applied instead of the BGR core circuit 10A.

Further, an example in which the start-up circuit 30 and the low pass filter 60 are added to the reference voltage generating circuit 1 is shown in the first embodiment, but the invention is not limited thereto. That is, the start-up circuit 30 and the low pass filter 60 may also be applied to the reference voltage generating circuits according to the other embodiments.

INDUSTRIAL APPLICABILITY

The present invention relates to a voltage generating circuit, and particularly, may be widely applied to a reference voltage generating circuit in a semiconductor integrated circuit.

EXPLANATION OF REFERENCE NUMERALS 1 to 9, and 11 Reference voltage generating circuit
10, 10A to 10Q, 71, 75 BGR core circuit
20, 20A to 20C, 72 to 74 Non-linear correcting circuit
A, A1 to A3 Amplifier
300 Straight line for comparison
30 Start-up circuit
41 Power supply control section
42 Reference buffer
43 Main regulator
44 Sub regulator
45 CPU
46 Register
47 Non-volatile storage element
48 Peripheral circuit
49 Input and output circuit
50 Power supply circuit
51 AD converter
52 DA converter
60 LPF (low pass filter)
70 Regulator circuit (Reference current source)
100, 101 Semiconductor integrated circuit device (system LSI)
51 Power supply circuit
52 Temperature sensor
53 AD converter
54 Reference voltage generating circuit

What is claimed is:

1. A voltage generating circuit comprising:
a current generating section that generates a current obtained by adding a current based on a voltage difference between base-emitter voltages of two bipolar transistors having different emitter areas and a current based on a forward voltage of a PN junction, and
an output section that converts an input current into a voltage and outputs the converted voltage,
wherein the current generating section includes:
a first bipolar transistor that includes an emitter terminal, a collector terminal, and a base terminal;
a second bipolar transistor that has an emitter area larger than an emitter area of the first bipolar transistor, includes an emitter terminal at a same electric potential as the emitter terminal of the first bipolar transistor and includes a base terminal connected to the collector terminal of the first bipolar transistor;

a first resistance element that is connected to the collector terminal of the first bipolar transistor at one end thereof and is connected to the base terminal of the first bipolar transistor at the other end thereof;

a second resistance element that is connected to a collector terminal of the second bipolar transistor at one end thereof and is connected to the other end of the first resistance element at the other end thereof;

a third resistance element that is connected to the base terminal of the first bipolar transistor and a first electric potential node;

an amplifier that receives, as two input voltages, a first voltage corresponding to a voltage at the collector terminal of the first bipolar transistor and a second voltage corresponding to a voltage at the collector terminal of the second bipolar transistor and outputs a voltage based on a voltage difference between the two input voltages; and a voltage-current converting section that receives, as an input, the output voltage of the amplifier, converts the received voltage into a current and supplies the converted current to a connection node, that connects the other end of the first resistance element and the other end of the second resistance element, and to the output section, wherein the current supplied to the connection node of the first resistance element and the second resistance element from the voltage-current converting section is performed through a resistance element.

2. The voltage generating circuit according to claim 1, wherein the first voltage is obtained by dividing the voltage of the collector terminal of the first bipolar transistor and the second voltage is obtained by dividing the voltage of the collector terminal of the second bipolar transistor.

3. The voltage generating circuit according to claim 1, wherein the voltage-current converting section includes:

a first MOS transistor that is connected to a second electric potential node having a different electric potential from the first electric potential node through a fifth resistance element at a source terminal thereof and is connected to the connection node at a drain terminal thereof; and a second MOS transistor that is connected to the second electric potential node through a sixth resistance element at a source terminal thereof and is connected to an input side of the output section at a drain terminal thereof, and wherein the output voltage of the amplifier is input to gate terminals of the first MOS transistor and the second MOS transistor.

4. A voltage generating circuit comprising:

a current generating section that generates a first current based on a voltage difference between base-emitter voltages of two bipolar transistors having different emitter areas, and an output section that generates a second current based on a forward voltage of a PN junction on the basis of the first current and generates a voltage on the basis of the first current and the second current to output the generated voltage, wherein the current generating section includes:

a first bipolar transistor that includes an emitter terminal, a collector terminal, and a base terminal;

a second bipolar transistor that has an emitter area larger than an emitter area of the first bipolar transistor, includes an emitter terminal at a same electric potential as the emitter terminal of the first bipolar transistor and includes a base terminal connected to a collector terminal of the first bipolar transistor;

a first resistance element that is connected to the collector terminal of the first bipolar transistor at one end thereof and is connected to the base terminal of the first bipolar transistor at the other end thereof;

a second resistance element that is connected to a collector terminal of the second bipolar transistor at one end thereof and is connected to the other end of the first resistance element at the other end thereof;

an amplifier that receives, as two input voltages, a first voltage corresponding to a voltage at the collector terminal of the first bipolar transistor and a second voltage corresponding to a voltage at the collector terminal of the second bipolar transistor and outputs a voltage based on a voltage difference between the two input voltages; and a voltage-current converting section that receives, as an input, the output voltage of the amplifier, converts the received voltage into the first current and supplies the first current to a connection node, that connects the other end of the first resistance element and the other end of the second resistance element, and to the output section.

5. The voltage generating circuit according to claim 4, wherein the output section includes:

a voltage generating section that is connected to a first electric potential node at one end thereof and generates a voltage based on the forward voltage of the PN junction on the basis of a current that is input to the other end thereof;

a third resistance element that is connected to the first electric potential node at one end thereof; and a fourth resistance element that is provided between the other end side of the voltage generating section and the other end side of the third resistance element, and wherein the first current is supplied to each node to which the fourth resistance element is connected.

* * * * *